(12) United States Patent
Nielsen et al.

(10) Patent No.: US 8,977,558 B2
(45) Date of Patent: Mar. 10, 2015

(54) METHODS, APPARATUS AND SYSTEMS FOR FACILITATING GENERATION AND ASSESSMENT OF ENGINEERING PLANS

(75) Inventors: Steven Nielsen, North Palm Beach, FL (US); Curtis Chambers, Palm Beach Gardens, FL (US); Jeffrey Farr, Jupiter, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 189 days.

(21) Appl. No.: 13/208,191

(22) Filed: Aug. 11, 2011

(65) Prior Publication Data

US 2012/0065944 A1 Mar. 15, 2012

Related U.S. Application Data

(60) Provisional application No. 61/372,586, filed on Aug. 11, 2010.

(51) Int. Cl.
*G06Q 50/06* (2012.01)
*G06Q 50/08* (2012.01)
(Continued)

(52) U.S. Cl.
CPC .............. *G06Q 50/06* (2013.01); *G06Q 10/103* (2013.01); *G06Q 50/08* (2013.01); *G01V 3/38* (2013.01); *G06F 17/30241* (2013.01)
USPC ................. 705/7.42; 703/1; 702/95; 701/491; 701/541

(58) Field of Classification Search
CPC ... G01D 3/063; G06F 17/30241; G06F 13/12; G06F 13/122; G06Q 50/08; G01C 15/00
See application file for complete search history.

(56) References Cited

U.S. PATENT DOCUMENTS

| 3,986,777 A | 10/1976 | Roll |
|---|---|---|
| 4,623,282 A | 11/1986 | Allen |

(Continued)

FOREIGN PATENT DOCUMENTS

| CA | 2386200 | 4/2000 |
|---|---|---|
| CA | 2528795 | 6/2007 |

(Continued)

OTHER PUBLICATIONS

U.S. Appl. No. 13/456,178, filed Apr. 25, 2012, Nielsen et al.

(Continued)

*Primary Examiner* — Kamini S Shah
*Assistant Examiner* — Jay B Hann

(57) ABSTRACT

Electronically generating an engineering plan for installation of equipment, such as cable system equipment, at a work site. First geographic information relating to a first location of the work site is compared with second geographic information representing a second location of an engineer generating the engineering plan (or of a plan generating tool being used by the engineer to generate the plan) to verify that the engineer/tool is sufficiently near to the work site. A digital image of a geographic area including the work site is displayed on the plan generating tool, and user input is acquired from the engineer (e.g., via a user input device associated with the plan generating tool) relating to at least one first position, relative to the displayed digital image, representing a first equipment location of at least a first piece of the equipment to be installed at the work site. A marked-up digital image including at least one first digital representation of the first piece of the equipment placed on the displayed digital image is generated, based at least in part on the user input, and information relating to the marked-up digital image is electronically transmitted and/or electronically stored so as to generate the engineering plan.

19 Claims, 21 Drawing Sheets

(51) Int. Cl.
    *G06Q 10/10* (2012.01)
    *G01V 3/38* (2006.01)
    *G06F 17/30* (2006.01)

(56) References Cited

U.S. PATENT DOCUMENTS

| | | |
|---|---|---|
| 4,688,921 A | 8/1987 | Wakabayashi |
| 5,404,661 A | 4/1995 | Sahm et al. |
| 5,414,462 A | 5/1995 | Veatch |
| 5,448,263 A | 9/1995 | Martin |
| 5,576,973 A | 11/1996 | Haddy |
| 5,644,237 A | 7/1997 | Eslambolchi et al. |
| 5,689,415 A | 11/1997 | Calotychos et al. |
| 5,699,244 A | 12/1997 | Clark, Jr. |
| 5,920,194 A | 7/1999 | Lewis et al. |
| 5,987,380 A | 11/1999 | Backman |
| 6,064,940 A | 5/2000 | Rodgers |
| 6,127,827 A | 10/2000 | Lewis |
| 6,141,000 A | 10/2000 | Martin |
| 6,201,883 B1 | 3/2001 | Mizui |
| 6,299,934 B1 | 10/2001 | Manning |
| 6,337,681 B1 | 1/2002 | Martin |
| 6,351,707 B1 | 2/2002 | Ichikawa |
| 6,371,692 B1 | 4/2002 | Fatigati |
| 6,421,725 B1 | 7/2002 | Vermilyea et al. |
| 6,430,499 B1 | 8/2002 | Nakano |
| 6,437,708 B1 | 8/2002 | Brouwer |
| 6,477,475 B1 | 11/2002 | Takaoka et al. |
| 6,567,116 B1 | 5/2003 | Aman et al. |
| 6,650,293 B1 | 11/2003 | Eslambolchi |
| 6,650,834 B2 | 11/2003 | Ume |
| 6,710,741 B2 | 3/2004 | Tucker |
| 6,723,375 B2 | 4/2004 | Zeck et al. |
| 6,747,636 B2 | 6/2004 | Martin |
| 6,751,552 B1 | 6/2004 | Minelli |
| 6,751,553 B2 | 6/2004 | Young |
| 6,772,142 B1 | 8/2004 | Kelling et al. |
| 6,778,128 B2 | 8/2004 | Tucker et al. |
| 6,803,906 B1 | 10/2004 | Morrison et al. |
| 6,850,161 B1 | 2/2005 | Elliott et al. |
| 6,853,905 B2 | 2/2005 | Barton |
| 6,873,998 B1 | 3/2005 | Dorum |
| 6,898,525 B1 | 5/2005 | Minelli |
| 6,904,361 B1 | 6/2005 | Tallman et al. |
| 6,941,890 B1 | 9/2005 | Cristo et al. |
| 6,950,535 B2 | 9/2005 | Sibayama |
| 6,956,524 B2 | 10/2005 | Tucker et al. |
| 6,958,690 B1 | 10/2005 | Asher et al. |
| 6,972,698 B2 | 12/2005 | Deguchi |
| 6,975,942 B2 | 12/2005 | Young et al. |
| 6,999,021 B2 | 2/2006 | Taylor, Jr. |
| 7,003,138 B2 | 2/2006 | Wilson |
| 7,009,399 B2 | 3/2006 | Olsson et al. |
| 7,027,653 B2 | 4/2006 | Hino |
| 7,120,564 B2 | 10/2006 | Pacey |
| 7,142,196 B1 | 11/2006 | Connor |
| 7,185,021 B2 | 2/2007 | Kishigami |
| 7,216,034 B2 | 5/2007 | Vitikainen |
| 7,222,986 B2 | 5/2007 | Mah |
| 7,236,162 B2 | 6/2007 | Morrison et al. |
| 7,274,756 B2 | 9/2007 | Kuijk |
| 7,372,247 B1 | 5/2008 | Giusti et al. |
| 7,400,976 B2 | 7/2008 | Young et al. |
| 7,417,641 B1 | 8/2008 | Barber |
| 7,437,830 B1 | 10/2008 | Kulavic |
| 7,469,247 B2 | 12/2008 | Cossins et al. |
| 7,584,123 B1 | 9/2009 | Karonis et al. |
| 7,613,331 B2 | 11/2009 | Maeda |
| 7,626,496 B1 | 12/2009 | Asher et al. |
| 7,636,901 B2 | 12/2009 | Munson |
| 7,640,105 B2 | 12/2009 | Nielsen et al. |
| 7,664,530 B2 | 2/2010 | Skelton |
| 7,773,095 B1 | 8/2010 | Badrak et al. |
| 7,777,648 B2 | 8/2010 | Smith et al. |
| 7,886,616 B1 | 2/2011 | Hayman |
| 7,889,124 B2 | 2/2011 | Islam et al. |
| 7,889,888 B2 | 2/2011 | Deardorr |
| 7,917,292 B1 | 3/2011 | Du |
| 7,978,129 B2 | 7/2011 | Sawyer et al. |
| 8,054,343 B2 | 11/2011 | Cheatle et al. |
| 8,060,304 B2 | 11/2011 | Nielsen et al. |
| 8,155,390 B2 | 4/2012 | Nielsen et al. |
| 8,194,932 B2 | 6/2012 | Nielsen et al. |
| 8,204,642 B2 | 6/2012 | Tanaka et al. |
| 8,218,827 B2 | 7/2012 | Nielsen et al. |
| 8,249,306 B2 | 8/2012 | Nielsen et al. |
| 8,300,925 B2 | 10/2012 | Kunieda |
| 8,311,765 B2 | 11/2012 | Nielsen et al. |
| 8,463,487 B2 | 6/2013 | Nielsen et al. |
| 8,467,932 B2 | 6/2013 | Nielsen et al. |
| 8,473,148 B2 | 6/2013 | Nielsen et al. |
| 8,480,332 B2 | 7/2013 | Miller |
| 8,532,341 B2 | 9/2013 | Nielsen et al. |
| 8,543,937 B2 | 9/2013 | Nielsen et al. |
| 8,577,707 B2 | 11/2013 | Nielsen et al. |
| 8,589,201 B2 | 11/2013 | Nielsen et al. |
| 8,589,202 B2 | 11/2013 | Nielsen et al. |
| 8,612,148 B2 | 12/2013 | Nielsen et al. |
| 8,612,271 B2 | 12/2013 | Nielsen et al. |
| 8,612,276 B1 | 12/2013 | Nielsen et al. |
| 2001/0036295 A1 | 11/2001 | Hendrickson |
| 2001/0049470 A1 | 12/2001 | Mault et al. |
| 2002/0013704 A1 | 1/2002 | Finney |
| 2002/0052755 A1 | 5/2002 | Whatley et al. |
| 2002/0122119 A1 | 9/2002 | Takakura |
| 2002/0145617 A1 | 10/2002 | Kennard |
| 2002/0184235 A1 | 12/2002 | Young et al. |
| 2003/0009315 A1 | 1/2003 | Thomas et al. |
| 2003/0012411 A1 | 1/2003 | Sjostrom et al. |
| 2003/0095708 A1 | 5/2003 | Pittel |
| 2003/0110184 A1 | 6/2003 | Gibson et al. |
| 2003/0164053 A1 | 9/2003 | Ignagni |
| 2004/0006425 A1 | 1/2004 | Wood et al. |
| 2004/0008883 A1 | 1/2004 | Shi et al. |
| 2004/0073578 A1 | 4/2004 | Nam et al. |
| 2004/0146185 A1 | 7/2004 | Blair et al. |
| 2004/0148191 A1 | 7/2004 | Hoke |
| 2004/0151388 A1 | 8/2004 | Maeda |
| 2004/0199410 A1 | 10/2004 | Feyen et al. |
| 2004/0203909 A1 | 10/2004 | Koster |
| 2004/0210370 A1 | 10/2004 | Gudat et al. |
| 2004/0210386 A1 | 10/2004 | Wood et al. |
| 2004/0252303 A1 | 12/2004 | Giorgianni et al. |
| 2005/0034074 A1 | 2/2005 | Munson et al. |
| 2005/0046584 A1 | 3/2005 | Breed |
| 2005/0057745 A1 | 3/2005 | Bontje |
| 2005/0122518 A1 | 6/2005 | Overbeck et al. |
| 2005/0125389 A1 | 6/2005 | Hazzard et al. |
| 2005/0156776 A1* | 7/2005 | Waite .............. 342/22 |
| 2005/0192752 A1 | 9/2005 | Rooney |
| 2005/0203768 A1 | 9/2005 | Florance |
| 2005/0219268 A1 | 10/2005 | Kyle |
| 2005/0254704 A1 | 11/2005 | Komiya et al. |
| 2006/0020417 A1 | 1/2006 | Koch et al. |
| 2006/0058945 A1 | 3/2006 | Watanabe |
| 2006/0077095 A1 | 4/2006 | Tucker et al. |
| 2006/0085396 A1 | 4/2006 | Evans |
| 2006/0091888 A1 | 5/2006 | Holman et al. |
| 2006/0161349 A1 | 7/2006 | Cross |
| 2006/0229809 A1 | 10/2006 | Chen |
| 2006/0235741 A1 | 10/2006 | Deaton et al. |
| 2006/0239560 A1 | 10/2006 | Sternby |
| 2006/0282191 A1 | 12/2006 | Gotfried |
| 2006/0282280 A1 | 12/2006 | Stotz et al. |
| 2007/0011271 A1 | 1/2007 | Baker et al. |
| 2007/0027591 A1 | 2/2007 | Goldenberg |
| 2007/0031029 A1 | 2/2007 | Sasaki |
| 2007/0076920 A1 | 4/2007 | Ofek |
| 2007/0100768 A1 | 5/2007 | Boccon-Gibod et al. |
| 2007/0110316 A1 | 5/2007 | Ohashi |
| 2007/0182721 A1 | 8/2007 | Watanabe et al. |
| 2007/0219722 A1 | 9/2007 | Sawyer |
| 2007/0286021 A1 | 12/2007 | Hoenmans et al. |
| 2008/0021863 A1 | 1/2008 | Evans |

(56) References Cited

U.S. PATENT DOCUMENTS

| | | |
|---|---|---|
| 2008/0025614 A1 | 1/2008 | Hintz et al. |
| 2008/0059889 A1 | 3/2008 | Parker et al. |
| 2008/0075368 A1 | 3/2008 | Kuzmin |
| 2008/0109751 A1 | 5/2008 | Fitzmaurice et al. |
| 2008/0125942 A1 | 5/2008 | Tucker et al. |
| 2008/0180322 A1 | 7/2008 | Islam |
| 2008/0192235 A1 | 8/2008 | Komiya et al. |
| 2008/0208415 A1 | 8/2008 | Vik |
| 2008/0284902 A1 | 11/2008 | Konno et al. |
| 2008/0285805 A1 | 11/2008 | Luinge et al. |
| 2008/0292295 A1 | 11/2008 | Konno et al. |
| 2009/0004410 A1 | 1/2009 | Thomson et al. |
| 2009/0012418 A1 | 1/2009 | Gerlach et al. |
| 2009/0013806 A1 | 1/2009 | Miller |
| 2009/0013928 A1 | 1/2009 | Nielsen et al. |
| 2009/0067695 A1 | 3/2009 | Komiya et al. |
| 2009/0070071 A1 | 3/2009 | Wood |
| 2009/0092297 A1 | 4/2009 | Kitoh et al. |
| 2009/0100185 A1 | 4/2009 | Shehan et al. |
| 2009/0121933 A1 | 5/2009 | Tucker et al. |
| 2009/0121937 A1 | 5/2009 | Kaegebein |
| 2009/0157746 A1* | 6/2009 | More et al. ............... 707/104.1 |
| 2009/0185712 A1 | 7/2009 | Wong et al. |
| 2009/0201178 A1 | 8/2009 | Nielsen et al. |
| 2009/0201311 A1 | 8/2009 | Nielsen et al. |
| 2009/0202101 A1 | 8/2009 | Nielsen et al. |
| 2009/0202110 A1 | 8/2009 | Nielsen et al. |
| 2009/0202111 A1 | 8/2009 | Nielsen et al. |
| 2009/0202112 A1 | 8/2009 | Nielsen et al. |
| 2009/0204238 A1 | 8/2009 | Nielsen et al. |
| 2009/0204466 A1 | 8/2009 | Nielsen et al. |
| 2009/0204614 A1 | 8/2009 | Nielsen et al. |
| 2009/0204625 A1 | 8/2009 | Nielsen et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210284 A1 | 8/2009 | Nielsen et al. |
| 2009/0210285 A1 | 8/2009 | Nielsen et al. |
| 2009/0210298 A1 | 8/2009 | Nielsen et al. |
| 2009/0237297 A1 | 9/2009 | Davis et al. |
| 2009/0237408 A1 | 9/2009 | Nielsen et al. |
| 2009/0238415 A1 | 9/2009 | Nielsen et al. |
| 2009/0238416 A1 | 9/2009 | Nielsen et al. |
| 2009/0238417 A1 | 9/2009 | Nielsen et al. |
| 2009/0241045 A1 | 9/2009 | Nielsen et al. |
| 2009/0257620 A1 | 10/2009 | Hicks |
| 2009/0306881 A1 | 12/2009 | Dolgov et al. |
| 2009/0322868 A1 | 12/2009 | Ikeda |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1* | 1/2010 | Nielsen et al. .................... 705/9 |
| 2010/0010863 A1* | 1/2010 | Nielsen et al. .................... 705/9 |
| 2010/0010882 A1* | 1/2010 | Nielsen et al. ................. 705/11 |
| 2010/0010883 A1* | 1/2010 | Nielsen et al. ................. 705/11 |
| 2010/0084532 A1 | 4/2010 | Nielsen et al. |
| 2010/0085054 A1 | 4/2010 | Nielsen et al. |
| 2010/0085376 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0086677 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0094553 A1 | 4/2010 | Nielsen et al. |
| 2010/0117654 A1 | 5/2010 | Nielsen et al. |
| 2010/0131903 A1 | 5/2010 | Thomson et al. |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205195 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0272885 A1 | 10/2010 | Olsson |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0137769 A1 | 6/2011 | Nielsen et al. |
| 2011/0236588 A1 | 9/2011 | Nielsen et al. |
| 2011/0241936 A1 | 10/2011 | Sawyer, Jr. et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |

(56) References Cited

U.S. PATENT DOCUMENTS

| | | |
|---|---|---|
| 2012/0113244 A1 | 5/2012 | Nielsen et al. |
| 2012/0257785 A1 | 10/2012 | Narayan et al. |
| 2012/0274476 A1 | 11/2012 | Nielsen et al. |
| 2012/0290901 A1 | 11/2012 | Kim |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0085670 A1 | 4/2013 | Nielsen et al. |
| 2013/0101180 A1 | 4/2013 | Nielsen et al. |
| 2013/0103318 A1 | 4/2013 | Nielsen et al. |
| 2013/0116855 A1 | 5/2013 | Nielsen et al. |
| 2013/0135343 A1 | 5/2013 | Nielsen et al. |
| 2013/0147637 A1 | 6/2013 | Nielsen et al. |
| 2013/0174072 A9 | 7/2013 | Nielsen et al. |
| 2013/0186333 A1 | 7/2013 | Nielsen et al. |
| 2013/0194303 A1 | 8/2013 | Nielsen et al. |
| 2013/0231984 A1 | 9/2013 | Nielsen et al. |
| 2013/0233883 A1 | 9/2013 | Nielsen et al. |
| 2013/0251894 A1 | 9/2013 | Nielsen et al. |
| 2013/0265138 A1 | 10/2013 | Nielsen et al. |
| 2013/0268199 A1 | 10/2013 | Nielsen et al. |
| 2013/0287500 A1 | 10/2013 | Miller |
| 2014/0022272 A1 | 1/2014 | Nielsen et al. |
| 2014/0035587 A1 | 2/2014 | Nielsen et al. |
| 2014/0074970 A1 | 3/2014 | Nielsen et al. |
| 2014/0122149 A1 | 5/2014 | Nielsen et al. |

FOREIGN PATENT DOCUMENTS

| | | |
|---|---|---|
| CA | 2713282 | 3/2013 |
| JP | 10060865 | 3/1998 |

OTHER PUBLICATIONS

U.S. Appl. No. 13/544,567, filed Jul. 9, 2012, Nielsen et al.
U.S. Appl. No. 13/625,436, filed Sep. 24, 2012, Nielsen et al.
ArcFM UT, "A GIS for Utilities Based on Standards," White Paper, AED SICAD, Sep. 2008, 1-28.
ArcFM, White Paper, 2006, 1-28.
ArcGIS 9, Geocoding in ArcGIS, Manual, 2004, 1-192.
ArcPad, Mobile GIS Software for Field Mapping Applications, brochure, 2006, http://www.esri.com/library/brochures/pdfs/arcpadbro.pdf.
ArcPad: Mobile GIS, ESRI White Paper, Sep. 1-17, 2004, http://www.esri.com/library/whitepapers/pdfs/arcpad.pdf.
Corrected Notice of Allowability dated Aug. 21, 2012 from U.S. Appl. No. 12/369,565.
DigiTerra Explorer, brochure, v. 6, 2009, 1-2.
DigiTerra Explorer, User Manual, v. 5, 2007, 1-64.
Heath, M. et al., "Comparison of Edge Detectors: A Methodology and Initial Study," 1996, IEEE Computer Society Press; http://citeseerx.ist.psu.edu/viewdoc/summary?doi=10.1.45.5214.
InMaps Develops Critical Database Link to Keep UGI Automation on Track, Holderness, NH, Sep. 2006, http://www.inmaps.com/InMaps-develops-critical-database-link-to-keep-ugi-automation-on-track, 1 page.
International Search Report and Written Opinion, Application No. PCT/US2011/045204, Dec. 12, 2011.
International Search Report and Written Opinion, Application No. PCT/US2011/47433, Dec. 22, 2011.
MobileMapper 6 vs. Juno SC in Real World Conditions, White Paper, 2009 1-16, http://www.sidwellco.com/php/gps_solutions/docs/MM6_vs_Juno_WP_en.pdf.
MobileMapper 6, brochure, 2008, 1-4.
Notice of Allowance dated Apr. 30, 2012 from U.S. Appl. No. 12/208,846.
Notice of Allowance dated Jul. 23, 2012 from U.S. Appl. No. 12/369,565.
Notice of Allowance dated Aug. 21, 2012 from U.S. Appl. No. 12/369,232.
Notice of Allowance dated Oct. 1, 2012 from U.S. Appl. No. 12/607,843.
Notice of Allowance dated Dec. 13, 2011 from U.S. Appl. No. 12/369,565.
Notice of Allowance dated Oct. 6, 2011 from CA Application No. 2,715,312.
Office Action dated Jan. 20, 2012 from U.S. Appl. No. 13/190,138.
Office Action dated Feb. 16, 2012 from U.S. Appl. No. 12/369,232.
Office Action dated Feb. 29, 2012 from U.S. Appl. No. 12/833,117.
Office Action dated Mar. 2, 2012 from U.S. Appl. No. 12/831,330.
Office Action dated Mar. 8, 2012 from U.S. Appl. No. 13/190,185.
Office Action dated Mar. 19, 2012 from U.S. Appl. No. 12/208,846.
Office Action dated Apr. 5, 2012 from U.S. Appl. No. 13/191,048.
Office Action dated Apr. 6, 2012 from U.S. Appl. No. 13/191,058.
Office Action dated Apr. 11, 2012 from U.S. Appl. No. 12/029,732.
Office Action dated Apr. 17, 2012 from U.S. Appl. No. 12/607,843.
Office Action dated Apr. 23, 2012 from U.S. Appl. No. 12/366,050.
Office Action dated Apr. 25, 2012 from U.S. Appl. No. 12/363,046.
Office Action dated May 1, 2012 from U.S. Appl. No. 12/363,009.
Office Action dated May 7, 2012 from U.S. Appl. No. 13/193,337.
Office Action dated May 24, 2012 from U.S. Appl. No. 13/190,138.
Office Action dated May 24, 2012 from U.S. Appl. No. 13/194,121.
Office Action dated Jun. 8, 2012 from U.S. Appl. No. 13/194,163.
Office Action dated Jun. 28, 2012 from U.S. Appl. No. 12/369,565.
Office Action dated Jul. 13, 2011 from U.S. Appl. No. 12/029,732, filed Feb. 12, 2008.
Office Action dated Jul. 26, 2012 from Canadian Application No. 2,707,246.
Office Action dated Aug. 7, 2012 from U.S. Appl. No. 13/190,185.
Office Action dated Aug. 9, 2012 from U.S. Appl. No. 12/831,330.
Office Action dated Oct. 9, 2012 from U.S. Appl. No. 13/190,138.
Office Action dated Oct. 10, 2012 from U.S. Appl. No. 13/191,048.
Office Action dated Oct. 10, 2012 from U.S. Appl. No. 13/191,058.
Office Action dated Nov. 23, 2011 from U.S. Appl. No. 12/208,846.
Office Action dated Nov. 23, 2011 from U.S. Appl. No. 12/363,009.
Office Action dated Nov. 26, 2010 from Australian Application No. 2009213151.
Office Action dated Nov. 29, 2011 from Australian Application No. 2009213151.
Office Action dated Oct. 6, 2011 from U.S. Appl. No. 12/366,050.
Ross, C., "2d Tile Map Editor," Oct. 19, 2005, http://www.blitzbasic.com/Community/posts.php?topic=52152, pp. 1-3.
Schall, G. et al., "Virtual Redlining for Civil Engineering in Real Environments," IEEE International Symposium on Mixed and Augmented Reality Sep. 15-18, 2008, Cambridge, UK, 4 pages.
Trimble Comprehensive Utilities, brochure, 2010, 1-6.
UGI Utilities Selects KEMA for FLAME Project Implementation, Burlington, Massachusetts, Electric Energy Publications, Inc., Feb. 10, 2004, http://www.eet-d.com/?page=show_news&id=17641, 2 pages.
UGI Utilities, Inc., FLAME Project White Paper, (original publication date unknown), received Aug. 3, 2011, 12 pages.
w3schools; "JavaScript Pop Up Boxes," Aug. 11, 2005; http://www.w3schools.com/js/js_popup.asp, pp. 1-2.
Office Action dated Feb. 5, 2014 from U.S. Appl. No. 13/185,194.
Office Action dated Dec. 30, 2013 from Canadian Application No. 2,707,246.
Notice of Allowance dated Dec. 6, 2013 from U.S. Appl. No. 13/191,048.
Notice of Allowance dated Dec. 20, 2013 from U.S. Appl. No. 13/191,058.
U.S. Appl. No. 13/950,655, filed Jul. 25, 2013, Nielsen et al.
U.S. Appl. No. 13/953,998, filed Jul. 30, 2013, Nielsen et al.
Office Action dated Feb. 12, 2013 from U.S. Appl. No. 12/833,117.
Stahovich, David M. et al., "Automated and Integrated Call Before You Dig," Proceedings of GITA 2005, GITA's 18th Annual Conference, Mar. 6-9, 2005, Denver, CO, online: GIS for Oil & Gas Conference 2002 <http://www.gisdevelopment.net/proceedings/gita/2005/papers/76.pdf>.
Notice of Allowability dated Jul. 26, 2013 from U.S. Appl. No. 13/796,487.

(56) References Cited

OTHER PUBLICATIONS

Notice of Allowance dated Jan. 31, 2013 from U.S. Appl. No. 12/363,046.
Notice of Allowance dated Jun. 6, 2013 from U.S. Appl. No. 13/796,487.
Notice of Allowance dated Jul. 19, 2013 from U.S. Appl. No. 13/734,415.
Notice of Allowance dated Jul. 26, 2013 from U.S. Appl. No. 12/029,732.
Notice of Allowance dated Sep. 11, 2013 from U.S. Appl. No. 13/191,048.
Notice of Allowance dated Sep. 13, 2013 from U.S. Appl. No. 13/625,436.
Notice of Allowance dated Nov. 16, 2012 from U.S. Appl. No. 12/208,846.
Office Action dated Jan. 2, 2013 from U.S. Appl. No. 12/363,009.
Office Action dated Jan. 15, 2013 from U.S. Appl. No. 12/029,732.
Office Action dated Feb. 4, 2013 from Australian Application No. 2010270589.
Office Action dated Feb. 4, 2013 from Canadian Application No. 2,707,246.
Office Action dated Apr. 22, 2013 from U.S. Appl. No. 13/734,415.
Office Action dated Apr. 23, 2013 from U.S. Appl. No. 13/191,048.
Office Action dated May 7, 2013 from U.S. Appl. No. 13/191,058.
Office Action dated May 20, 2013 from U.S. Appl. No. 13/741,080.
Office Action dated May 28, 2013 from U.S. Appl. No. 13/193,337.
Office Action dated Jul. 1, 2013 from U.S. Appl. No. 12/029,732.
Office Action dated Jul. 3, 2013 from Canadian Application No. 2,707,246.
Office Action dated Jul. 3, 2013 from U.S. Appl. No. 13/758,336.
Office Action dated Aug. 1, 2013 from U.S. Appl. No. 13/190,138.
Office Action dated Sep. 4, 2013 from U.S. Appl. No. 12/363,009.
Office Action dated Oct. 31, 2013 from U.S. Appl. No. 13/953,998.
Office Action dated Nov. 4, 2013 from U.S. Appl. No. 13/193,337.
Office Action dated Nov. 4, 2013 from U.S. Appl. No. 13/758,336.
Office Action dated Nov. 6, 2013 from U.S. Appl. No. 13/741,080.
Office Action dated Nov. 21, 2012 from U.S. Appl. No. 13/194,121.
Office Action dated Nov. 27, 2012 from U.S. Appl. No. 13/194,163.
Office Action dated Dec. 28, 2012 from U.S. Appl. No. 13/193,337.
Ruggiero, K., "Using ArcGIS for Clearing Cable Locates," ESRI 2006.
Supplemental Notice of Allowability dated Jul. 2, 2013 from U.S. Appl. No. 13/796,487.
Vanaartsen, S.J., GIS Automates Utility One Call Process, Proceeding ESRI, 1-15, http://proceedings.esri.com/library/useconf/proc06/papers/papers/pap_1148.pdf.
Nielsen et al., co-pending U.S. Patent No. 8,543,937, issued Sep. 24, 2013.
Haas, J. et al., "Feed the FLAME—Utility Integrates Field Applications," GeoWorld, Mar. 2007, 5 pages, online: Systems Integration Articles/Enspiria Solutions.
Corrected Notice of Allowabilty dated Feb. 27, 2014 from U.S. Appl. No. 13/191,058.
Notice of Allowance dated Feb. 10, 2014 from U.S. Appl. No. 13/758,336.
Notice of Allowance dated Feb. 14, 2014 from U.S. Appl. No. 13/741,080.
Notice of Allowance dated Feb. 18, 2014 from U.S. Appl. No. 13/193,337.
Patent Examination Report No. 1 dated Jan. 21, 2014 from Australian Application No. 2012241082.
Notice of Allowance dated Jul. 3, 2014 from U.S. Appl. No. 13/758,336.
Notice of Allowance dated Aug. 4, 2014 from U.S. Appl. No. 13/741,080.
Office Action dated Jul. 18, 2014 from U.S. Appl. No. 13/185,194.
Office Action dated Jul. 30, 2014 from U.S. Appl. No. 13/194,121.
Notice of Allowance dated Sep. 23, 2014 from U.S. Appl. No. 14/063,417.
Office Action dated Sep. 19, 2014 from U.S. Appl. No. 13/194,163.
Office Action dated Oct. 10, 2014 from U.S. Appl. No. 13/190,185.
Examination Report dated Oct. 9, 2014 from Australian Application No. 2013204039.

\* cited by examiner

*FIG. 3B*

METHODS, APPARATUS AND SYSTEMS FOR FACILITATING GENERATION AND ASSESSMENT OF ENGINEERING PLANS

CROSS-REFERENCE TO RELATED APPLICATION

The present application claims a priority benefit, under 35 U.S.C. §119(e), to U.S. provisional application Ser. No. 61/372,586, filed Aug. 11, 2010, entitled "Methods and Apparatus for Generating Engineering Plans," which application is hereby incorporated herein by reference in its entirety.

BACKGROUND

The installation of engineered systems, such as utilities (e.g., electric, telecommunications, water, sewer, gas), at a work site requires the preparation of an engineering plan that construction technicians can use in the field to identify and/or place (install) various system components at the work site. For example, in connection with cable systems for television, telephone and/or data communications, technicians may use an engineering plan to identify where junction boxes, conduit, switches and other components are to be placed at a work site, perform necessary excavation or other preparation at the various equipment locations, and install the equipment appropriately.

Conventional approaches for generating engineering plans for utility installation often are based on "facilities maps." A "facilities map" is any physical, electronic, or other representation of the geographic location, type, number, and/or other attributes of various components of a system infrastructure for one or more utilities, also commonly referred to as "facilities." Facilities maps may be supplied by various facility owners and may indicate the geographic location of the facility lines (e.g., pipes, cables, and the like) owned and/or operated by the facility owner. For example, facilities maps may be supplied by the owner of the gas facilities, power facilities, telecommunications facilities, water and sewer facilities, and so on.

As indicated above, facilities maps may be provided in any of a variety of different formats. As facilities maps often are provided by facility owners of a given type of facility, typically a set of facilities maps includes a group of maps covering a particular geographic region and directed to showing a particular type of facility disposed/deployed throughout the geographic region. One facilities map of such a set of maps is sometimes referred to in the relevant arts as a "plat."

Perhaps the simplest form of facilities maps is a set of paper maps that cover a particular geographic region. In addition, some facilities maps may be provided in electronic form. An electronic facilities map may in some instances simply be an electronic conversion (i.e., a scan) of a paper facilities map that includes no other information (e.g., electronic information) describing the content of the map, other than what is printed on the paper maps. Alternatively, however, more sophisticated facilities maps also are available which include a variety of electronic information, including geographic information and other detailed information, regarding the contents of various features included in the maps. In particular, facilities maps may be formatted as geographic information system (GIS) map data, in which map features (e.g., facility lines and other features) are represented as shapes and/or lines, and the metadata that describes the geographic locations and types of map features is associated with the map features.

Examples of a wide variety of environmental landmarks and other features that may be represented in GIS facilities map data include, but are not limited to: landmarks relating to facilities such as pedestal boxes, utility poles, fire hydrants, manhole covers and the like; one or more architectural elements (e.g., buildings); and/or one or more traffic infrastructure elements (e.g., streets, intersections, curbs, ramps, bridges, tunnels, etc.). GIS facilities map data may also include various shapes or symbols indicating different environmental landmarks relating to facilities, architectural elements, and/or traffic infrastructure elements.

As noted above, one common technique for generating an engineering plan for an installation relating to a cable system (e.g., for television, telephone, and/or data communications) involves sending an engineer to a particular work site with one or more printed facilities maps (or "plats") that may include information such as existing streets and buildings, as well as existing utility features, such as telephone poles, transformer and junction boxes, electrical lines, sewer and water lines or valves, and so on in the geographic area including and proximate to the work site. Using the plat(s), the engineer may take notes either on the plat itself or on a separate paper regarding where and how each component of the cable system to be installed will be placed. Thereafter, the engineer (or a drafts person) may use the notes to prepare the engineering plan in the form of a computer-aided design (CAD) drawing (or other drawing in electronic form) that defines the details for the cable system installation. This engineering plan (which may include drawing elements as well as textual notes) can then be used for obtaining needed permits and approvals, as well as in a competitive bidding process, and ultimately actual installation of the cable system at the work site.

SUMMARY

As noted above, conventional techniques for generating engineering plans pursuant to visits by an engineer to a work site (e.g., in connection with a cable system installation) may employ a manual sketching process which results in the creation of a paper engineering plan. Applicants have recognized and appreciated that such paper plans produced by hand are often not to scale, incomplete, prone to human error, and costly in drafting time spent by the engineer. Furthermore, paper plans are not in a format that readily provides for subsequent creation of formal engineering drawings (e.g., CAD renderings), indexing, cataloguing or archiving, and easy searching, nor are they in a format that facilitates data analysis or interrogation in any mechanized or automated way.

In view of the foregoing, various embodiments of the present invention are directed to methods, apparatus and systems for facilitating generation and/or assessment of engineering plans in an electronic format. In various embodiments discussed in greater detail below, engineering plans in an electronic format also facilitate creation of a searchable electronic record (also referred to herein as a "site visit report") relating to a plan generation operation conducted by an engineer. In one aspect, a site visit report relating to a plan generation operation itself may include the electronically generated engineering plan.

In exemplary implementations, to form the electronic engineering plan, the geographic location of one or more elements of infrastructure to be installed at a work site, pursuant to the engineering/design process, is identified with respect to its immediate surroundings in the geographic area. To this end, one or more digital images relating to the geographic area including the work site may be utilized. For example, source data representing one or more digital images of a geographic area including the work site is received and/or processed (e.g., by a computing device) so that the image(s) may be displayed on a display device. The geographic location of one or more pieces of equipment relating to the infrastructure to be installed are then indicated in some manner on the displayed image(s) so as to generate one or more marked-up images constituting the engineering plan.

The inventors have recognized and appreciated that, in conventional scenarios relating to creation of engineering plans, it is not uncommon for an engineer to travel to a work site and generate information for an engineering plan, only to find out later that the engineer was not at precisely the right geographical location when creating the plan. As a result, the engineer may have to make another trip to the correct work site and perform his work again. In view of the foregoing, other aspects of various inventive embodiments disclosed herein relate to verifying that an engineer visits the correct work site as specified, for example, in a work order or other instructions provided to the engineer when dispatched to visit a work site and generate an engineering plan.

To this end, various embodiments of the invention, as will be described in more detail below, help to reduce geographic errors in connection with engineering plans by providing a unique tool for generating engineering plans (such as a handheld, computer-operated device, hereinafter referred to as a "plan generating tool") that an engineer can use to create an engineering plan at the work site, and which automatically verifies that the engineer is at the proper geographic location.

In one embodiment, a plan generating tool according to the present invention may display a map or other digital image of the work site (i.e., a "work site base image") along with the tool's current location on the base image. For example, the tool may display an aerial or similar image of a work site along with an icon or other graphical representation of the tool's current location. The engineer may interact with the display to generate the engineering plan, e.g., mark-up the image with symbols, icons or the like, and/or other hand-drawn and/or computer-generated information, to indicate the location at which infrastructure elements and equipment (i.e., referred to generally as "pieces of equipment") are to be installed, along with details regarding the equipment. For example, when indicating where a piece of equipment is to be installed at the work site, the engineer may select, via the plan generating tool, an icon or other representation of the equipment from a tool bar and place the icon on the displayed map to indicate the installation location for the equipment. The plan generating tool may store the marked-up image and other plan-related information regarding coordinates or other data representing the installation location, as well as the type of equipment and/or other details, as part of the generated engineering plan. The stored engineering plan information may then be provided, e.g., as part of a site visit report, that documents the plan generation operation performed by the engineer.

In another aspect of the invention, a plan generating tool according to various embodiments may provide automated input to the engineering plan generation process. For example, the tool may store information regarding particular plan requirements (e.g., pursuant to customer specifications, best-practices protocol, regulatory requirements, etc.), and provide and/or apply those requirements to assist the engineer in generating the engineering plan in the field. In one implementation specifically relating to cable system infrastructure, the plan generating tool may store information specifying a maximum distance between amplifiers or other cable system components/pieces of equipment. Thus, if the engineer indicates that a first amplifier should be installed at a particular location on a base image of the work site, and then carries the tool to another location at the work site that is equal to or greater than a distance from the first amplifier location (or merely marks on the work site base image another component at a distance from the first amplifier greater than the maximum distance), the tool may prompt the operator that a second amplifier should be installed or that the maximum permitted distance between respective amplifiers will be exceeded. Other assistance may be provided to the engineer as well, such as a prompt to include certain equipment based on a customer's request. For example, a customer may wish that amplifiers be enclosed within a particular type of box or other housing. Thus, upon an engineer indicating that an amplifier should be installed at a location, the tool may automatically indicate on the plan that a corresponding box or housing be also installed at the location. Other types of assistance that may be provided by the plan generating tool are discussed in greater detail below.

Other aspects of the invention, discussed in greater detail below, relate to methods and systems for providing one or more of the following:

Improving initial requests and/or work orders to generate an engineering plan (e.g., by including image information and/or geospatial metadata relating to the work site with an initial request or work order for the engineering plan);

Intelligently processing and assessing engineering plan requests/work orders (e.g., assessing work scope, risk, complexity, etc., and appropriately allocating available engineer resources);

Effectively and efficiently dispatching engineers or other technicians in response to requests/work orders (e.g., based on multi-day performance windows, shift information relating to available engineer resources, engineer skill set and history, job complexity, etc.);

Providing process guides or other plan generation assistance to engineers to facilitate engineering plan generation operations (e.g., locally displaying work order information on a plan generating tool used in the field, and/or providing checklists or workflows for performing steps in generating an engineering plan);

Acquiring information regarding the performance of engineering plan generation operations and their environs (e.g., via improved intelligent instrumentation employed by engineers) and/or generating electronic records of the plan generation process ("site visit records");

Assessing the quality (e.g., completeness, accuracy, efficiency) of the engineering plan whether during creation of the plan (e.g., in essentially real-time) and/or upon completion of the plan (e.g., via processing and analysis of site visit records);

Archiving information regarding engineering plan operations and quality assessments to facilitate auditing of same;

Communicating relevant information to one or more parties associated with engineering plan generation—in particular, apprising requesting parties of the status of ongoing plan creation, confirming with requesting parties that certain operations have been performed and are completed, and providing requesting parties and/or other interested parties (e.g., facility owners, regulators, auditors, damage investigators and assessors, etc.) with detailed information regarding the performance of the operation and a quality assessment of same;

Providing information related to billing, time or other estimates in generating the plan; and Enabling facility owners, utility installation contractors, one-call centers, and/or others to comply with any applicable reporting requirements regarding their respective activities, facilities, and/or geographic areas under their jurisdiction.

In some embodiments, an engineering plan generating tool according to the present invention may receive a work order that includes text information describing a work site, from which the tool automatically may obtain image data relating to the work site. For example, the work order may include geographic information indicating the location of the work site, and may provide a description specifying the extent/metes and bounds of the work site. Examples of geographic information relating to the work site that may be provided in a work order include, but are not limited to, alphanumeric information designating a street address, street intersection, geographic region or other map information (e.g., designating one or more particular map grids or grid coordinates of one or more facilities maps), as well as one or more GPS latitude/longitude coordinate pairs representing a location and/or extent of the work site. Based on various types of geographic information provided in a primarily or exclusively text-based work order, the plan generating tool may process this geographic information to access and/or facilitate display of appropriate image data relating to the work site.

In yet other embodiments, the tool may receive a work order that includes image data along with optional non-image data/information for a work site.

The plan generating tool may permit a user/engineer to utilize this image data as a work site base image, upon which the engineer may make various mark-ups via the tool to create an engineering plan. The image data may include satellite or other aerial images of the work site, images captured using a camera at ground level (whether by the tool or other device), historic or current map information, facilities map information, landmark location information, and other data. The plan generating tool may be able to acquire geo-location data relating to its current location (e.g., by GPS, inertial navigation, user input, physical landmarks, and/or combinations of these) so that the relative location of the tool, as well as the new engineered system equipment and/or other pre-existing equipment or other features, can be indicated on the image display of the engineering plan.

Further, one or both of a user interface and a communication interface of such a plan generating tool may serve as conduits for receiving various information relating to the generation of an engineering plan. For example, as discussed above, work order information may be received via the communication interface, and/or entered in via a user interface, and such information may also be logged into an electronic record, or "site visit report," of the plan generation operation. Other graphic or text-based information regarding the plan generation may also be provided by the engineer and/or as part of the site visit report, such as a date and timestamp for the work site visit(s), geographic location/geo-coordinates of the work site, identifier(s) for the plan engineer, facility owner(s), and/or the engineering company, etc.

In some embodiments, the non-image data in a work order may include a process guide or other assistance information that may help facilitate generation of the engineering plan using the plan generating tool. For example, a work order (or portions of a work order) may be displayed by the plan generating tool and the engineer may provide input to generate an electronic record or log of engineer activity during the plan generation process (i.e., a site visit report). In one embodiment, a process guide in the form of a checklist and/or recommended additions to the plan may be generated (e.g., based at least in part on the work order), either at a remote computer and then downloaded to the plan generation tool, or generated at the tool itself, and displayed locally to the engineer as a guide to perform and verify various aspects of the plan generation process. In another implementation, a set of instructions or "workflow" may be provided to guide the engineer through a sequence of steps to generate the plan. Performance via a process guide (e.g., checklist or workflow) may be interactive in that the engineer may provide input, or automated/semi-automated by analyzing various information collected by the plan generating tool.

In some embodiments, as noted above, the plan generating tool may generate a "site visit report" that documents the plan generation process by the engineer using the plan generation tool. The site visit report may include various information including, but not limited to, a marked-up map or work site base image on which the engineer has indicated where various equipment or components of system infrastructure are to be deployed/installed (i.e., the electronic engineering plan), information regarding located utilities or other features at the work site, information regarding physical marking of the work site (e.g., to identify the location of equipment/infrastructure components to be installed), work site image data (such as images captured by the engineer at the work site), a record of physical locations at which the plan generating tool was positioned at the work site (e.g., obtained by GPS, inertial navigation, and so on), information regarding tasks completed or tasks remaining to be completed for the work order, and others.

In another aspect, a site visit report may be reviewed, in essentially real-time during engineering plan generation, and/or at any time following plan generation, to provide a quality assessment (e.g., an assessment of the completeness, accuracy, and/or efficiency) of the plan generation operation. Quality assessment techniques according to various embodiments may be primarily under the discretion of a human reviewer, albeit facilitated in some respects by computer-aided display of information, and electronic record keeping and communication functions associated with the quality assessment result(s). In other embodiments, a site visit report documenting a plan generation operation is electronically analyzed such that a quality assessment is based at least in part on some predetermined criteria and/or metrics that facilitate an automated determination of quality assessment. In one aspect, if the plan generation operation represented by the site visit report complies with a predetermined quality standard (e.g., based on predetermined criteria and/or metrics), the operation may be "approved" (e.g., a quality assessment process/engine may generate an "approved" report). In another aspect, real-time quality assessment during performance of a plan generation operation may facilitate identification of risks or problems that may be flagged for proactive corrective action (e.g., immediately, or as soon as practicable).

In sum, one embodiment of the invention is directed to an apparatus for facilitating generation of an engineering plan for installation of equipment at a work site. The apparatus comprises: a communication interface; a display device; a user input device; a memory to store controller-executable instructions; and a controller coupled to the communication interface, the display device, the user input device, and the memory. Upon execution of the controller-executable instructions by the controller, the controller: A) controls the user input device and/or the communication interface to receive first geographic information relating to a first location of the work site; B) compares the first geographic information relating to the work site to second geographic information representing a second location of the apparatus to verify that the apparatus is sufficiently near to the work site; C) controls the display device to display a digital image of a geographic area including the work site; D) acquires user input from the user input device, the user input relating to at least one first position, relative to the displayed digital image, representing a first equipment location of at least a first piece of the equipment to be installed at the work site; E) controls the display device so as to generate a marked-up digital image including at least one first digital representation of the first piece of the equipment placed on the displayed digital image, based at least in part on the user input; and F) controls the communication interface and/or the memory to electronically transmit and/or electronically store information relating to the marked-up digital image so as to generate the engineering plan.

Another embodiment is directed to a method for generating an engineering plan for the installation of equipment at a work site. The method comprises: providing a work order that indicates at least a work site for the engineering plan; verifying during engineering plan generation that a mobile plan generating tool operated by an engineer is sufficiently near to the work site; storing information regarding a location of the plan generating tool in relation to the work site; displaying an image on the plan generating tool representing the work site; receiving information, at the plan generating tool while at the work site, regarding equipment to be installed at the work site; determining a location on the displayed image that corresponds to a location at the work site where the equipment is to be installed; and storing information regarding the location on the displayed image regarding where the equipment is to be installed.

U.S. publication no. 2010-0228588-A1, published Sep. 9, 2010, corresponding to U.S. non-provisional application Ser. No. 12/704,485, filed Feb. 11, 2010, and entitled "Management System, and Associated Methods and Apparatus, for Providing Improved Visibility, Quality Control and Audit Capability for Underground Facility Locate and/or Marking Operations," is hereby incorporated herein by reference in its entirety.

U.S. publication no. 2011-0007076-A1, published Jan. 13, 2011, corresponding to U.S. non-provisional application Ser. No. 12/831,330, filed Jul. 7, 2010, and entitled, "Methods, Apparatus and Systems for Generating Searchable Electronic Records of Underground Facility Locate and/or Marking Operations," is hereby incorporated herein by reference in its entirety.

U.S. publication no. 2009-0327024-A1, published Dec. 31, 2009, corresponding to U.S. non-provisional application Ser. No. 12/493,109, filed Jun. 26, 2009, and entitled "Methods and Apparatus for Quality Assessment of a Field Service Operation," is hereby incorporated herein by reference in its entirety.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The present disclosure, both as to its organization and manner of operation, together with further objectives and advantages, may be best understood by reference to the following description, taken in connection with the accompanying drawings as set forth below. The drawings are not necessarily to scale, emphasis instead generally being placed upon illustrating the principles of various inventive embodiments.

FIG. 3B illustrates an example of a work order, pursuant to which an engineering plan may be generated according to one embodiment of the present invention;

DETAILED DESCRIPTION

Figure 1:
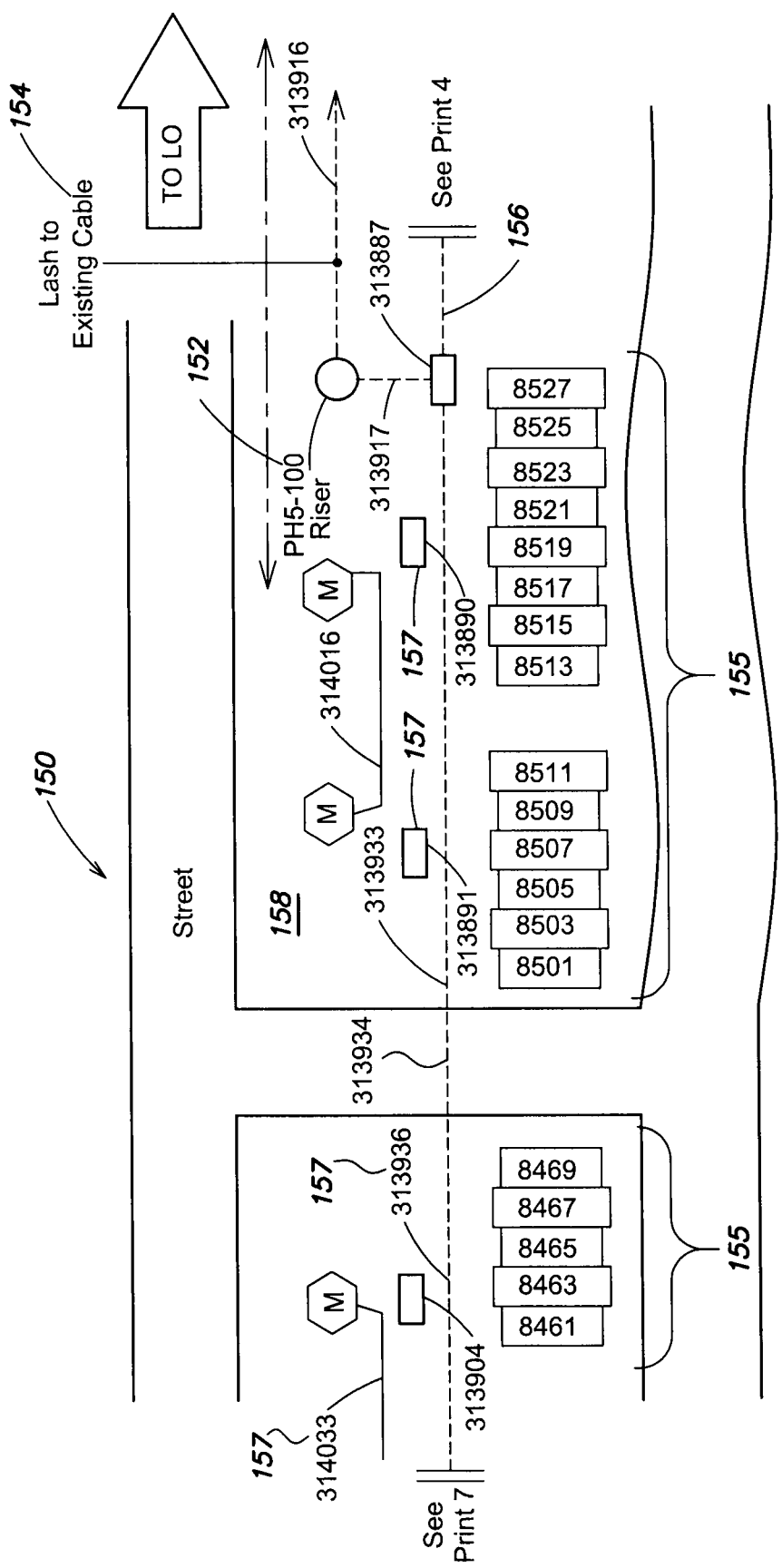
FIG. 1 shows an example of an electronic engineering plan generated for a work site, according to one embodiment of the present invention.

Various embodiments of the present invention relate to facilitating electronic generation of engineering plans pertaining to installation of utility infrastructure, and assessment of an engineering plan generation operation performed by an engineer at a work site.

In various inventive aspects, the present disclosure contemplates a management system, an engineering plan generating tool, and associated methods and apparatus, for providing increased efficiency, visibility, improved quality control, proof of compliance and/or significant audit capability for engineering plan generation operations. Such systems, methods and apparatus in some instances employ improved instrumentation for performing plan generation operations to facilitate data acquisition, storage and analysis, as well as an improved communication infrastructure amongst various parties/entities with interest in, or otherwise related to, engineering plan generation and use. Example of such parties/entities include, but are not limited to, excavators and infrastructure installation contractors, property owners, municipalities, facility owners, regulatory authorities, inspectors, industry associations (e.g., industry consortia or alliances), insurance companies, damage investigators (assessors/adjustors), and auditors.

In particular, engineering plan generation management systems and associated methods and apparatus according to various embodiments disclosed herein provide communication infrastructure, software applications and computing devices, and various instruments for providing assistance, oversight and/or quality control across all or many aspects of an engineering plan generation operation. Methods and apparatus disclosed herein encompass a broad management process associated with such operations, including, but not limited to, one or more of: 1) submission of an engineering plan request; 2) generation of a work order based on the plan request, and transmission of the work order to various parties (engineers, utility owners, municipalities overseeing engineering plan generation operations in their jurisdiction, etc.); 3) assessment of work orders to appropriately allocate engineer resources; 4) dispatching of engineers to perform plan generation operations pursuant to the work order; 5) provision of process guides and/or locally displayed information to facilitate engineer generation of a plan; 6) acquisition of various information in connection with performance of plan generation operations (and providing such information in conjunction with, or as part of, a site visit report); 7) quality assessment of operations (e.g., by processing site visit reports); 8) archiving of information relating to the plan generation operations and/or assessment of same (e.g., archiving site visit reports and analysis of same); and 9) communication of relevant information to one or more parties associated with the operations (e.g., apprising parties requesting an engineering plan of the status of the process and/or various information germane to performance). In various exemplary implementations, one or more steps of the management process utilize automated applications and instruments for electronically documenting the work performed, processing and/or analyzing the electronic information, and verifying the work performed.

I. Overview of Electronic Engineering Plans and Plan Generation Tool

Electronic engineering plans generated in accordance with various embodiments of the present invention may include one or both of graphic and text components that describe how, and what type of, equipment relating to a communications/utility infrastructure is to be installed at a work site (and in some instances other work that is to be done at the work site).

FIG. 1 shows an illustrative image of an engineering plan 150 that may be generated electronically according to various embodiments of the present invention. It should be appreciated that aspects of the invention should not necessarily be limited to the type, arrangement or other aspects of the plan 150 shown in FIG. 1. Rather, FIG. 1 is only intended to be illustrative; in particular, although the engineering plan 150 of FIG. 1 relates to a fiber optic cable installation, an engineering plan generated in accordance with the inventive concepts discussed herein may relate to other types of engineered systems, examples of which include, but are not limited to, various communications and utility infrastructure (e.g., water, electric, gas, sewer, telephone, computer/data networks).

The example engineering plan 150 of FIG. 1 depicts an illustrative fiber optic cable installation 156 to be made at a work site 158 that includes several condominium units 155. The engineering plan 150 substantially comprises a marked-up digital image of a work site, wherein the marked-up image includes various details relating to installation of equipment constituting fiber optic cable infrastructure, as well as existing structural/environmental features at the work site (sometimes referred to as "landmarks"). For example, as shown in FIG. 1, the engineering plan 150 includes an identification number 152 for an existing utility pole (i.e., pole number PH5-100 in the upper right of the image), instructions 154 for installation of fiber optic cable (e.g., that the new fiber optic cable is to be lashed to an existing cable hung from pole number PH5-100), and the locations at which various pieces of equipment 157 are to be installed at the work site. In this illustrative embodiment, pieces of equipment 157 or equipment portions are identified by a six digit number, such as "313916." For this particular plan, the six digit number can be cross-referenced against a textual listing (not shown) that identifies important information for the equipment, such as the size, shape, material, functional capabilities, installation details, and so on, for a corresponding piece of equipment. For example, the junction box identified by "313887" in this plan may have a size of 36 inches by 36 inches and be arranged to house a suitable hub for accommodating the cable feeds extending from the box. This information may be provided in a separate printed paper listing, or computerized display that complements the plan drawing of FIG. 1 (as discussed further below in connection with FIG. 6; e.g., see legend 21 in FIG. 6). In exemplary implementations, locations at which equipment is to be installed may be represented by dimension lines, geographic coordinates, vector coordinates, distances from one or more landmarks (such as an existing electrical transformer platform and sewer manhole), and others. The plan may also be prepared so as to be to scale, or not, as desired.

The electronic engineering plan 150 shown in FIG. 1 may employ any suitable format for the electronic information underlying the plan, such as commonly used computer aided drafting (CAD) formats, bitmap or other image formats. Portions of a plan in electronic format may be linked to other data sources so that a user/engineer can more easily access desired information. For example, the plan 150 of FIG. 1 may be viewed on a computer screen and arranged so that if a user/engineer moves a cursor over one of the six digit codes representing a piece of equipment 157, details regarding the corresponding equipment, such as its size, shape, cost and/or other characteristics, may be displayed (e.g., overlaid or superimposed, or illustrated in a dedicated window) on the image. Such selection of a number code or other feature on a plan drawing may also cause other information to be displayed, such as another drawing that shows details regarding the orientation, depth in the ground, distance of the equipment from one or more landmarks, or other arrangement for the equipment when installed, for example. Of course, such information may be provided in more conventional ways, such as listing the information on the plan itself, and/or on supplemental drawing sheets.

To prepare an engineering plan 150 like that shown in FIG. 1, according to one embodiment, an engineer may visit the work site and utilize a plan generating tool (e.g., a particularly-programmed portable computing device including one or more processors, storage devices, communication interfaces, display devices, input/output ports, user interfaces, etc.). Further details of such a plan generating tool are discussed below in connection with FIGS. 3-15. In general, using such a plan generating tool at the work site, the engineer may have displayed to them one or more digital images of the work site (referred to herein as "work site base image(s)") that are representative of the work site. Using various drawing and annotation resources provided by the plan generating tool (and in some cases accessed via one or more user interfaces/user input devices associated with the plan generating tool), the engineer marks-up the work site base image, while at the work site, to indicate various components (pieces of equipment) of infrastructure to be installed. For example, the work site base image may be displayed on a touch-type computer display screen of the plan generating tool that allows the engineer to make handwritten notes and graphics on the base image, to select and place on the displayed image one or more icons or other symbols representing equipment to be installed, to indicate the location of pre-existing utilities or landmarks, and so on.

As discussed in greater detail below, the work site base image(s) that are marked-up by the engineer to generate the engineering plan may be any of a variety of image types and/or be provided in any suitable way (e.g., facilities maps, street maps, architectural drawings, photographs, aerial/satellite images, etc.). For example, in some instances, a base image may be provided as a scanned hand drawing (e.g., an engineer may hand sketch an image of a work site including landmarks such as buildings, trees, existing utility poles, etc.), a scanned image of a printed plat of the work site, a CAD drawing of the work site, an aerial or other camera image of the work site, and so on. The image(s) may include any suitable information, examples of which include but are not limited to, one or more buildings, natural or man-made landmarks, property boundaries, streets/intersections, public works or facilities such as existing street lighting, signage, fire hydrants, mail boxes, parking meters, and underground facilities (e.g., gas lines, power lines, telephone, cable, fiber optics, water, sewer, drainage). Such images may present some or all information to scale, or may not be to scale with respect to any features. Also, different pieces of image information can be combined (e.g., overlaid or superimposed) to provide a composite image serving as a work site base image. For example, an aerial image of a work site may be overlaid with a utility plat (facilities map) so that the work site base image may indicate existing landmarks such as trees and buildings, as well as existing utility infrastructure, such as water lines, gas lines, electric lines, and so on.

Figure 2:
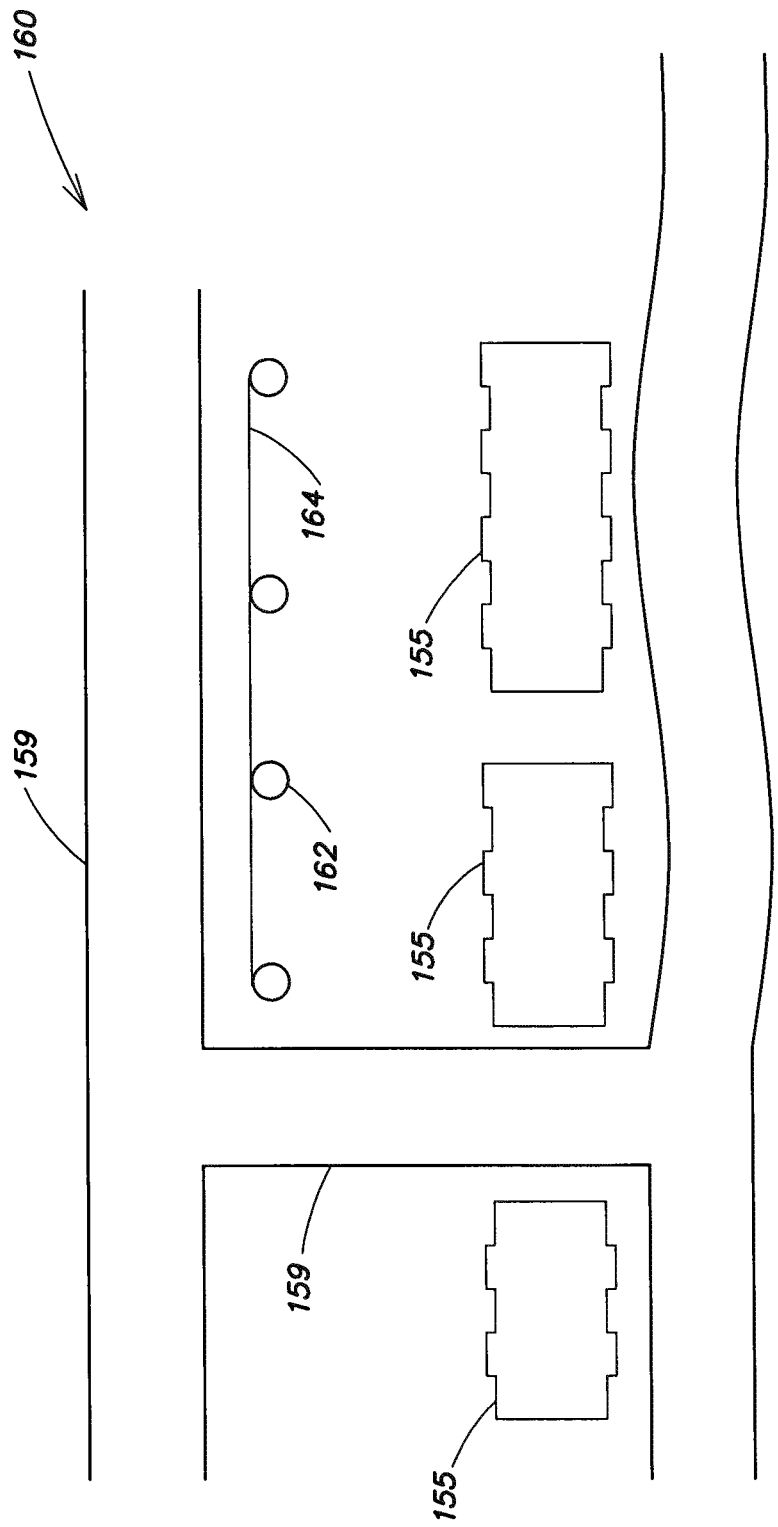
FIG. 2 shows an example of a work site base image upon which the engineering plan shown in FIG. 1 is generated.

FIG. 2 shows an example of a work site base image 160, upon which an engineering plan similar to the engineering plan 150 shown in FIG. 1 may be generated using a plan generating tool, according to one embodiment of the present invention. The work site base image 160 of FIG. 2 provides an example in which first information from an aerial or camera image showing existing buildings (e.g., condominiums 155) and streets 159 is combined with second information from one or more facilities maps that shows existing utility poles 162 and power and/or cable lines 164. In one embodiment, as part of a plan generation operation, the engineer may maintain all or only some of the features contained in the work site base image as part of a final engineering plan; for example, in marking-up a base image to include one or more pieces of equipment relating to infrastructure to be installed, the engineer also may choose to delete one or more features from the base image (that may in some manner obfuscate or not significantly pertain to the infrastructure to be installed). The ability to process and/or alter one or more aspects of work site base images to facilitate generation of engineering plans is discussed in greater detail below (see Section II.F).

Again, it should be appreciated that the work site base image shown in FIG. 2 is provided primarily for purposes of illustration, and that work site base images according to various embodiments of the present invention are not limited to the example shown in FIG. 2.

Figure 3A:
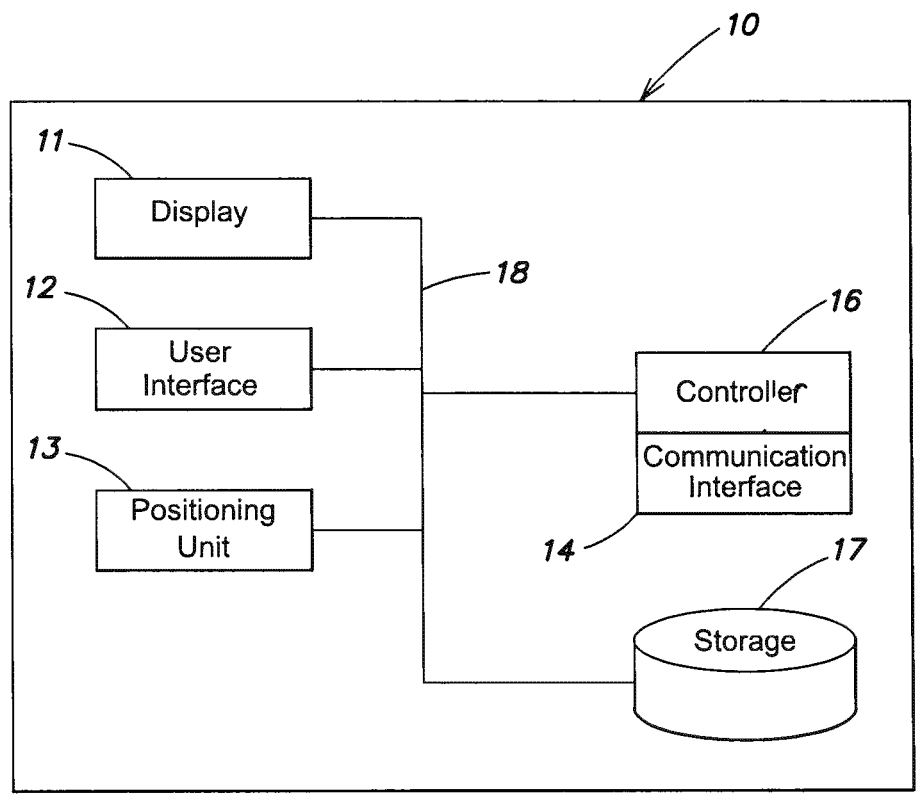
FIG. 3A is a block diagram of an engineering plan generating tool according to one embodiment of the present invention.

FIG. 3A is a block diagram of a plan generating tool 10 according to one embodiment of the present invention. In one implementation, the tool 10 may be a mobile and/or handheld device with a form factor that is similar to a tablet computer, laptop computer, or other similar device having a display screen and a user interface that permits a user (e.g., an engineer) to interact with the tool 10 regarding an image presented on the display. Thus, the tool 10 comprises a display device 11, such as a liquid crystal display (LCD), an electrophoretic display, or other device capable of presenting image information to a user. The display device 11 may be light emitting (like many LCD's), and/or may be visible using reflected ambient light. The tool also comprises one or more user interfaces 12, which may be arranged to receive input from a user as well as provide output to the user, such as by displaying information on the display device 11, providing a audible signal (such as synthesized voice) to the user via a speaker, illuminating one or more lights or other visible devices, printing text or graphics onto paper, and so on. The user interface 12 may include a touch screen or similar device that is associated with the display device 11 so that a user can physically interact with the displayed image to provide input to the user interface 12. For example, the user interface 12 may permit a user to draw on a displayed image using a stylus, finger or other object, e.g., to create written text or graphics that are part of an engineering plan. The user interface 12 may include other devices to receive user input, including a keyboard, a keypad, a touchpad, a mouse or other pointing device, a voice recognition system, a graphical user interface, a camera, a microphone, a printer, a communications interface, one or more buttons, switches, dials, sliders, and so on. In some embodiments, the user interface 12 may include a device that monitors a condition of the user, such as eye movement, brain activity, or heart rate so as to generate or otherwise receive user input. The condition information may be used to assess the reliability of the user inputs that are used to generate the marked-up image or other aspects of the engineering plan. For example, if the monitored heart rate of the user is sufficiently high as to indicate that the user is under stress, the reliability of the user inputs may be assessed as poor. In short, the user interface 12 may include any suitable hardware, software and/or other components to provide information to a user and receive information from a user.

The tool 10 may also include a positioning unit 13 that the tool 10 can use to determine its current location and/or the location of another object at a work site. For example, the positioning unit 13 may include a global positioning system (GPS) unit, a global navigation satellite system (GNSS) receiver, an inertial navigation unit, a WiFi-based positioning system (such as that supported by Skyhook Wireless), a cell phone-based positioning system or other arrangement that uses triangulation and/or known transmitter/receiver location to determine a wireless device's position, a special purpose local positioning system (such as a system that uses radio frequency tags and one or more interrogators that determine tag location based on triangulation, signal time of flight, etc.), and so on. The positioning unit 13 may alternately, or in addition, be arranged to exploit the known position of an existing landmark or other component to determine the tool's location. For example, the positioning unit 13 may have an optical or acoustic rangefinding system that is used to determine a distance from (and/or bearing to) a landmark, such as a fire hydrant or telephone pole, and thus determine the tool's position. In another embodiment, the positioning system 13 may receive information about the tool's (or another object's) current position from another device. For example, the tool 10 may communicate (e.g., wirelessly via Bluetooth) with a GPS-enabled cell phone, a surveying staff, or other device, which relays the device's current position to the tool 10. The tool 10 may use this position as its own position, or use the information to determine the tool's position. In some embodiments, the positioning unit 13 may determine the tool's 10 location to within about thirty centimeters or less.

Via a bus 18, a controller 16 may communicate with the various components of the plan generating tool 10 and control the operation of the components as well as provide other functions or services, such as wired or wireless communications, electrical power, data processing, image capture (whether still or video), memory management, and so on (the bus 18 may also include a path that permits communication among other components of the tool 10, provides power to components, or otherwise provides a connection between components of the tool 10). Thus, the controller 16 may include components such as a programmed computer, a processor, a microprocessor, processing logic or other data processor (or an array of computers or processors), and may further include local computer-readable memory to store software code or other computer-executable instructions for controlling operation of one or more components, communication busses and interfaces, a still and/or video camera, one or more sensors, actuators, relays, switches, a power supply, and/or other suitable components. A communication interface 14 included with the controller 16 may include any transceiver-like mechanism that enables the tool 10 to communicate with other devices and/or systems. For example, the communication interface may include mechanisms for communicating with another device or system via a network, such as the Internet, a LAN or WLAN, a PAN, and so on.

The tool 10 may also include non-transient computer-readable storage 17, such as one or more floppy discs, compact discs, optical discs, magnetic tapes, flash memories, random access memory (RAM), a read only memory (ROM), a memory card, a magnetic and/or optical recording medium, circuit configurations in Field Programmable Gate Arrays or other semiconductor devices, or other volatile or non-volatile memories. The computer readable medium or media can be transportable, such that a program or programs stored thereon can be loaded onto one or more different computers or other processors to implement various aspects of the present invention as discussed above. The storage 17 may be used to store any suitable information, such as software code or other instructions used by the controller 16 or other components of the tool 10, image data used to display an image of a work site, work orders, site visit reports, and so on.

II. Generating Engineering Plans

A. Work Orders

To initiate a process of generating an engineering plan according to one embodiment of the present invention, a work order may be issued that indicates at least a work site for which the plan is to be generated. A work order may have a variety of content and formats, and may be issued in paper form or electronic form. In some instances, the work order may be as simple as an email or other electronic message received at the tool 10 or some other device (e.g., an engineer's telecommunication device) that indicates that a plan is to be created for a particular work site. Generally speaking, a work order or other request for an engineer to visit a work site to generate an engineering plan includes some type of geographic information relating to the work site so as to identify the work site to the engineer; for example, the work site may be geographically identified by one or more of an address, a set of coordinates (e.g., map grid coordinates; GPS latitude/longitude coordinates), a plat or plot number, and a facility name, for example.

In some embodiments, a work order may be created by an engineer using the tool 10. For example, at the start of an engineering plan process, the engineer may receive a phone call asking the engineer to travel to a particular location. Once at the location, the engineer may learn that s/he is being requested to generate an engineering plan for a particular type of system at the work site (and perhaps be given other details relating to the work project). In response, the engineer may create a work order (using the tool 10) that specifies the work site location, the type of engineered system the plan will relate to, and/or other specifics regarding the requested engineering plan. In other embodiments, a work order may be created by someone other than the engineer (such as a manager), and the work order may be sent to a plan generating tool 10 for an engineer that is requested to generate the requested plan.

A work order may be arranged as a database record, or set or related records, as any other suitable computer readable file or set of files, as an electronic communication (such as email or text message). The work order may include other suitable information, such as information regarding work scope (particulars regarding equipment to be installed and/or results to be achieved), duration (amount of time estimated to be needed to complete the plan), risk (potential liability for damages), business value (penalty and/or profitability), as well as information relating to engineer resources (e.g., shift information, engineer skill set and history, certification requirements or security clearance for the plan, the identity of an engineer or set of engineers to work on the plan, etc.) so that a manager can allocate, schedule, and appropriately dispatch one or more engineers to create the plan pursuant to the work order.

Figure 3B:
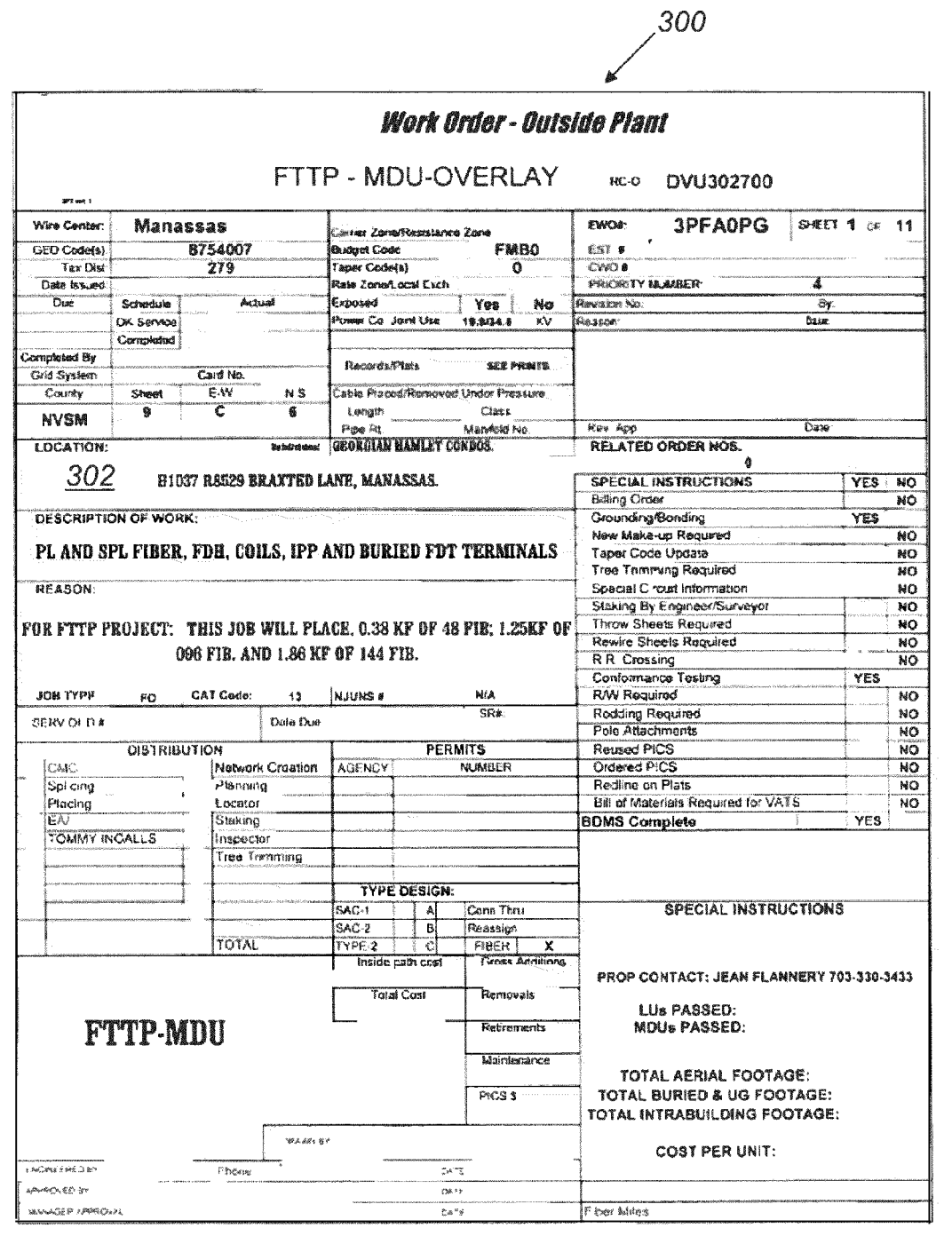

FIG. 3B illustrates an example of a work order 300 relating to generation of an engineering plan for a "fiber to the premises" (FTTP) cable system installation for multiple "dwelling units" (MDUs), similar to that shown in FIG. 1. The work order 300 includes a location field 302 that provides geographic information relating to the work site in the form of an address and a condominium subdivision indication. The work order also include a number of other fields relating to a description of the work to be covered by the requested engineering plan, special instructions, parts requirements, and cost estimates (some of which may be completed/filled-in by the engineer upon generation of the engineering plan pursuant to a site visit).

It should be appreciated that the work order 300 shown in FIG. 3B is provided primarily for purposes of illustration, and that other types of work orders, having a variety of content and formats, are contemplated by the disclosure herein. Additional details of work order generation, content, and format are discussed below in Section V, in connection with FIG. 16.

B. Location Verification

Pursuant to a work order (or other similar request), an engineer (or other technician) may be dispatched/travel to the work site and use a plan generating tool 10 to generate an engineering plan. All or portions of a work order may be provided to the tool 10 (e.g., by electronic communication) or to another device, such as a cell phone, PDA or other device used by the engineer. If the engineer themselves did not receive the initial engineering plan request, the engineer may review the work order to determine details regarding the work the engineer is being requested to perform. For example, by reviewing the work order, the engineer may identify the work site and, if necessary, travel to the site as part of the engineering plan generation operation (as discussed above, an engineer may receive a request to generate a plan separate from a work order and later generate the work order, e.g., while at a work site; in such a case, the engineer need not necessarily refer to a work order to determine a work site location and/or other details regarding a plan to be generated by the engineer).

In some cases, engineers have been known to generate engineering plans for the wrong work site location. This can result for various reasons, including a simple mistake, such as reading the address "110 Main St." for a work site as "100 Main St." As noted above, generally it may be desirable to have the engineer actually generate the engineering plan while at the work site as opposed to some other location; in this manner, the engineer may create a more accurate or complete engineering plan while at the work site as opposed to at an office after having only visited the site.

To help ensure that the engineer generates the engineering plan while in the correct geographic area (e.g., at the work site), the tool 10 may verify that the tool 10 (and thus presumably the engineer) is located at the work site. The tool 10 may verify its location relative to the work site by comparing geographic information relating to the work site (as provided, for example, by the work order) and the geographic location of the tool 10 as determined by the positioning unit 13. Such a comparison may involve, for example, comparing GPS coordinates for the tool's current geographic location to coordinates for the work site. Other techniques may be used to verify the tool's location relative to the work site, such as by using the tool's GPS coordinates to look up a corresponding street address, and comparing the corresponding street address to an address for the work site (as provided, for example, by the work order).

With reference again to FIG. 3A, the controller 16 of the plan generating tool 10 (e.g., executing appropriate instructions stored in storage 17 and/or locally at controller 16) may compare geographic information relating to the work site and the geographic location of the tool to verify that that the tool is sufficiently near to the work site. A variety of criteria may be employed by the controller of the tool to determine sufficient proximity of the tool to the work site (e.g., the tool is within some specified threshold distance from a representative point at the work site), as discussed in greater detail below.

In another embodiment, the tool 10 may communicate with a radio frequency tag or other device that is fixed in place at the work site so as to verify that the tool 10 is at the work site. In yet another embodiment, the tool 10 may use an image analysis technique that compares an image captured by the tool 10 at the work site to a stored image that is known to correspond to the work site (the images may be of a landmark at the work site, such as a number plate on a telephone pole, a surveyor's marker, a building, or other object). If a suitable match is identified, the tool 10 may determine that it is properly located at the work site.

Pursuant to any of a variety of techniques (such as those described immediately above) to verify location of the tool vis a vis the work site, in some embodiments the tool may be configured to only allow use of the tool to create an engineering plan if the location of the tool sufficiently matches the location of the work site (as specified, for example, in a work order or other request to generate an engineering plan).

In some embodiments, a location verification process (e.g., performed by the controller 16 of the plan generating tool 10) based on a geo-location of the work site may be accomplished by comparing geographic location data (e.g., latitude and longitude coordinates) associated with the engineer's whereabouts (e.g., from a location tracking device on the person or in the vicinity of the engineer) to the geographic location data of the work site specified in the work order, and determining whether these geographic locations are within some predetermined distance (i.e., a "threshold distance") of each other. A variety of values for the threshold distance may be used as a metric for such a location verification; for example, in various embodiments, the threshold distance may be on the order of tens of feet, hundreds of feet, or more as may be appropriate in different circumstances. According to various aspects, the geographic location data associated with the engineer's whereabouts and the geographic location data of the work site specified in the work order may each be obtained in a variety of manners.

For example, in some embodiments, data corresponding to three different geographic locations may be obtained, and each may be compared to the other two to verify that they are all within the threshold distance of each other. In one embodiment, these three different geographic locations are: (1) the work site at which the engineering plan generation operation was requested to be performed (e.g., as provided in the work order); (2) the geographic location at which the engineer actually uses a plan generating tool to generate an engineering plan (e.g., presumably on-site or sufficiently close to the work site); (3) the centroid of a work site base image used to generate the engineering plan in (2) (e.g., see FIG. 2, discussed above).

These three geographic locations may be useful in verifying that the engineer performed the engineering plan generation operation at the appropriate work site, as they may be used to verify that the engineer started and completed the engineering plan at the work site specified in the work order, and not some other location.

In some embodiments, the first data for the geographic location of the work site at which the engineering plan generation operation was requested to be performed may be obtained directly from the work order for the engineering plan generation operation. As discussed above, the format of and extent of information included in a work order may vary depending on the state in which the work order is generated. Some work orders may include geographic location data (e.g., latitude and longitude coordinates) indicative of the work site at which the engineering plan generation operation is to be performed. When this information is provided in the work order, it may be obtained directly from the work order (e.g., the controller 16 of the plan generating tool 10 may be appropriately programmed to process/parse the work order to extract relevant information) as first data for use in location verification. Some work orders may not include latitude and longitude information, but may include a street address (e.g., 123 Main St., Anywhere, USA) at which the engineering plan generation operation is requested to be performed. For such work orders, the latitude and longitude coordinates may be obtained by geo-coding the address provided in the work order. Such geo-coding may be performed in any suitable way by any suitable entity. For example, the address may be extracted from the work order and geo-coded by the plan generating tool 10 (as discussed in greater detail below in connection with FIGS. 4 and 5) or may be geo-coded by some other entity, such that the latitude and longitude coordinates are provided to the plan generating tool without the tool having to perform the geo-coding.

Second data for the geographic location at which the engineer completed the engineering plan may be obtained in any suitable way. In some embodiments, as discussed above in connection with FIG. 3A, the plan generating tool 10 itself may include a positioning unit 13 or may be otherwise equipped or may have access to a global navigation satellite system (GNSS) receiver (e.g., a global positioning system (GPS) receiver). Thus, in such embodiments, the plan generating tool itself provides the second data representing the geographic location at which the engineer performs the plan generation operation.

In some embodiments, the plan generating tool 10 may also obtain third geographic location data representing the centroid of the work site base image used for creating an engineering plan. For example, when an engineer utilizes the tool to begin creation of an engineering plan (as discussed in greater detail below), the tool 10 may determine its current location from the positioning unit 13 or other GNSS receiver, and may automatically obtain a work site base image of the current location. The data (latitude and longitude coordinates) representing the geographic location of the centroid of this image further may be recorded as part of the engineering plan.

Figure 3C:
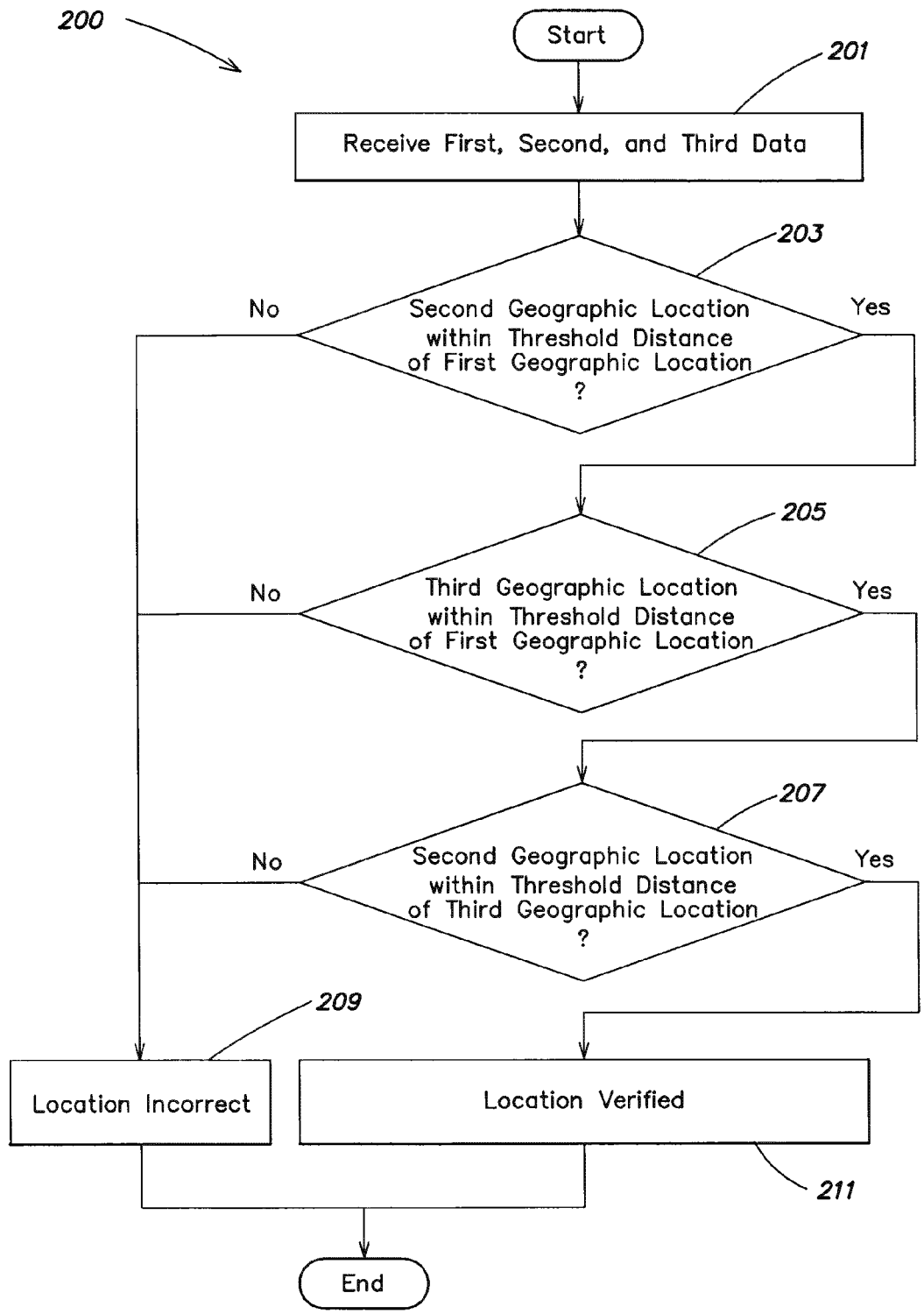
FIG. 3C is a flow chart illustrating a location verification process to determine an engineer's location with respect to a work site while using the engineering plan generating tool of FIG. 3A, according to one embodiment of the present invention.

Using the above-identified first, second, and third data respectively representing three geographic locations, the controller 16 of the plan generating tool 10 may execute a location verification application (e.g., stored in local memory of the controller 16, and/or in storage 17 of the plan generating tool 10). FIG. 3C shows an illustrative process 200 that the location verification application may perform to use this information to automatically verify the location of the engineer at the appropriate work site. The process begins at block 201, where the location verification application receives the above-discussed first, second, and third data. The process next continues to block 203, where the location verification application compares the first data indicative of the geographic location of the work site at which the engineering plan generation operation was requested to be performed to the second data indicative of the geographic location at which the engineer conducted the engineering plan generation operation and determines whether these two geographic locations are within the threshold distance of each other. If, at block 203, the location verification application determines that these two geographic locations are not within the threshold distance of each other, the process continues to block 209, where the location of the engineer is indicated as incorrect. If however, at block 203, the location verification application determines that these two geographic locations are within the threshold distance of each other, the process continues to block 205.

At block 205, the location verification application compares the first data indicative of the geographic location of the work site at which the engineering plan generation operation was requested to be performed to the third data indicative of the geographic location of the centroid of the work site base image for creating an engineering plan, and determines whether these two geographic locations are within the threshold distance of each other. If, at block 205, the location verification application determines that these two geographic locations are not within the threshold distance of each other, the process continues to block 209, where again the location of the engineer is indicated as incorrect. If however, at block 205, the location verification application determines that these two geographic locations are within the threshold distance of each other, the process continues to block 207.

At block 207, the second data indicative of the geographic location at which the engineer conducted the engineering plan generation operation may be compared to the third data indicative of the geographic location of the centroid of the work site base image and may determine whether these two geographic locations are within the threshold distance of each other. If, at block 207, the location verification application determines that these two geographic locations are not within the threshold distance of each other, the process continues to block 209, where the location of the engineer is indicated as incorrect. If however, at block 207, the location verification application determines that these two geographic locations are within the threshold distance of each other, the process continues to block 211, where the location verification application automatically verifies that the engineer is at the correct location.

In the example of FIG. 3C, if it is determined that the two geographic locations compared in each of the three comparisons (i.e., the comparisons at blocks 203, 205, and 207) are within the threshold distance of each other, then the location of the engineer may be automatically verified as correct, and if any one of these comparisons fails (i.e., the two geographic locations are not within the threshold distance of each other), the engineer's location is deemed to be incorrect.

However, the process outlined in FIG. 3C provides only one example of how an engineer's location may be verified vis a vis the work site. For example, in some embodiments, if it is determined that the two geographic locations compared in at least two of the three comparisons are within the threshold distance of each other, then the engineer's location may be verified as correct. In other embodiments, the engineer's location may be deemed incorrect only if the location verification process outlined in FIG. 3C failed all three comparisons (i.e., none of the three geographic locations were within the threshold distance of each other).

In some embodiments, if the location verification application determines that the engineer's location is incorrect, the plan generating tool may not allow the engineer to proceed with generation of an engineering plan; that is, the plan generating tool may be configured to only allow use of the tool to create an engineering plan if the location of the engineer/tool sufficiently matches the location of the work site.

In some instances, geographic location information for the work site at which the engineering plan generation operation was requested to be performed and/or for the centroid of the work site base image may be unavailable. This may occur if, for example, the positioning unit or other GNSS receiver from which the plan generating tool obtains geographic location data is unable to obtain geographic location coordinates (e.g., the positioning unit/other GNSS receiver is broken or malfunctioning or a suitable satellite signal cannot be obtained due to, for example, surrounding buildings or tree cover). In such instances, the location verification application may automatically deem the engineer's location to be incorrect as a default safeguard, and may indicate as part of a generated engineering plan, and/or a site visit report (discussed further below in connection with FIG. 15), that the reason for such a determination of incorrect location is that geographic location information was unavailable. In other embodiments, the location verification application may indicate somehow in the generated engineering plan, and/or a site visit report, that the location is not necessarily incorrect, but the plan generation operation should be reviewed (e.g., by a supervisor/quality control agent), as the engineer's location when conducting the plan generation operation could not be verified. In yet other embodiment, if appropriate geographic location information is not available to the location verification application, the plan generating tool may be configured to preclude further operation/generation of a plan.

As noted above, in some embodiments, the determination of "incorrect location" or "location verified" provided by the location verification application may affect subsequent operation of the plan generating tool, and/or may somehow be reflected in a generated engineering plan and/or site visit report. Site visit reports are discussed in greater detail below in connection with FIG. 15, including examples of how the location verification process may be reflected in such reports.

C. Plan Generation

With the tool 10 having suitably verified that the engineer is located sufficiently near to the work site, the engineer may begin to generate the engineering plan. Thus, the engineer may cause the tool 10 to display a map or other image of the work site, i.e., a work site base image, on the display device 11. The tool 10 may render the base image on the display device 11 by accessing the work order, which may be stored in the storage memory 17 and which in some instances may include one or more image files pertaining to the work site. In other embodiments, the tool 10 may download a suitable image of the work site, e.g., from a third party image vendor via the Internet, and display the downloaded image on the display device.

In one illustrative embodiment, the engineer may begin work on an engineering plan by causing the user interface 12 to start a plan generation application (stored in storage 17 and executed by the controller 16 of the tool). In response, the tool 10 may display an initial user interface screen 1700 as shown, for example, in FIG. 4. The initial screen 1700 in this embodiment includes a save/exit icon 1702 and a grid pad icon 1704. The save/exit icon 1702 may be selected by the engineer to save an electronic site visit record at any point during the plan generation process and/or to exit the plan generation application. Creation of the engineering plan may involve the rendering of digital representations of one or more pieces of equipment on the work site base image to create a marked-up digital image, as well as the creation of other engineering plan details that may be separate from the marked-up digital image (such as equipment details provided in a text listing separate from the marked-up image and base image). Also, as discussed in more detail below, if a work site base image is not suitable for use or otherwise not used by an engineer, the grid pad icon 1704 may be selected to generate a bare grid on which engineering plan markup information may be created.

Figure 4:
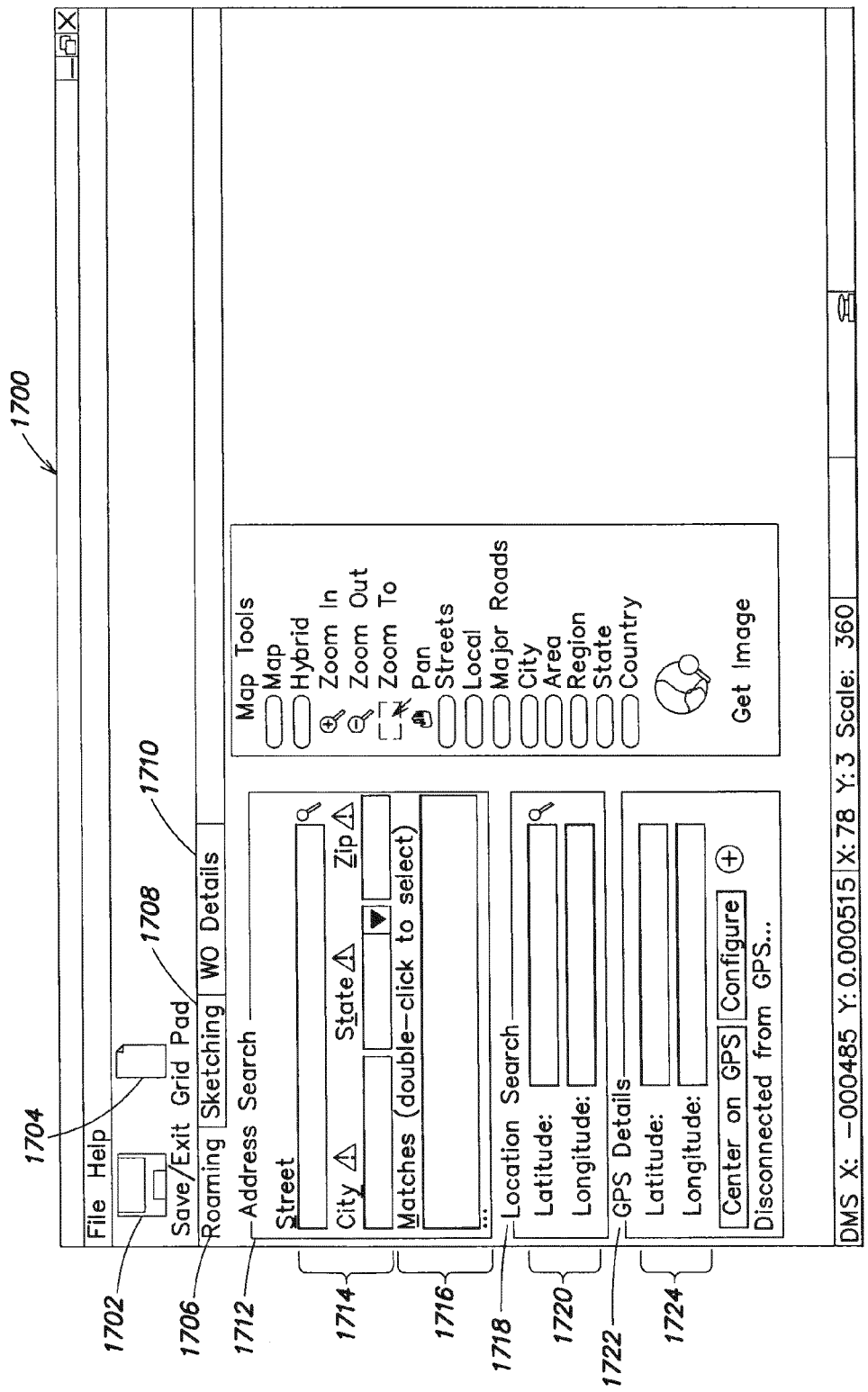
FIG. 4 shows an example of a user interface display screen of the plan generating tool of FIG. 3A, including various "roaming" features for identifying, accessing and/or navigating a work site base image, according to one embodiment of the present invention.

As shown in FIG. 4, the initial user interface screen 1700 rendered on the display device of the plan generating tool also includes a roaming tab 1706, a sketching tab 1708, and a work order (WO) details tab 1710. Accessing the work order details tab 1710 may display a window including information from the current work order. According to one example, the information from the current work order may include details relating to the engineering plan to be generated, such as geographic information relating to the work site (e.g., the address and/or geographic coordinates of the work site), a link to a map or other graphic of the work site, the type of work to be performed as part of the engineering plan, and the scheduled work start date. Thus, the engineer may use the work order details tab 1710 to display an initial image of the work site (if provided with and/or accessible from the work order), and/or to determine other features of the work order. In addition, the engineer may use the work order details tab 1710 to create a work order if necessary (as described above) and/or to change or add certain information in a work order, e.g., the engineer may add his name or other identifier to the work order.

The roaming tab 1706 of the user interface screen 1700 shown in FIG. 4 may provide another resource for displaying a work site base image and includes fields that may be used to specify geographic location information corresponding to a work site base image to be displayed. For example, some work sites may be relatively large and be shown in a single, large image of the entire work site area. Alternately, a work site may be shown in multiple, separate images, e.g., where the work site has geographically separate areas. Rather than review the multiple images or scan through one large image to find the engineer's current location, the engineer may use the roaming tab 1706 to identify an appropriate image and/or location on the image for initial display on the tool 10. To identify the image, geographic location information may be manually input by the engineer, may be automatically derived from current work order information, may be automatically acquired from the positioning unit 13, or may be otherwise provided. For example, an address search area 1712 of the roaming tab 1706 may include input fields 1714 (e.g., street, city, state and zip code) in which the engineer may input address information relating to the work site, and a match window 1716 in which the application may display matching addresses. The engineer may select the address in the match window 1716 (e.g., by double clicking), thereby causing the display of an appropriate image of the work site that includes the area of the selected address. Alternately, a location search area 1718 may be populated with latitude and longitude coordinates 1720 for the work site, e.g., as indicated under the work order details tab 1710. For example, the user interface 12 may automatically populate the location search area 1718 using the latitude and longitude coordinates in the work order (e.g., the work order may include starting coordinates where the engineer is to begin work generating the plan), and an image of the work site that includes the latitude and longitude coordinates may be displayed. The location search area 1718 may also be modified by a user so that the user can change the pre-populated coordinates, as desired. A GPS details area 1722 comprises fields 1724 that may be populated with latitude and longitude coordinates acquired from the positioning unit 13, such as a GPS device integrated within, connected to, or otherwise associated with the tool 10. Like the location search area 1718, the GPS details area 1722 may be used to search for and retrieve an image of the work site. For example, the positioning unit 13 may provide the tool's current location coordinates in the GPS details area 1722, and the engineer may cause the display of an image of the work site that includes the tool's current location, e.g., by clicking the "Center on GPS" button.

With a suitable image of the work site identified, the tool 10 may display on the display device 11 the work site base image (or a portion of the image) for viewing by the engineer. For example, the user interface display screen 1800 of FIG. 5, rendered on the display device of the tool 10, shows a result of selecting an address in the window 1716 (e.g., by double clicking) that matches the address information entered into input fields 1714. In particular, the screen 1800 displays an image 1802 corresponding to the selected address, e.g., so that the selected address is centered in the image. The map tools 1804 provided adjacent the image allow the image 1802 to be manipulated to create a desired view. For example, the map tools 1804 comprise zoom and pan tools to allow the scope and center of an image to be changed. Once any desired manipulations have been performed, the user may select the "get image" icon 1806, which causes the image to be displayed as the work site base image, in a window associated with the sketching tab 1708. The displayed work site base image may be a high resolution image including the area of the selected address, e.g., of all or a portion of the work site. If a high resolution image is not available or not required, however, the user tool may automatically retrieve a lower resolution image or some other alternate default image.

Having loaded the work site base image(s) in a window associated with the sketching tab 1708, the engineer may then interact with the image(s), using the tool 10, so as to develop the engineering plan. For example, referring again for the moment to the example work site base image 160 illustrated in FIG. 2, the engineer may employ the user interface 12 of the tool 10 to provide markings on the base image of FIG. 2 to produce a marked-up image constituting an engineering plan.

Figure 6:
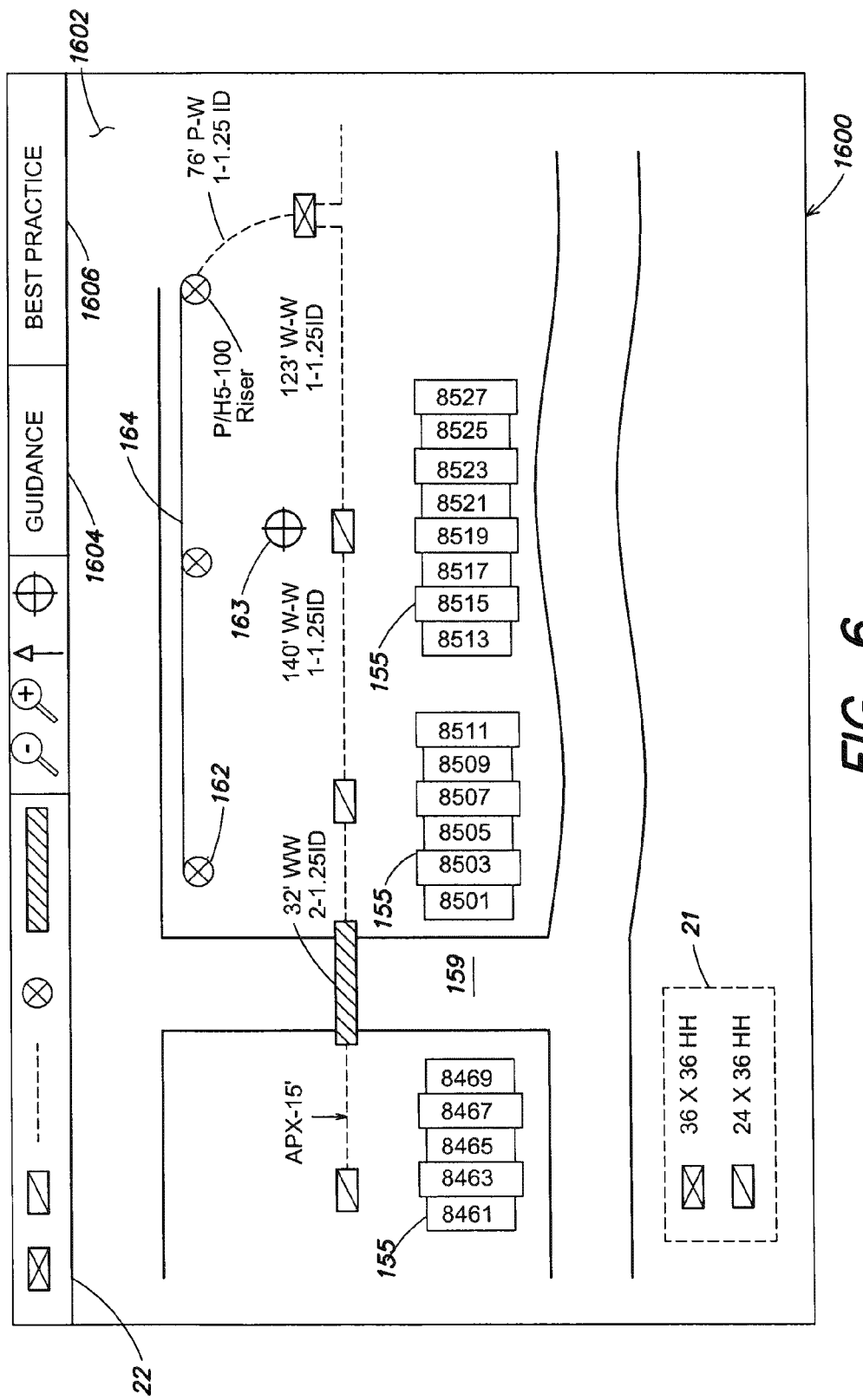
FIG. 6 shows another example of a user interface display screen of the plan generating tool of FIG. 3A, including a tool bar together with a marked-up work site base image including an engineer's mark-ups and notes, added using the plan generating tool as part of the electronic engineering plan generation process, according to one embodiment of the present invention.

In particular, FIG. 6 shows another example of a user interface display screen 1600 of the plan generating tool of FIG. 3A, including a tool bar 22 together with a marked-up digital image 1602 (i.e., a work site base image as illustrated in FIG. 2, including an engineer's mark-ups and notes, added using the plan generating tool as part of the electronic engineering plan generation process), according to one embodiment of the present invention. In the example of FIG. 6, the marked-up digital image relates to the design of a cable system installation proximate to a condominium complex. In this illustrative embodiment, the engineer has added markup information on the base image, which was captured by the user interface 12 and integrated with (or overlaid on) the base image of the work site. In the example shown in FIG. 6, the markup information (e.g., which may be created using a stylus or other instrument placed into contact with a touch-sensitive screen) includes address numbers for the individual condominiums 155 that were provided by the engineer ("8461", "8463" and so on), as well as various markups relating to the cable system infrastructure (pieces of equipment) to be installed; for example, the display screen 1600 shown in FIG. 6 includes a legend box 21 in the lower left that indicates the size and type of box (indicated by a rectangular box with an "X" or "/"), the location of several such boxes (generally near the condominiums 155) together with a dashed line indicating conduit and cable running between the boxes, notes regarding the length and type of conduit (e.g., "140' W-W 1-1.25 ID" and so on), and other information.

All or part of the markup information added by the engineer to a work site base image, so as to create a marked-up image constituting an electronic engineering plan, may be actually drawn completely "by hand" by the engineer (e.g., using a stylus provided as part of the tool's user interface 12), and/or the engineer may use a dialog box, employ features provided by one or more tool bars presented on the display device, or other similar features, to mark-up the work site base image. If hand drawn, information may be recognized by the user interface 12 and corresponding text or graphical features inserted for the hand drawn information. For example, text written by the engineer may be recognized by the user interface 12 and computer-generated text characters inserted into the image. Alternately, or in addition, the user interface 12 may recognize graphical symbols, such as a handwritten dashed line, box or other graphic, as indicating a particular piece of equipment and may insert a draftsman's quality dashed line or other graphical information into the image in place of the handwritten line. As mentioned above, information inserted or added to a displayed image may be logically identified with one or more different layers that are overlaid on a work site base image layer. Items on different layers may be identified as such by different color, opacity, or other visible feature. For example, equipment information may be displayed in a yellow color, while information in the base image of the work site may be indicated in white.

In one embodiment, as illustrated in FIG. 6, while under the "Sketching" tab 1708, the tool 10 may render on the display device 11 the work site base image together with a tool bar 22 (e.g., displayed along the top of the image) that allows the engineer to select from different mark-up resources and other functions. It should be understood, however, that the tool bar 22 illustrated in FIG. 6 provides only one example of a tool bar, and a variety of different tool bars or other features may be rendered on the display device to facilitate generation of an engineering plan, as discussed in greater detail below. In the example view of FIG. 6, the tool bar 22 is shown in a somewhat simplified format for ease of illustration and understanding.

More specifically, on the left side of the tool bar 22, the engineer may select from several different icons, symbols or other representations to place a corresponding piece of equipment on the work site base image. In this example, an icon representing different junction boxes (the rectangular box symbols with an "X" or "/"), standard conduit (the dashed line symbol), a utility pole (the symbol having a circle with an "X" inside), or conduit for placement under a roadway (the rectangular box symbol with hatching inside) may be selected for placement on the image. In one embodiment, the engineer may "drag and drop" the icons onto the image, and then manipulate the shape, size and/or location of the icon on the image. For example, when placing the icon representing the conduit under the street 159 (near the left side of the image), the box with hatching may be selected from the tool bar 22, dropped onto the image and then adjusted in size to suitably extend under the existing street. Adjustment of the symbol may be done using manipulation tools, such as "select", "move", "rotate", and others commonly found in image drawing programs.

Figure 5:
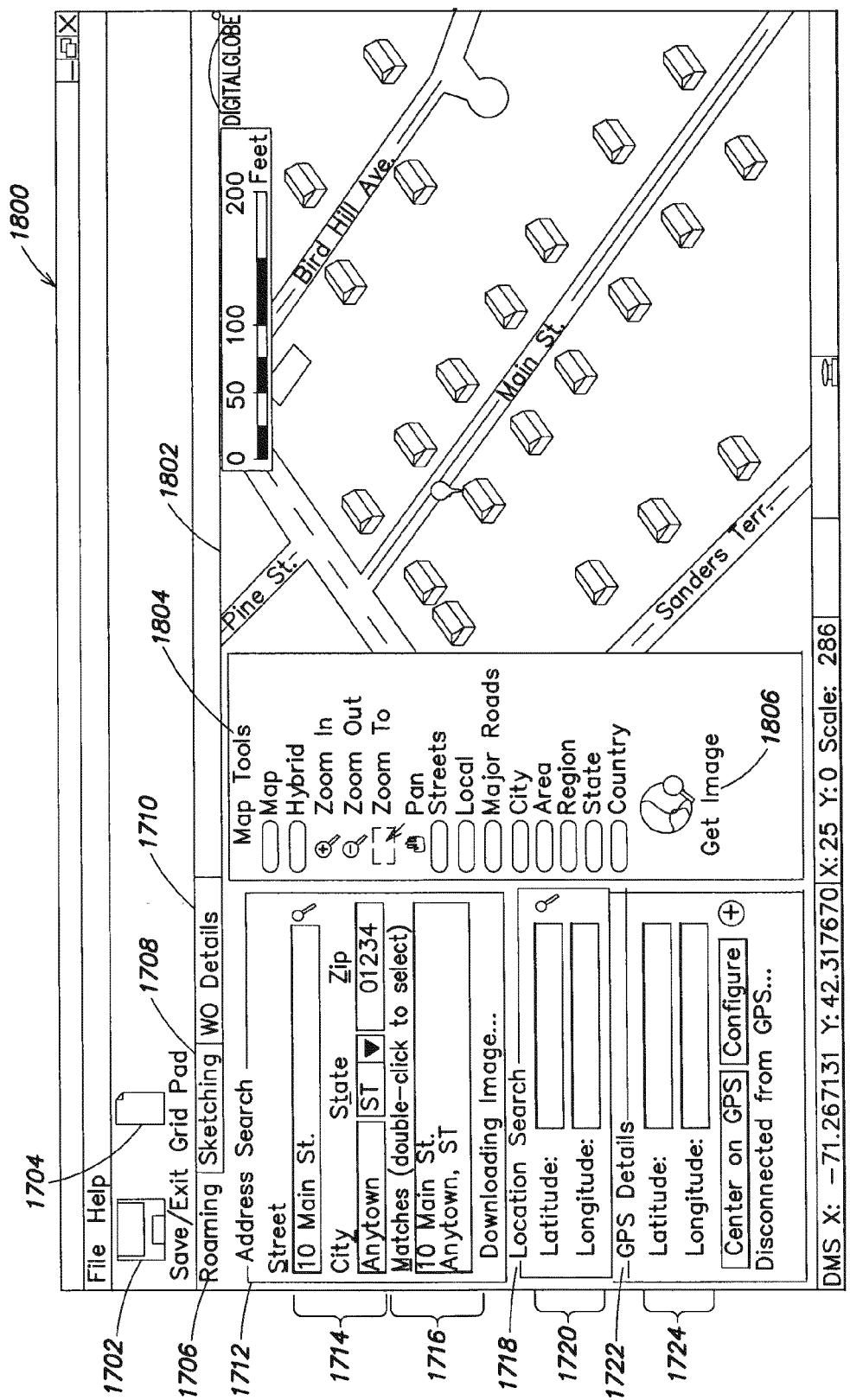
FIG. 5 shows the display screen of FIG. 4 with exemplary address information entered and a displayed image corresponding to the address information.
Figure 7:
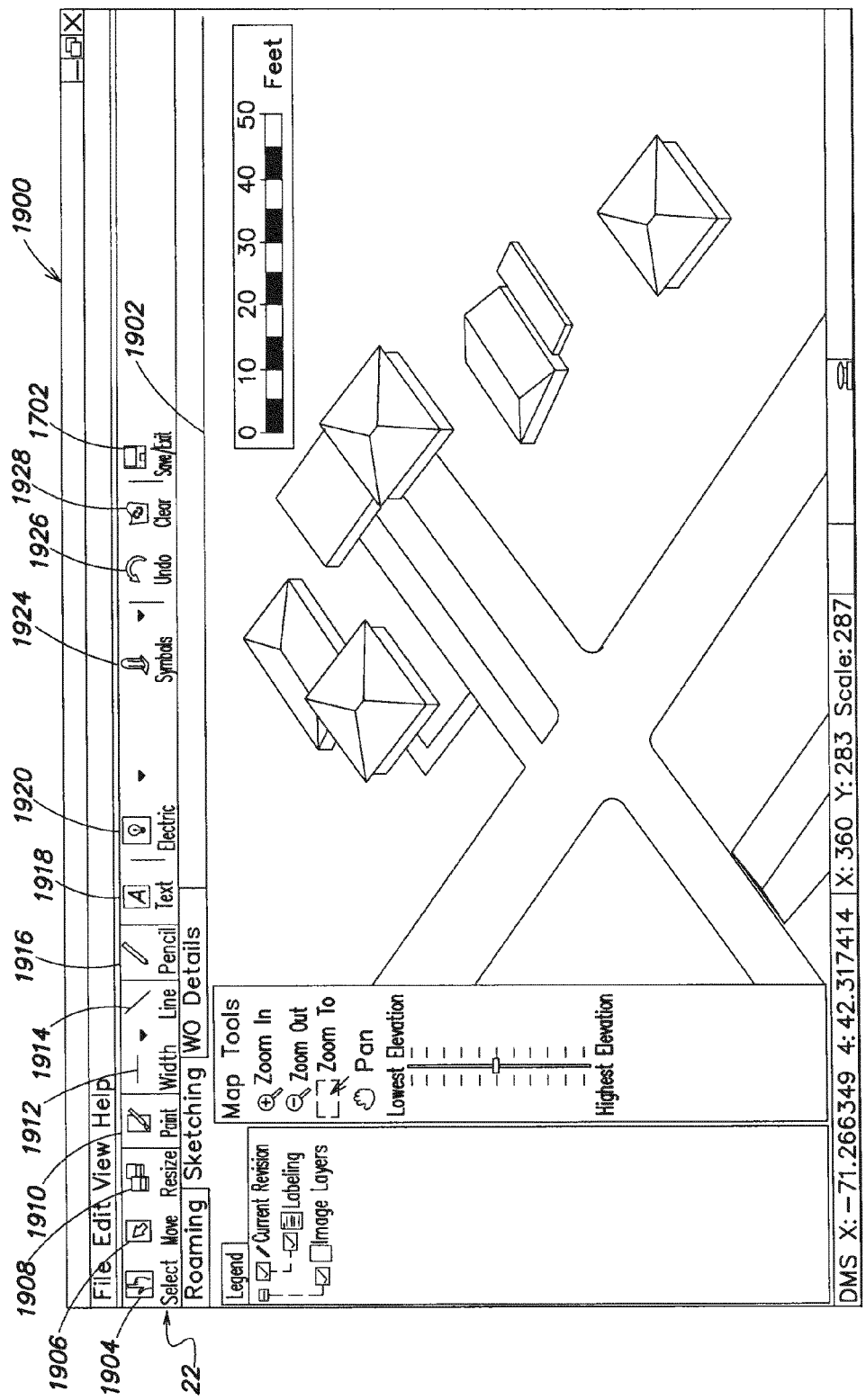
FIG. 7 shows another user interface display screen of the plan generating tool of FIG. 3A, including exemplary tool bar features relating to sketching functions to facilitate electronic engineering plan generation, according to one embodiment of the present invention.

In another illustrative embodiment having a more complicated tool bar 22, an engineer may select the "Sketching" tab 1708 in FIG. 4 or 5, which causes the tool 10 to display the work site base image with a tool bar 22 like that shown in the user interface display screen 1900 illustrated in FIG. 7. In this embodiment, the tool bar 22 includes icons 1904-1928, which relate to the creation of digital representations of marks and other information regarding the engineering plan generated by the tool 10. Many of the icons included with the tool bar 22 will have functions that are readily understood by those of skill in the art. For example, the Select icon 1904 allows a user to select one or more markings on the image 1902 for some operation, e.g., for movement to a new position on the image, for deletion, for a change of color, for placement onto a desired image layer, and so on. The Move icon 1906 allows a user to move a selected item on the display as desired, whether such movement involves rotation, linear movement, a change in elevation, and so on. The Resize icon 1908 permits a user to change a size, e.g., relative scale, length, width, area, etc., of a selected item on the display as desired, e.g., to enlarge the displayed size of a conduit symbol on the image. The Paint icon 1910 allows a user to fill in an area on the display with a desired visible feature, such as a solid or translucent color, hatching, and so on.

When drawing computer-generated lines on the image, the user may select the Line icon 1914 and vary the width of the drawn line using the Width icon 1912. Lines may be drawn in a computerized fashion, e.g., with the user identifying a start and end point for the line using a stylus or other pointing device on the image 1902. To hand draw lines, text and other features, the hand drawing function may be selected by clicking the Pencil icon 1916, allowing the user to draw on the image using a fingertip, stylus, pen, or other item. Text may be entered into desired portions of the image by selecting the Text icon 1918, which may cause a text box to be inserted into the image and into which the user may type (e.g., using a keyboard) desired text. The text box may permit the user to define the font type, size, color, and other appearance of the text, as well as to enter the text itself. Alternately, the user may hand write text into the text box, which may remain in a hand drawn state, or be subjected to optical character recognition processes by the user interface 12 so that computerized text characters are substituted for the hand written text. The Undo icon 1926 allows a user to "undo" or reverse a last action, or set of actions, and the Clear icon 1928 allows an engineer to erase graphic, text or other information input by the engineer in a specified area of the image.

The tool bar 22 in FIG. 7 also includes drawing tools that are more specific to the generation of an engineering plan. Although the tool bar 22 could be constructed in other ways (such as that shown in FIG. 6), in this embodiment a System Type icon 1920 (which indicates "Electric" in FIG. 7) and a Symbols icon 1924 are provided. As will be understood, different engineering plans will involve one or more different types of engineered systems, whether they be a water supply system, an electrical power system, a fiber optic cable system, and so on. Thus, the System Type icon 1920 allows a user to define what type of system is being worked on by the engineer, i.e., so that when the engineer provides engineering plan input to the tool 10, the tool 10 can know what type of system the information relates to. For example, electrical system information input by the user (such as hand drawn lines or symbols) when the System Type icon 1920 indicates "Electric" may be displayed in a red color, whereas natural gas system information input when the System Type icon 1920 indicates "Gas" may be displayed in yellow.

Figure 8:
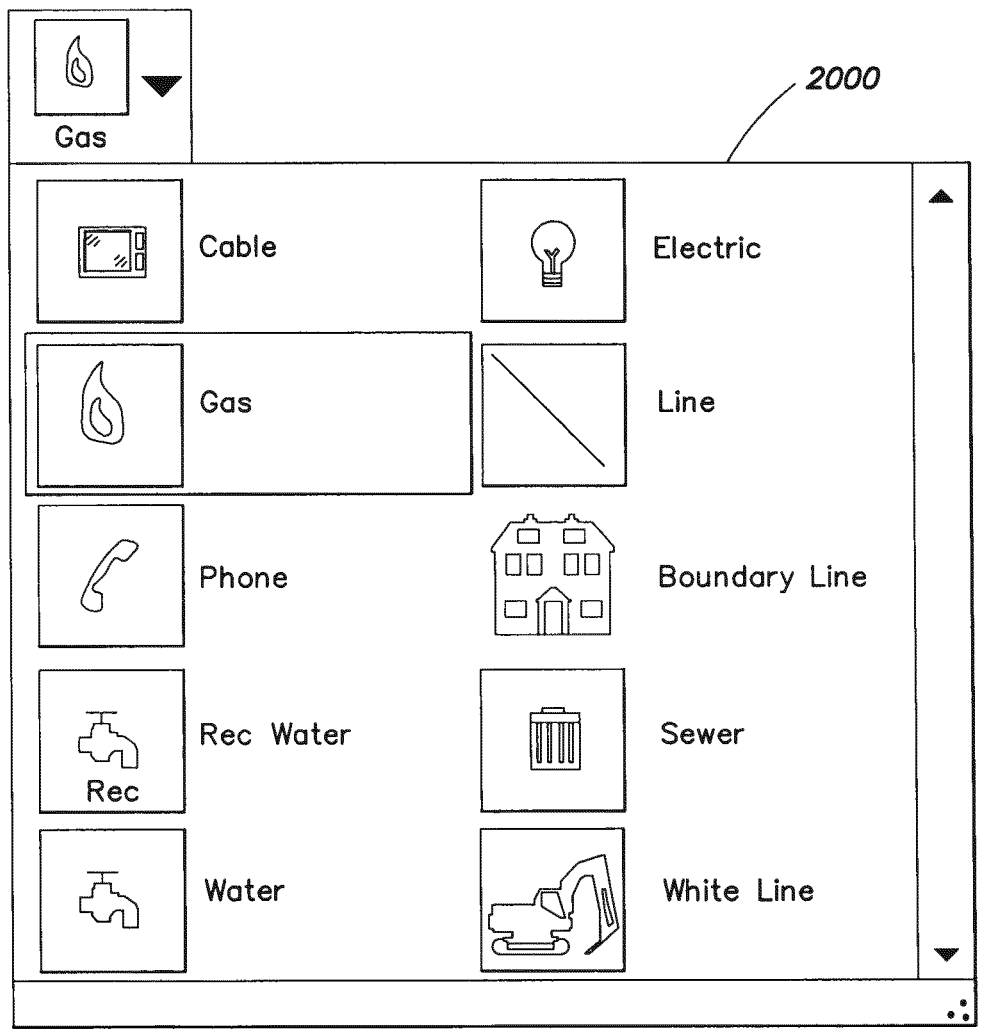
FIG. 8 shows an exemplary list of "pull-down menu" icons that may be displayed in response to selection of the System Type icon of FIG. 7, according to one embodiment of the present invention.

FIG. 8 shows a drop down menu 2000 that may be displayed in response to selecting the System Type icon 1920. In this embodiment, the drop down menu 2000 allows a user to select a system type corresponding to cable, gas, phone, water, reclaimed water, electric, sewer and other types. Other items, such as Boundary lines and White lines are also provided and relate to surveying-type functions, e.g., where the engineer defines property boundary lines on the plan and/or excavation areas (delimited by so-called "white lines").

Figure 9:
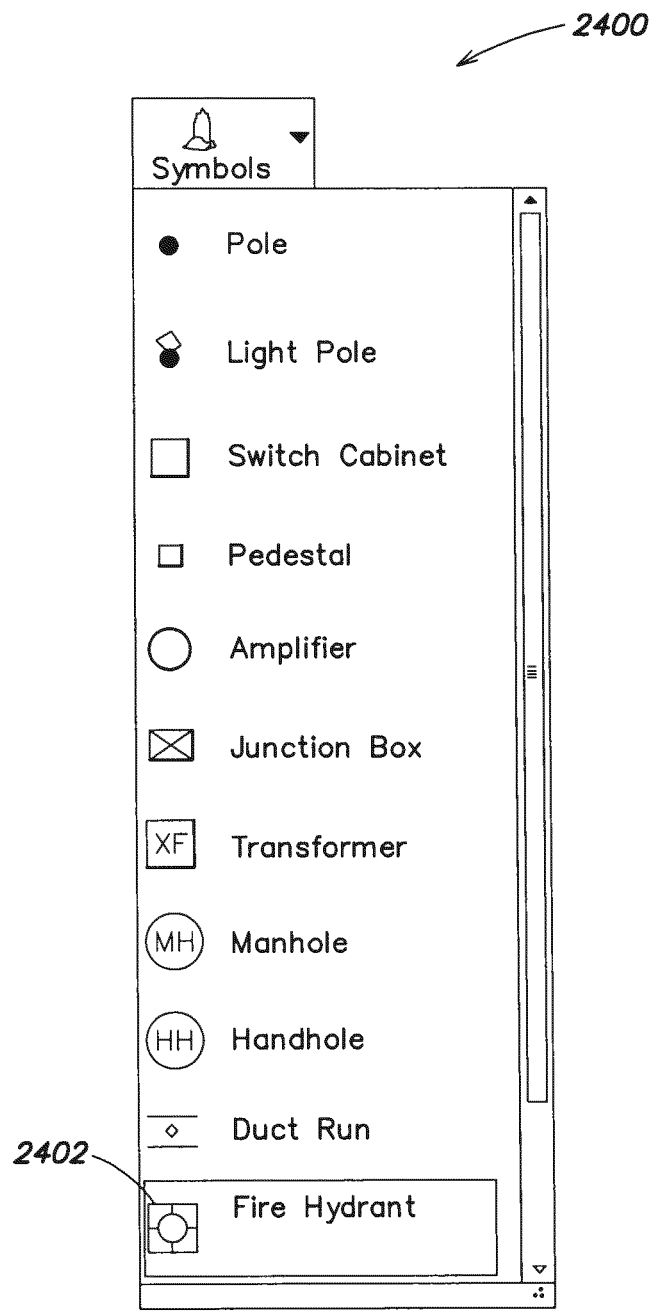
FIG. 9 shows an exemplary list of "pull-down menu" icons that may be displayed in response to selection of the Symbols icon of FIG. 7, according to one embodiment of the present invention.

The type of system selected using the System Type icon 1920 can also be used to control other functions of the tool 10, such as the set of selectable symbols displayed when the user clicks the Symbols icon 1924. For example, FIG. 9 shows an illustrative list of selectable symbols 2400 that is displayed when the System Type is defined to be "Cable" and the Symbols icon 1924 is selected. Although any suitable listing of symbols may be provided, as shown, the displayed symbols may relate specifically to an engineering plan for a cable installation, and include symbols for pieces of equipment to be installed such as Pedestal, Amplifier, Junction Box, and so on. Of course, other symbols that are not necessarily related to the selected system type may be displayed as desired, e.g., like the Fire Hydrant symbol 2402. The display of such symbols may be an aid to the engineer, e.g., when wishing to indicate the location of a fire hydrant or other preexisting landmark or other feature on the engineering plan. To access symbols for a different engineering system type, the user can define a suitable System Type using the System Type icon 1920, and then click the Symbols icon 1924 which will cause a corresponding list of available symbol icons to be displayed.

Selecting one of the symbols from the symbol drop down menu (e.g., the listing 2400) may cause the tool 10 to insert a corresponding symbol onto the displayed work site base image, e.g., at the tool's current location or at another user specified location, wherein the symbol provides a digital representation of a piece of equipment. For example, after selecting a symbol from the listing 2400, the engineer may tap the display screen at a location on the displayed image to cause the tool 10 to insert the selected symbol into the displayed image and thereby generate a marked-up digital image. Alternately, or in addition, the user may "drag and drop" symbols from the list, e.g., by touching a stylus to the desired symbol and then moving the stylus to a desired location on the displayed image without lifting the stylus from the display screen. Upon lifting the stylus, the tool 10 may insert the symbol at the location where the stylus was last in contact with the display screen to generate the marked-up digital image. In other embodiments, the engineer may enter desired coordinates (e.g., GPS coordinates) and the tool 10 may insert the symbol at the corresponding location on the displayed image.

Placement of a symbol onto a work site base image during the process of generating an engineering plan may cause other actions by the tool 10, such as prompting the user to enter text information corresponding to the symbol. For example, upon entering a symbol for a piece of conduit, the user interface 12 may prompt the user to enter details regarding the conduit, such as its size, wall thickness, material, performance requirements, and/or other details. Text entered by the user may be displayed on the image as markup information, or may be stored but not displayed, e.g., in the form of a list and/or with a reference number or other identifier linked to a symbol on the image. Alternately, or in addition, entry of a symbol for a piece of equipment may prompt the user interface 12 to suggest or require the entry of other symbols or information. For example, if a junction box symbol is added to an engineering plan for a cable system, the user interface 12 may next insert, or suggest the insertion of, a symbol for a conduit leading from the junction box and/or some other symbol. Such actions may assist the engineer in generating the engineering plan, particularly where customer or other requirements mandate the inclusion of particular types of equipment with other system components. In another embodiment, insertion of a symbol into an engineering plan may prompt the user interface 12 to request whether the user would like to resize and/or adjust the orientation of the symbol. For example, upon insertion of a conduit symbol, the user interface 12 may request the engineer to define the end points of the conduit, any bends in the conduit, and so on.

With reference again to FIG. 6, the toolbar 22 in these illustrative embodiments also may include one or more common image manipulation tools, such as zoom-in and zoom-out, pan and so on. For example, FIG. 6 shows a simplified zoom in/zoom out function in the tool bar 22 icons (i.e., the magnifying glass icons with "+" or "−"), as well as a pointer tool (arrow) for selecting and/or moving items on the image. Other image manipulation tools may also be included, and such image manipulation tools may be presented in any suitable way, such as those included with the map tools 1804 in FIG. 5, or the map tools shown in FIG. 7, as well as cut and paste features, and others. The controller 16 of the tool 10 may manage the display of various information by the display device, including the engineering plan markup information, to adjust according to how an engineer implements the image manipulation tools. For example, in one embodiment, when the engineer zooms the image view in or out, or pans, engineer input (e.g., hand drawn lines and/or shapes, inserted icons or other symbols, etc.) that have been added to the work site image may adhere to the changing image scale and remain in the original user-input locations.

The toolbar 22 in FIG. 6 also includes a "tool location" icon (a circle with a "+" inside) that indicates the current location of the plan generating tool 10 on the image. By selecting this icon, the engineer can cause the tool location icon to be displayed on the image, which may be used not only to verify the tool's location at the work site on the image, but also to indicate the location where equipment should be placed. For example, in FIG. 6, a tool location icon 163 placed on the work site base image indicates that the tool 10 is currently located near the upper right of the image, close to the utility pole P/H5-100. If, when placing a junction box or other equipment on the image, the engineer wishes to actually have the equipment placed where the engineer is standing with the tool 10 at the work site, the engineer may select and place the equipment icon on top of the tool location icon. In this way, the engineer can be assured that the equipment will be placed at the work site in the same location that the tool 10 was located when the icon was placed on the image.

Another way that the tool location icon can be used is to verify or otherwise determine dimensions at the work site. For example, when placing the conduit that passes under the street on the plan in FIG. 6, the engineer may physically carry the tool 10 to one side of the street where the conduit is to start, note the location on the image (such as by selecting a "start measurement" command or defining a "start" point for the conduit symbol), and then carry the tool 10 to the other side of the street where the conduit is to terminate and select the ending location (such as by selecting a "end measurement" command or defining an "end" point for the conduit symbol). Using the coordinates or other position information for the start and end points of the conduit, the tool 10 can not only accurately locate the drawing symbol or other feature on the image to correspond to the start and end points of the conduit, but also verify the length of the conduit. This feature can be useful when the image does not accurately indicate where street curbs or other landmarks are actually located. For example, if the street in FIG. 6 was widened at some time after the work site image was created such that the street is actually wider than shown in the image, the engineer can verify the start and end points of the conduit as well as the curb line of the street in that location. The updated curb line information can be incorporated into the engineering plan, e.g., to allow installation crews to use measurements from the curb to locate the start and end points of the conduit. Other landmark locations can be verified using the tool location icon, such as the location of the utility pole P/H5-100 in FIG. 6. To verify that the location of the pole is appropriately indicated, the tool 10 may be positioned at the pole, and the position of the pole indicated on the image compared to the tool location icon. If the two features are not suitably near each other, the engineer may take action, such as moving the pole indication on the image to the accurate location (e.g., at the tool location icon), or providing a handwritten note regarding the pole's actual location in relation to that shown in the image. This information may be later incorporated into the final engineering plan drawings.

The user interface 12 can provide other measurement functions without requiring that the tool 10 be actually located at the start or end point at the work site. For example, a user can position a cursor on the image, select a "start measurement" command, position the cursor at another location on the image, and select an "end measurement" command to cause the tool 10 to generate and display a distance between the two selected points. The engineer can use this feature to provide notes for the engineering plan regarding the length of conduit or other equipment to be installed at a work site, to verify that the distance between certain objects is within technical specifications, and so on.

Figure 10:
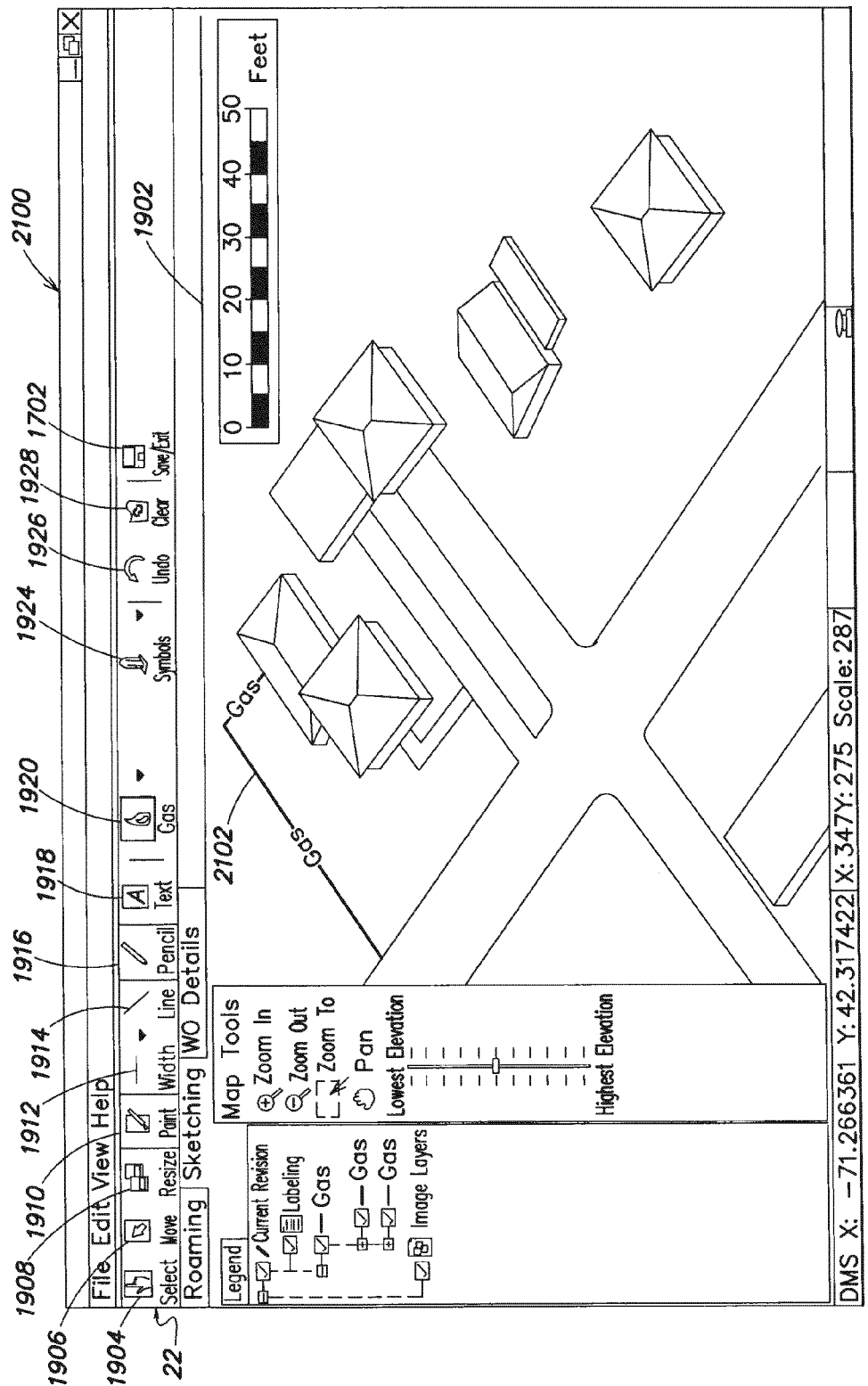
FIG. 10 shows another user interface display screen of the plan generating tool of FIG. 3A, illustrating the process of marking-up a work site base image to indicate location information relating to installation of infrastructure for a gas system, according to one embodiment of the present invention.

FIG. 10 shows another illustrative embodiment of a user interface display screen 2100, in which an engineer is generating an engineering plan for a natural gas installation. In this embodiment, the engineer has selected the Gas system type using the System Type icon 1920, and then has drawn a line 2102 in the displayed image 1902 that shows where the new gas line is to be placed. As will be understood from the above description, the line 2102 can be created by the engineer selecting the Line icon 1914 and/or by using the Pencil tool 1916 and hand drawing the line 2102 on the image. In this embodiment, since the System Type is defined as Gas, the line 2102 is automatically annotated with the text "Gas", and is inserted into a drawing layer named Gas.

D. Display Layers for Marked-Up Digital Images Constituting Engineering Plans

With respect to drawing layers constituting an engineering plan according to some embodiments, it should be appreciated that information displayed by the tool 10 relating to the engineering plan may be logically included on any suitable number and/or type of image layers that may be controlled to create a desired display. That is, markup information input by a user of the tool 10 (e.g., an engineer) may be categorized based on a variety of criteria and displayed as separate "layers" of the marked-up digital image constituting the engineering plan, such that a viewer of the visual rendering may turn on/off displayed information based on a categorization of the displayed information. Examples of information categories that may be associated with corresponding display layers include, but are not limited to, "engineering plan information" (e.g., information relating to engineering plan details—whether graphic, text or other—for a specific type of system including labeling, symbols, annotations, notes, text boxes, etc.) and "image information" (e.g., information relating to one or more work site base images used to display one or more features of the work site, including one or more landmarks in or near the work site and various symbols representing same).

Respective layers may be enabled or disabled for display in any of a variety of manners; for example, in one implementation, a "layer directory" or "layer legend" pane may be included in the display field (or as a separate window selectable from the display field of the visual rendering), showing all available layers, and allowing a viewer to select each available layer to be either displayed or hidden (toggle on/off), thus facilitating comparative viewing of layers. Furthermore, any of the above-mentioned exemplary categories for layers, as well as other categories not specifically mentioned above, may have sub-categories for sub-layers, such that each sub-layer may also be selectively enabled or disabled for viewing by a viewer. For example, under the general layer designation of "Gas," different components of the system may be categorized under different sub-layer designations, such as "Pipe", "Valves", "Meters", and so on. In this manner, a viewer may be able to hide only certain engineering plan information while viewing other information, or vice versa, in addition to having the option to view or hide all information.

Virtually any characteristic of the information available for display may serve to categorize the information for purposes of display layers or sub-layers. It should further be appreciated that, according to various embodiments, the attributes and/or type of visual information displayed as a result of selecting one or more layers or sub-layers is not limited. In particular, visual information corresponding to a selected layer or sub-layer may be electronically rendered in the form of one or more lines or shapes (of various colors, shadings and/or line types), text, graphics (e.g., symbols or icons), and/or images, for example. Likewise, the visual information corresponding to a selected layer or sub-layer may include multiple forms of visual information (one or more of lines, shapes, text, graphics and/or images). From the foregoing, it may be appreciated that a wide variety of information may be categorized in a nested hierarchy of layers, and information included in the layers may be visually rendered, when selected/enabled for display, in a variety of manners.

Figure 11:
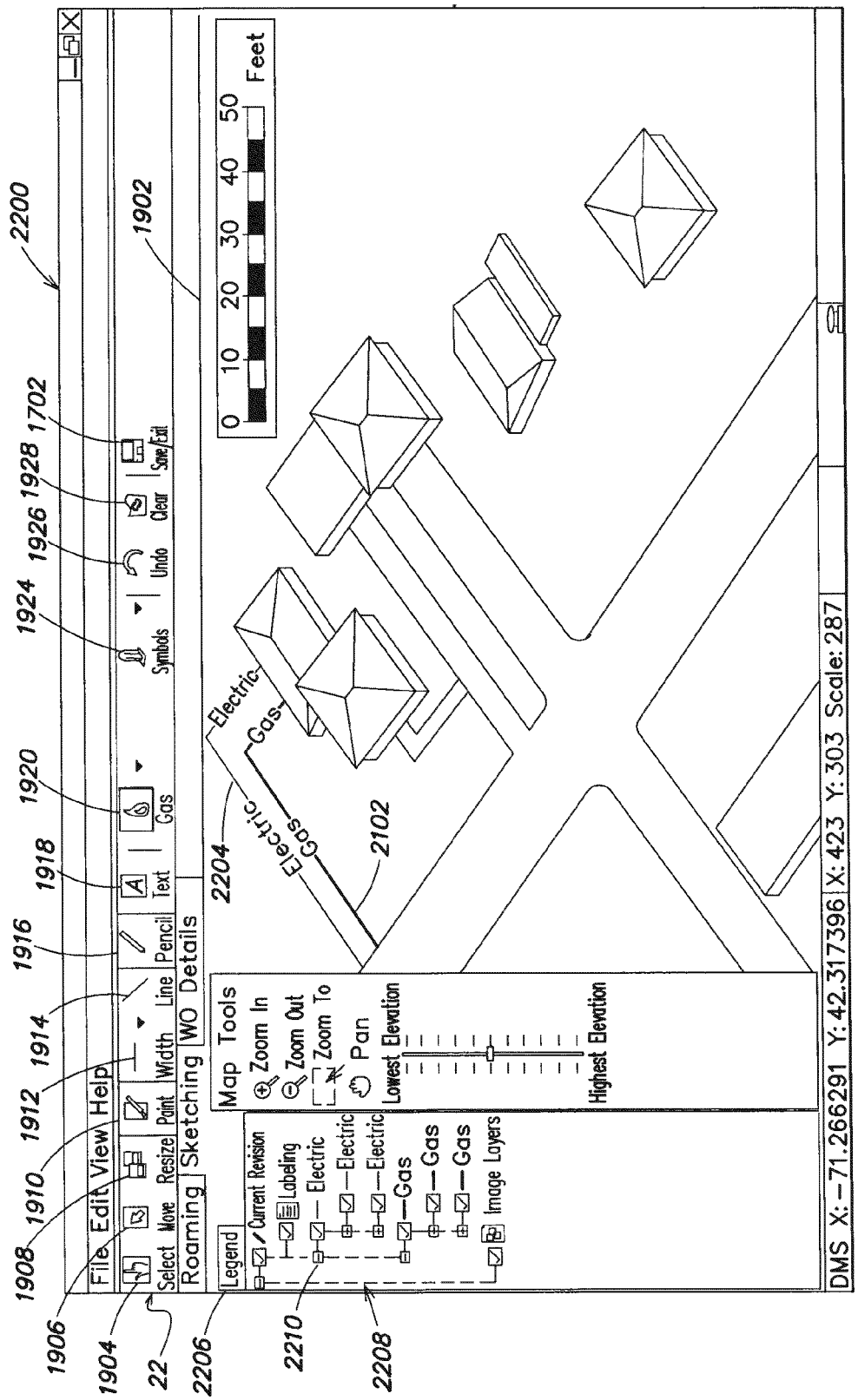
FIG. 11 shows another user interface display screen of the plan generating tool of FIG. 3A, illustrating a marked-up work site base image having multiple display layers for different engineered systems (e.g., gas and electric), according to one embodiment of the present invention.
Figure 12:
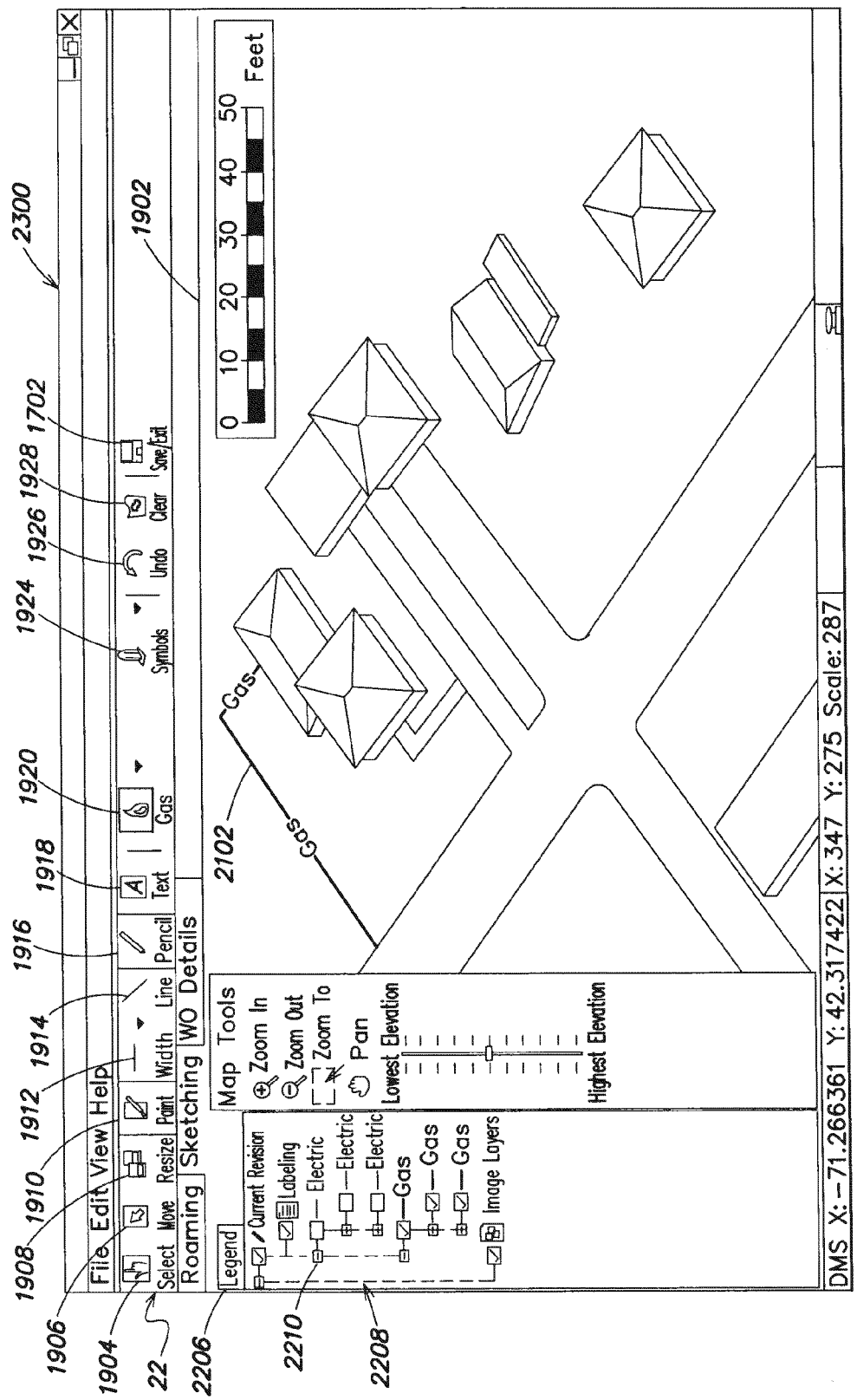
FIG. 12 shows another user interface display screen of the plan generating tool of FIG. 3A, illustrating layer control for the marked-up work site base image, according to one embodiment of the present invention.

FIG. 11 shows one illustrative embodiment of an engineering plan that includes both Electric system and Gas system components. That is, Electric system marks 2204 and Gas system marks 2102 are digitally represented on the base image 1902 of the work site shown on the screen 2200. The legend tab 2206 (at the left side of the display) includes a layers legend 2208 displaying the layer names corresponding to the features displayed on the image. Each layer name is associated with a check box that controls whether the corresponding layer is displayed. To hide a digital representation of a layer's components, the check box associated with that layer may be unchecked. To hide all of the features corresponding to a particular layer, the check box associated with that layer may be unchecked. For example, to hide all of the electric system marks 2204 so that only the digital representations of gas system marks 2102 are shown, a user may simply uncheck the check box 2210 in the layers legend 2208. The resulting screen 2300 is shown in FIG. 12. Rechecking a check box, such as check box 2210, will cause the associated feature(s) to again be displayed. It should be appreciated that the layer feature described above may be used to selectively hide or display any of the digital representations described herein. For example, the layer feature may be used in connection with features corresponding to underground or aerial facilities, marks corresponding to other features such as white lines or boundary lines, notes (e.g., text boxes), labels (e.g., utility types or dimensions), and/or symbols representing different types of pieces of equipment to be installed, symbols representing environmental landmarks, non-movable objects or other reference features. The layers legend described above may be used to control the various layers.

In some embodiments, one or more "revision layers" may be employed to provide for information relating to later updates to an engineering plan. Multiple revision layers may be included as part of a single engineering plan, or a site visit report corresponding to a particular engineering plan generation operation may include only particular/selected revisions. By way of example, the layers legend 2208 of FIG. 12 indicates that the layers shown in the figure correspond to a "current revision." Accordingly, it should be appreciated that like other layers, a given revision layer may include a number of sub-layers respectively corresponding to the various categories of information making up that revision layer (e.g., the "current revision" layer illustrated in FIG. 12 includes respective sub-layers for "labeling", "electric," and "gas.")

With respect to revision layers, in some implementations "original" information (e.g., one or more base images on which the engineering plan is created) may be modified in some respect (to provide "modified" information) while at the same time maintaining the integrity of the original information. The original information may relate to an original engineering plan as prepared by an engineer at a work site, or may correspond to a current revision layer that already includes some modifications to an original plan for which additional modifications are desired. The original information itself may be identified as a particular revision layer (e.g., "Original") and may include multiple display layers as discussed above, and the modified information constituting a new revision layer may be identified as such and also may include multiple display layers.

In one aspect relating to revision layers, there may be a one-to-one correspondence between the display layers constituting the original information and the display layers constituting the modified information, wherein one or more layers of the modified information include one or more revisions to the original information in that/those layers. In another aspect, one or more display layers constituting the original information may be purposefully excluded from the modified information, such that there are fewer display layers constituting the modified information. In this example, of the fewer display layers in the modified information, no remaining layer may have revisions (i.e., the only modification may be the exclusion of some original information), or one or more remaining layers may have one or more revisions to the original information. In yet another aspect, the modified information may contain one or more additional display layers not found in the original information. Accordingly, it should be appreciated that one or more revisions to the original information to provide modified information for a new revision layer may include some subset of the original information (omissions of original information without further modifications), edits/changes/alterations to at least some part of the original information, or additions to the original information (with or without edits/changes/alterations to the original information).

In some implementations relating to revision layers, it may be desirable to not only maintain/preserve original information on which modifications may be based, but to also prevent modifications to, and/or viewing of, some or all of the original information. Furthermore, the same may be true of one or more revision layers based on modified information; i.e., it may be desirable to maintain/preserve modified information constituting a particular revision layer, and in some cases prevent further modification to, and/or viewing of, some or all of the modified information once it has been saved as a revision layer. Accordingly, in some embodiments, the current revision (comprised of original information or modified information) or certain layers thereof may be locked (e.g., write-protected) to prevent unauthorized modifications (e.g., deletion of layers or changes to digital representations). Similarly, one or more layers of a particular revision may be designated as hidden or copy-protected, such that they cannot be copied into a new revision layer.

Thus, a new revision layer may be created that may be wholly or partially modifiable, and may include at the outset all or only a portion of the information in a previous revision. According to one exemplary implementation, the new revision layer is created based on a prior revision such that, at least initially, the new revision layer includes all of the layers of the prior revision layer. However, since it may be desirable to prevent certain digital representations from being viewed, at least by certain parties, certain layers or sub-layers may be deleted or hidden from unauthorized viewing in the new revision layer. Alternatively, the new revision layer may be created at the outset with only a designated subset of the layers of the prior revision layer. Further, changes may be permitted in the new revision layer, such as the addition of new layers and/or new digital representations, and/or modifications to existing sub-layers of the new revision layer.

Revision layers may be used for various purposes. For example, revision layers may be used so a third party (e.g., a regulator or damage investigator) may create an annotated version of an engineering plan based on original information (or in some cases modified information). The third party (or other user) may create a new revision layer based on an "original" revision layer and include annotations in the new revision layer to indicate, for example, where damage occurred and where underground facilities are located vis a vis where they are indicated as being located in the original revision layer. Revision layers may also be used to create a new version of an engineering plan, based on either original information or modified information, that includes a subset of the content in the previous revision, without necessarily further modifying any information in the new version. The purposeful exclusion of some information from revision to revision (e.g., based on system type, facility owner, landmark type, content of one or more image layers, etc.) may be useful in maintaining the proprietary nature/confidentiality of some information. For example, information in a previous revision regarding a first utility company's infrastructure may be purposefully excluded from a new revision of an engineering plan that may be passed on to a different utility company. In this manner, locations of certain engineered systems may be hid from parties not associated with those systems.

In yet another aspect relating to revision layers, different users or classes of users may have different privileges with respect to creation of revision layers. For example, once a user/engineer has created an original engineering plan, the user/engineer themselves and/or other parties may have access to the original engineering plan to create one or more revisions of same. However, all such parties may not necessarily have the same functionality available to them via a tool 10 to create such revisions. Stated differently, the "status" or identify of a given user or class of user may be associated with a degree to which they may modify information in an engineering plan to create revisions (e.g., based on particular functionality that may or may not be enabled on a tool 10).

E. Grids for Facilitating Generation of Engineering Plans

Figure 13:
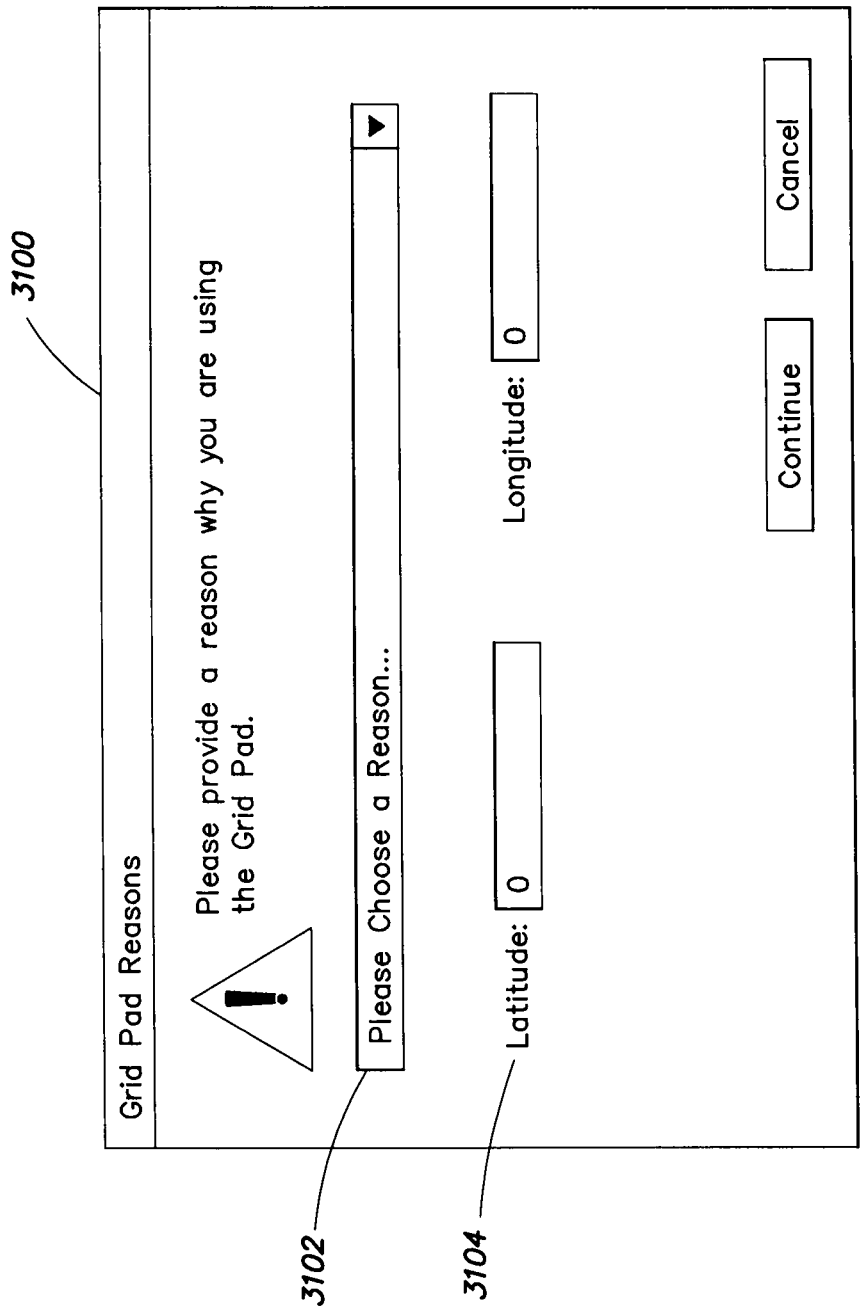
FIG. 13 shows another user interface display screen of the plan generating tool of FIG. 3A, illustrating a dialog box for entry of reasons for selecting a Grid pad feature.

In some instances, an image of a work site may not be suitable to create the engineering plan (e.g., because an image of the work site is not readily available, or is of insufficient resolution/clarity, is not sufficiently accurate in one or more respects, does not include appropriate landmarks or other features, etc.). In such cases, with reference again to FIG. 4, an engineer may activate the Grid Pad icon 1704 to provide an alternative basis on which to generate an electronic engineering plan according to one embodiment. Once the Grid Pad icon 1704 is selected, a pop-up window 3100 as shown in FIG. 13 may be displayed. The window 3100 in this embodiment includes an instruction directing the user to select a reason for using the Grid Pad. Exemplary reasons that may be selected in the pull-down menu 3102 include that the work site image was incorrect for the location, too small, outdated, inverted, reversed, cut-off, of poor resolution, included excessive tree cover, and/or any other suitable reason. Another exemplary reason that may be selected in the pull-down menu 3102 is that an image could not be acquired, e.g., the tool 10 could not retrieve a work site image due to poor cellular or other network coverage. If none of the reasons provided in pull-down menu 3102 are appropriate, the user may select "other," which will cause the user to be prompted to specify a reason in a pop-up text box. Specifying a reason for using the grid pad may optionally be required for the user to access the grid pad feature. Input fields 3104 for specifying latitude and longitude coordinates for the grid may also be specified. The latitude and longitude or other reference point(s) specified may be used to establish a reference point on the grid, for example by assigning the latitude and longitude to a center point on the grid.

Figure 14:
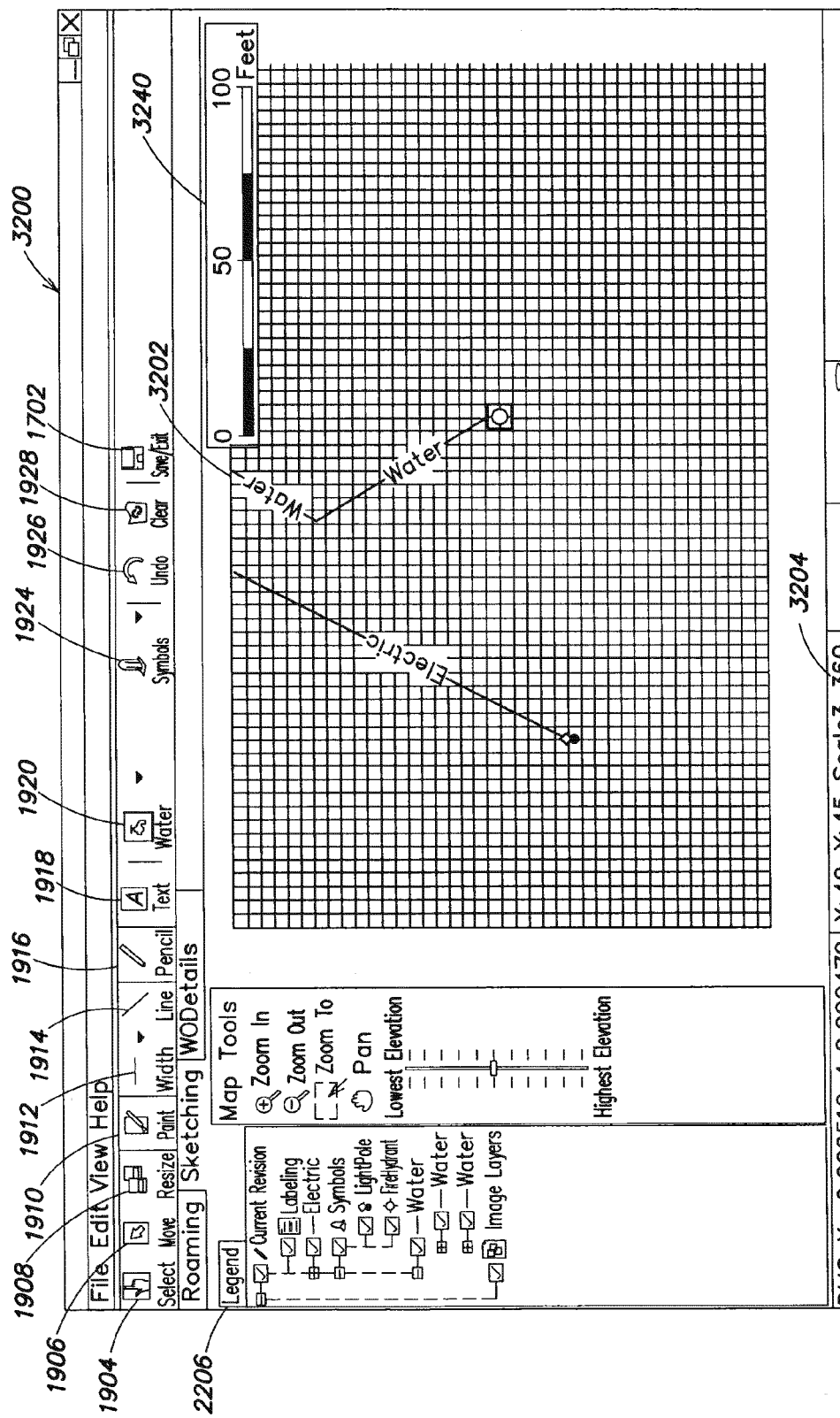
FIG. 14 shows another user interface display screen of the plan generating tool of FIG. 3A, including a grid serving as an alternative to a work site base image, and markup information for Electric and Water systems place on the grid by an engineer using the tool, according to one embodiment of the present invention.

FIG. 14 shows a user interface display screen 3200 rendered on the display device 11 of the plan generating tool 10, according to one embodiment, including a bare grid 3202 when the user interface 12 is in a sketching mode (pursuant to selection of the "Sketching" tab 1708, as discussed above in connection with FIG. 7. In a manner similar to that of using a work site base image, markup information including digital representations of one or more pieces of equipment to be installed, as well as existing facilities, landmarks, text boxes, etc. may be created and displayed over the grid 3202 to create a marked-up digital image constituting an engineering plan. Thus, techniques used to generate an engineering plan while using a work site base image may remain the same when instead using a grid. Further, as when an underlying work site base image is used, a scale 3204 and geographic coordinates 3206 may be displayed as part of the user interface display screen 3200. The scale 3204 corresponds to a scale of the grid, and the geographic coordinates 3206 correspond to a geographic location of a point on the grid (e.g., the centroid).

During the plan generation process using a grid, it may be necessary to determine the extents of a marked-up digital image and/or grid to be saved. According to one exemplary method for determining the extents of an image, the centroid of the digital representations formed on the image and/or grid may be first determined. Next, the extents of the digital representations are determined using the centroid as a reference point. For example, the extents of the digital representations may comprise a pair of coordinates (e.g., −x,−y and +x,+y) that define the smallest rectangle fully encompassing the digital representations. This rectangle may be referred to as the "mark-up rectangle." Thereafter, the area of the mark-up rectangle may be compared to a predetermined minimum area, referred to as the "minimum image rectangle." If the area of the mark-up rectangle is smaller than the area of the minimum image rectangle, then the image or grid may be saved using the extents of the minimum image rectangle. Alternatively, if the area of the mark-up rectangle is greater than the area of the minimum image rectangle, then the image or grid may be saved using the extents of a "buffered mark-up rectangle" that comprises the mark-up rectangle with a buffer region therearound.

In other embodiments where a work site base image is not suitable for use, a user may create an underlying image of the work site, e.g., using the drawing tools and/or symbols of the user interface application, by capturing a photograph of the work site, and/or in other ways. For example, the user may create a "manual drawing layer" for the work site image and the user interface 12 may be configured such that the features of the manual drawing layer are rendered to automatically conform to a particular scale. For example upon selection of a "Dwelling" symbol from a drop down menu associated with the Symbols icon 1924, the user may be prompted to input the dimensions or approximate size of the dwelling. Then, the user interface 12 may render the dwelling symbol according to the inputted dimensions or size and the scale into an engineer-created image of the work site. Alternatively, the user may simply manually alter the size of the dwelling symbol with reference to the scale. In either case, as the zoom tools under map tools 1804 are used to change the scale of the drawing, the dwelling symbol may automatically change in size in accordance with the change in scale.

To assist a user in manually rendering the features of the work site on the manual drawing layer, a grid layer may be displayed like that in FIG. 14 so that the engineer can refer to the grid layer in determining an appropriate size of the manual renderings. The scale of the grid may correspond to the scale 3204 shown on the screen, e.g., such that the length of one square of the grid is equal to a length (e.g., 5 feet) shown on the scale 3204. Alternatively, the length of one square of the grid may correspond to one unit length (e.g., 1 foot) or some arbitrary length. The grid layer may be overlaid on the manual drawing layer, e.g., so that each layer can be individually controlled. Alternatively, the manual drawing layer may alternatively be overlaid on the grid layer. If the manual drawing layer is at least partially transparent, the grid will be visible even though it is below the manual drawing layer. The grid layer may be selectively enabled or disabled for display in the same manner as the manual drawing layer, i.e., by selecting the associated check box in the layers legend tab 2206.

F. Image Processing to Improve Quality of Work Site Base Images

In another aspect of the invention, for work site images that have a poor quality, a variety of image processing techniques may be employed (e.g., via the user interface 12 of the tool 10) to modify an image. In exemplary aspects discussed in further detail below, such image processing techniques may be particularly helpful in situations in which the clarity and/or resolution of the image is such that features of significance relevant to creating the engineering plan are blurred or indeterminate. In such cases, image processing techniques may be used to facilitate improved feature recognition and/or detection in the image. In other examples, it may be desirable to remove objects in part or entirely from a digital image; for example, with respect to photographic images, objects such as cars, bicycles, trees, other landscape features, and the like may have been present in the scene at the time the image was acquired, but may no longer be present in the environs at the time the engineering plan is generated. In such cases, particularly if such objects interfere in some manner with the plan generation, image processing techniques may be used to "erase," in whole or in part, one or more objects from the image.

With respect to image processing, edge-detection and other image processing algorithms (e.g., smoothing, filtering, sharpening, thresholding, opacity/transparency, etc.) may be employed in connection with various types of base images to improve feature recognition and/or remove undesirable features. In some exemplary implementations, in a manner similar to that noted above in connection with image layers, multiple graphics layers (e.g., bitmap and/or vector graphics layers) may be composited over a given base image, wherein one or more graphics filters are employed for the respective graphics layers to improve one or more aspects of image quality and enable comparative viewing of original and processed image information.

With respect to lower resolution images, in some cases it may be difficult to discern the boundaries of certain environmental features of relevance to generating the engineering plan. According to one exemplary implementation, this difficulty may be addressed by applying an edge detection algorithm to images to be displayed, and displaying the detected edges as a layer overlaying the lower resolution image. One exemplary edge detection algorithm that may be employed (e.g., as a routine of the user interface application) is the Canny edge detection algorithm, which is a known algorithm in image processing. The algorithm may generate lines along the borders of areas having strong intensity contrast. Thus, the algorithm may preserve important structural properties in the image, while filtering out less useful information. For example, the edges shown in an edges layer may assist a user in identifying boundaries, and therefore in determining the proper location of digital representations of different engineering plan details. The boundaries may correspond to the boundaries of structures, such as a house or garage, and/or environmental features, such as a sidewalk or body of water. A grid layer may also be overlaid on the image to assist with identifying distances between boundaries and other features. An exemplary process for creating an edges layer may involve the use of Map Suite GIS Software (based on .NET components) available from ThinkGeo LLC of Frisco, Tex.

With respect to edge detection, first, a same size, grayscale copy of the lower resolution image may be created. Next, a Canny edge detection filter, such as the Canny edge detection filter available through the open source AForge.NET computer vision and artificial intelligence library (http://www.aforgenet.com/framework/features/edge_detectors_filters.html) may be applied to the grayscale copy to compute edge outlines. Since the resulting filtered image will have whiter lines at the location of the edges, the gray palette of the filtered image may be inverted so that the edge outlines are shown as darker lines. Additionally, an alpha component of the dark pixels may be set to implement opacity for the outline image lines. Next, a threshold filter may be applied to the filter gray-palette-inverted image to significantly reduce noise lines and pixels, and may reduce the width of the edge lines to approximately one to two pixels in width.

The threshold filtered image may then by converted to a bitmap image with a desired pixel aspect ratio and scale, and overlaid on the base image to comparatively illustrate the clarified edges (e.g., the image aspect ratio and scale of the bitmap image should match that of the original base image so that it overlays correctly at all zoom and pan settings). Factors to be considered in matching or sufficiently approximating image scales include the original scale of the base image and grayscale copy image against which the edge outlines were computed, and the ratio of the original map screen size to the current screen size.

An edges layer created in this way may be overlaid on an input image of the work site to enhance or otherwise modify the work site image. Other image processing algorithms may be applied to an input image, and the result may be rendered in its own layer. For example, a sharpened input image or a threshold filtered input image may be rendered as a layer. The layer resulting from the image processing algorithm may be composited over the input image on which it was based or may be used in place of the original input image. In addition, some or all of a layer (e.g., an image layer, a markings layer and/or a revision layer) may be transparent, so that when the layer is overlaid on another layer, the lower layer is still at least partially visible. The user interface application may accept parameters from a user to set the transparency of a layer.

Another issue that may arise in connection with a work site image is that cars, trees or other environmental features may appear where engineering plan details are to be drawn or otherwise electronically rendered. In this case, it may be desirable to essentially erase the feature from the image so that the engineering plan information does not appear on top of the environmental feature. The user interface 12 may be configured to allow the input image to be manually or automatically modified so that these or other extraneous features appearing in an image may be altered. According to one example, the user interface may include shape or object recognition software that allows such features to be identified and/or removed. One example of software capable of recognizing features in an image, such as an aerial image, is ENVI® image processing and analysis software available from ITT Corporation of White Plains, N.Y. Exemplary features that may be recognized include vehicles, buildings, roads, bridges, rivers, lakes, and fields. The user interface may be configured such that a value indicating a level of confidence that an identified object corresponds to a particular feature may optionally be displayed. Automatically identified features may be automatically modified in the image in some manner. For example, the features may be blurred or colored (e.g., white, black or to resemble a color of one or more pixels adjacent the feature). Additionally, or alternatively, the user interface may include drawing tools (e.g., an eraser tool or copy and paste tool), that allow such features to be removed, concealed, or otherwise modified after being visually recognized by a user or automatically recognized by the user interface or associated software.

III. Process Guides to Facilitate Generation of Engineering Plans

In accordance with another aspect of the invention, the plan generating tool 10 may provide help for the engineer in generating a plan. For example, with reference again to FIG. 6, the toolbar 22 in the FIG. 6 embodiment also includes a "guidance tab" 1604 which, when selected, provides various engineering assistance functions, and a "best practice" tab 1606 which, when selected, provides various recommendations for generating an engineering plan based on predetermined/previously established best practices. Although these functions can operate in different ways, by selecting the assistance function, the engineer can cause the user interface 12 to display information that may be helpful to the engineer, such as a list of tasks that should be completed when generating the engineering plan, one or more suggestions for additions or changes to the plan (e.g., in response to a last piece of equipment added to the plan), and other potentially helpful information. The assistance may be presented in any suitable way, such as in a list in a vertical column on the right side of the displayed image, a display of a single assistance item on the image, a prompt to include a piece of equipment in the plan at a particular location, and others.

For example, with the assistance feature enabled, the display device 11 may render on a user interface display screen a first assistance item to be completed and continue displaying the item until it is completed by the engineer or automatically by the tool 10. Thereafter, a next assistance item may be displayed. In one embodiment, a first assistance item might indicate "verify current location at work site." Thereafter, the tool 10 may determine its current location and compare the location to the work site location to confirm that the engineer is in the proper place to prepare the engineering plan. (Such confirmation may be performed by the tool 10 comparing its current location to a location of the work site. If a distance between the two locations is below a threshold, if the two locations match, or otherwise meet desired criteria, the tool 10 may conclude that it is located suitably close to the work site.) Once this item is completed (e.g., automatically by the tool 10, or with input from the engineer), a second assistance item may be displayed, such as "determine first junction box location near landmark X," where the landmark X could be a logical starting location such as the utility pole P/H5-100 in FIG. 6. Once the location for this junction box is indicated, e.g., by the engineer placing a corresponding icon or other indication on a displayed image of the work site, a third assistance item may be displayed, such as "define conduit location between landmark X and first junction box," and so on. Thus, the assistance function can provide a kind of flow chart or process guide that the engineer can follow, at least in part, to complete the engineering plan generation. Moreover, the assistance function may provide information to the engineer based on prior, recent actions taken by the engineer. Thus, the tool 10 may provide interactive assistance to the engineer that is relevant to recent additions or changes to the plan. For example, if an engineer adds an amplifier at a certain location, the assistance function may automatically add a suitable housing for the amplifier at the same location. In this case, the engineer need only specify the amplifier, and the assistance function can automatically insert an indication for a suitable housing that is appropriate to the amplifier.

Of course, the assistance function need not provide a fully comprehensive and chronological list of steps to be completed by the engineer, but rather may include a list of selected items that are presented in any suitable order (or no order at all). For example, the assistance may include a list of items that should be performed, or that must be performed, for a particular engineering plan. For example, the assistance may indicate items such as "5 houses at 11-17 Levitt St. to have optical fiber installed suitable for service requirement X" or that "each dwelling to have equipment A, B, C and D installed." In some cases, a customer may wish to have certain tasks completed or certain information included with an engineering plan, or may impose unique specifications for the plan. In that case, the assistance function could include those items and require that the engineer complete the items, or that they otherwise be completed, before the engineer can indicate that all or a portion of the plan is completed. Completion of an assistance item may be indicated by a user of the tool 10 providing a suitable indication, such as clicking or otherwise selecting the displayed item, or in an automated way by the tool 10 determining that the assistance item has been completed.

As noted above, the toolbar 22 of FIG. 6 also includes a "best practices" feature that may be selected by an engineer via the "best practices" tab 1606, or that may be implemented automatically. In some ways the "best practices" feature may be similar to the "assistance" feature. In one embodiment, the "best practices" feature may provide information to the engineer or to the plan in an automated way that is not done by the assistance feature. That is, the best practices feature may provide a resource for engineers to help ensure that the engineering plan is created according to industry best practices. For example, an engineer may be unclear regarding the appropriate maximum distance between certain types of junction boxes or other equipment that are interconnected by a particular type of communications cable. In that case, the engineer may refer to the best practices feature, which may provide a search or lookup function to allow the engineer to find and review the appropriate industry standards or requirements. In another embodiment, the best practices feature may, as one example, automatically compare the distance between junction boxes in a plan under development to best practices information and make a recommendation (such as a change in interconnecting cable or installation of an additional junction box) if the distance between two interconnected boxes is too long. In one embodiment, upon an engineer indicating that a junction box is to be placed at a specific location on the image, the best practices feature may determine the distance from the new junction box to a nearest box along with any other relevant information (such as a type of interconnecting cable, system data requirements, etc.) and make a suitable indication as to whether the new box's placement meets best practices requirements (e.g., the user interface 12 may insert the new box icon or other symbol in a green color to indicate that the box location is in accordance with best practices, or in a red color to indicate that some type of change should be made).

In another embodiment, the best practices feature may automatically make suggestions for equipment installation. For example, in response to an engineer placing an initial junction box at a particular location, the best practices feature may provide a prompt regarding suitable distances for placement of additional junction boxes. In one embodiment, the user interface 12 may display suggested junction box placements on the image, e.g., by displaying a dashed line or faint indication where a next junction box should be placed relative to the initial junction box. In response, the engineer may select the indication or otherwise agree to add the junction box at that location to the engineering plan. In another illustrative embodiment, the best practices feature may display an indication of an area within which a next junction box should be placed, e.g., as an area within a ring displayed around the initial junction box. The engineer may use this indication to verify that the next junction box added to the engineering plan is located within the ring, and thus within a suitable distance of the initial box. These are only a few examples of actions the best practices feature may take, and it should be understood that other functions may be provided. For example, the best practices feature may provide information regarding placement of any and/or all equipment indicated in an engineering plan, including conduit, utility poles, amplifiers, switches, relays, multiplexers, pipe, etc., as well as actions to be taken in installing the equipment, such as trench or footing depths, gravel or other fill to be used, grading details, grass seeding or other surface treatments, fencing details, and so on.

IV. Site Visit Reports

Once an engineer has completed work in generating an engineering plan (e.g., generating a marked-up digital image from a work site base image or a grid), the engineer may take steps to create, save, and/or transmit from the plan generating tool, a "site visit report" that includes various information relating to the engineering plan and the plan generation operation overall. The engineer's work on the plan need not necessarily be entirely finished prior to saving information in a site visit report. To the contrary, the site visit report may be created and saved during the plan generation process and before all work on a plan has been done.

Figure 15:
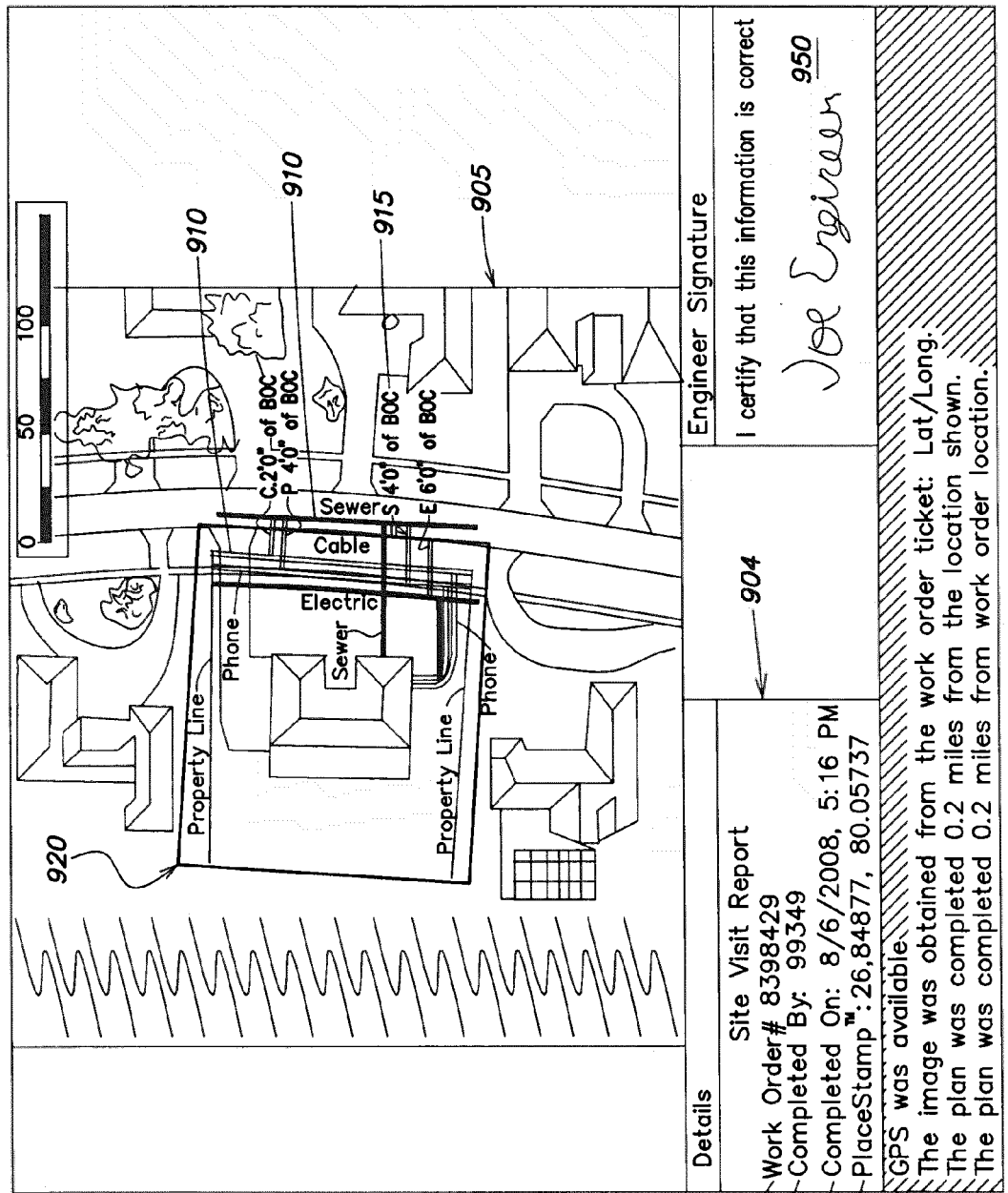
FIG. 15 shows another user interface display screen of the plan generating tool of FIG. 3A, with site visit report information for an engineering plan, according to one embodiment of the present invention.

FIG. 15 shows an illustrative user interface display screen, rendered by the display device 11 of the plan generating tool, illustrating a site visit report 900 according to one embodiment of the present invention. The site visit report 900 may include the generated engineering plan 905 itself, various report details 904 provided as text information relating to the plan generation operation performed by the engineer, and an engineer certification 950.

More specifically, in the exemplary site visit report 900 shown in FIG. 15, the engineering plan 905 included in the report 900 includes various markup information, added to a work site base image, relating to cable, sewer, phone and electric systems, respectively, including digital representations for various components of each system 910, offset indicia 915 (which may indicate a position for one or more of the system components relative to a boundary line or other reference point), a boundary line 920 (which may designate an outer boundary of a geographic area to which the engineering plan(s) relate or other reference point), and/or other engineering plan information. In addition to the engineering plan 905 itself, as noted above the site visit report 900 may include non-image information in the form of report details 904, such as a corresponding work order number 925 or other identifier for requesting generation of the engineering plan, an engineer number 930 or other identifier for the engineer that created the plan, a date and time stamp 935 indicating when the site visit report was created, a location stamp 940 indicating the work site location at which the report was completed. The site visit report 900 further includes an engineer signature 950, e.g., certifying that the information of the site visit report is correct.

In another aspect, the site visit report 900 may also include an area 970 in which a location verification application (discussed above in connection with FIG. 3C) may provide an indication that an engineer's location while performing a plan generation operation was "correct" (i.e., sufficiently near to the work site) or incorrect. For example, in some embodiments, area 970 may be given a particular shade or color based on a determination made by the location verification application (e.g., red=location incorrect; green=location verified). For example, with reference to FIG. 3C, if the location verification application determines that one or more of the comparisons performed at blocks 203, 205, and 207 failed (i.e., the geographic locations compared in one of these comparisons are not within the threshold distance of each other), the area 970 may be colored red. If the location verification application determines that one or more of the comparisons performed at blocks 203, 205, and 207 were successful (i.e., the two geographic locations compared in each comparison are within the threshold distance of each other), the area 970 may be colored green. If the second and third geo-location data was not available (e.g., due to a malfunctioning positioning unit/other GNSS receiver), such that the location verification application was unable to verify the engineer's location, the area 970 may be colored orange.

In some embodiments, area 970 may include information (e.g., text) explaining the reasons that location verification application made a particular determination with respect to the engineer's location. For example, if area 970 is colored red, text may be included explaining which comparison(s) (e.g., of comparisons 203, 205, and 207) failed. If area 970 is colored orange, text may be included explaining that GPS data was unavailable.

The various information constituting the site visit report 900 may be stored as a single file (e.g., a combined image or image and text file), in multiple associated files, as one or more database records, or in any other suitable way, e.g., in the storage 17 of the tool 10. It should be appreciated that the site visit report 900 shown FIG. 15 is merely exemplary, and that a site visit report as described herein may alternatively include other combinations of the information described herein and may be formatted in different manners.

A site visit report may serve several purposes. For example, the site visit report may allow a manager, customer, or other entity the ability to review the status of the engineering plan, to generate cost estimates for future required engineering work or cost estimates for installation of the engineering system reflected in the plan, to verify the accuracy of the engineering plan, and other aspects of the plan generation operation.

Moreover, by providing the engineering plan in an electronic form (as part of a site visit report, or as one or more "stand alone" electronic files), formalizing drawings (e.g., CAD drawings) for the design of the infrastructure to be installed pursuant to the engineering plan may be done more efficiently, e.g., because a draftsman may use/import the electronic engineering plan in connection with a CAD tool to create formalized drawings. Thus, use of the engineering plan tool 10 to generate electronic engineering plans, and/or site visit reports relating to plan generation operations, may provide significant improvements in accuracy and time savings.

For example, converting conventional paper engineering plans (e.g., made by an engineer via a manual sketching process) to formalized CAD drawings can be time consuming and imprecise. In particular, with manual sketching, the general geographic features of the work site location (e.g., roads, sidewalks, landscaping, buildings, and other landmarks), in relation to the location of piece of equipment for engineered systems to be installed, may not be accurately represented in the sketch and/or errors may be made in the translation from sketch to formalized CAD drawings. In contrast to conventional manually-sketched paper engineering plans, creation of an electronic engineering plan by marking up a work site digital image via a plan generating tool as described herein significantly improves accuracy and reduces drafting errors. Additionally, or alternatively, an electronic engineering plan may provide a variety of data formats that can significantly facilitate subsequent generation of formalized drawings.

Moreover, the generation of electronic site visit reports, including various information relating to a plan generation operation conducted by an engineer, facilitates review of the engineer's work without necessarily requiring viewing of the engineering plan itself. For example, the fact that an engineer produced plan details while at a work site can be reviewed and checked without the need to review any image data. Also, image data may be automatically parsed in different ways, again potentially helping a review of the plan information. For example, the type of engineered system may be determined based upon different colors, different line types (e.g., solid, dotted or dashed), or other coding schema used to represent the different respective systems (such as yellow color for gas, red color for electric, and so on).

Furthermore, cost estimates for installing the system represented in the plan may be facilitated because the electronic plan data may be used to create equipment lists, determine lengths of conduit or other materials priced by the foot or other dimension, and so on. For example, information in a site visit report (or in an electronic engineering plan itself) may be used to generate a complete bill of materials for a system, which may be used to generate cost estimates, to place equipment orders or obtain price quotes, to estimate an amount of time needed to complete the system installation, and so on.

Additionally, or alternatively, an electronic site visit report may provide for easier dissemination and record-keeping. For example, a site visit report may be accessed simultaneously by managers, customers, draftsmen, etc., allowing each to use the report for their specific purpose and without requiring paper copies to be made and distributed. A site visit report can be modified, e.g., after being sent from a tool 10 to a central system server, to include one or more annotations indicating that the site visit report and its contents have been reviewed and/or approved (e.g., by quality control supervisor). Such an indication may comprise, for example, the signature of the reviewer.

As discussed above, since it may be possible for an engineer to create an engineering plan without ever visiting the work site, it may be desirable to verify that at least portions of a plan were actually generated at the work site. According to one exemplary implementation, this may be accomplished by verifying that location information logged by the tool 10 comports with geographic information relating to the work site (e.g., identifying in some manner a location and/or extent of the work site), and/or that time information logged by a tool 10 comports with a time frame for performing the engineering plan work (e.g., within 48 hours of the work order being issued). The time and/or location information may be generated by the tool 10 and automatically logged to the site visit report (as indicated in the information 904 included in the site visit report 900 shown in FIG. 15). The time information may comprise, for example, a time stamp generated by a clock internal to the tool 10. Such a time stamp may comprise a date and/or time indicative of when the plan generation was performed. The location information may comprise, for example, GPS coordinates or GPS-derived data such as a city, state, county, and/or address indicative of where the plan work was performed. The time and/or location information may be stored and/or transmitted as part of the marked-up image or associated data.

Data or non-image information associated with generating the engineering plan, such as time spent performing certain actions, can optionally be tracked and stored by the tool 10 and included as part of a site visit report. Exemplary data that may be stored includes: a start time and/or date of the plan work; a start time and/or date of the site visit report and/or associated sketch or drawing; an end time and/or date of the work on the plan; an end time and/or date of the site visit report and/or associated sketch or drawing; a total time for work on the plan (e.g., a plan relating to electric, gas, cable, phone, water, recreational water, and sewer systems); an activity count (e.g., actuations of the Symbol icon) associated with generating the plan; a total time or activity count for other actions (e.g., walking a work site, a number of images captured with a camera, a number of hand drawn markings made on a work site image, a number of modifications made to image markup information, such as actions for selecting, dragging, resizing, or performing an undo, clear or zoom); time and data associated with menu clicks, line clicks, and point clicks; image request information and information identifying the requested image; data associated with drawing lines (e.g., utility type, begin location, end location, width, and characteristic (e.g., dashed or solid)); data associated with drawing points (e.g., utility type, location, width, characteristic (e.g., symbol type)); data associated with text boxes (e.g., location, characteristic (e.g., color), and text); and drawing data (e.g., start and end time, work order number, user name and/or identification, and IP address).

The data described above that may be tracked and stored by the tool 10 can be used, for example, to determine the cost of engineering plan generation, verify the performance of an engineer, and/or train the engineer. Such assessments and determinations may be performed automatically using software associated with the tool 10 or a computer that receives data from the tool 10. The software may have an interface that allows the parameters used in the assessment or determination to be customized. For example, an interface may be provided to allow a user to select which and how items of data will be used to assess the efficiency or skill of an engineer. In this manner, a user may specify that a time lapse between the start and end times of creation of a sketch or drawing associated with a site visit report will be used to assess the efficiency or skill of an engineer.

V. Systems Including Multiple Plan Generating Tools

Although in the embodiment above, a single engineer uses the plan generating tool 10 on a single trip to the work site to generate an engineering plan, it should be understood that the engineer may make several trips to the work site to generate the plan. Also, several different engineers may use the tool 10 to generate the plan on one or several different trips to the work site. Moreover, the engineers may use the same tool 10, or may use multiple tools 10 to generate the plan. For example, a first engineer may be a specialist in generating plan details for a fiber optic cable installation, whereas a second engineer may be expert in generating aspects of the plan that relate to rerouting of existing electrical lines made necessary by the installation of the fiber optic cable. In this case, the two engineers may travel to the work site and use their own respective plan generating tools 10 to generate their respective portions of the engineering plan.

In one embodiment, multiple plan generating tools 10 may share information so that as each engineer generates plan details, that information is sent to the other engineer's tool 10 and displayed on the tool 10. In this way, each engineer can view the engineering plan details as they are developed and can provide feedback or adjust their work on the plan accordingly. For example, if the first engineer marks up his work site base image to indicate the placement of fiber optic cable and other associated equipment in a particular area, the second engineer may view the new cable placement on his tool 10 and take necessary steps for rerouting electrical lines accordingly. Such information may be shared in real-time or on a more delayed basis, e.g., where plan details generated by an engineer are quality reviewed by one or more other people or analyzed in a more automated way before the details are shared with other engineers.

Thus, in one aspect of the invention, one or more plan generating tools may be part of a plan generation system that is used to manage one or more parts of the plan generation process, including initial plan request from a customer, creation and dissemination of work orders, storage and management of work site base image data along with engineer markup information, auditing and quality checking of engineer markup information and other plan data, engineering plan finalization, and/or plan execution (e.g., installation of equipment and performing other work according to an engineering plan).

Figure 16:
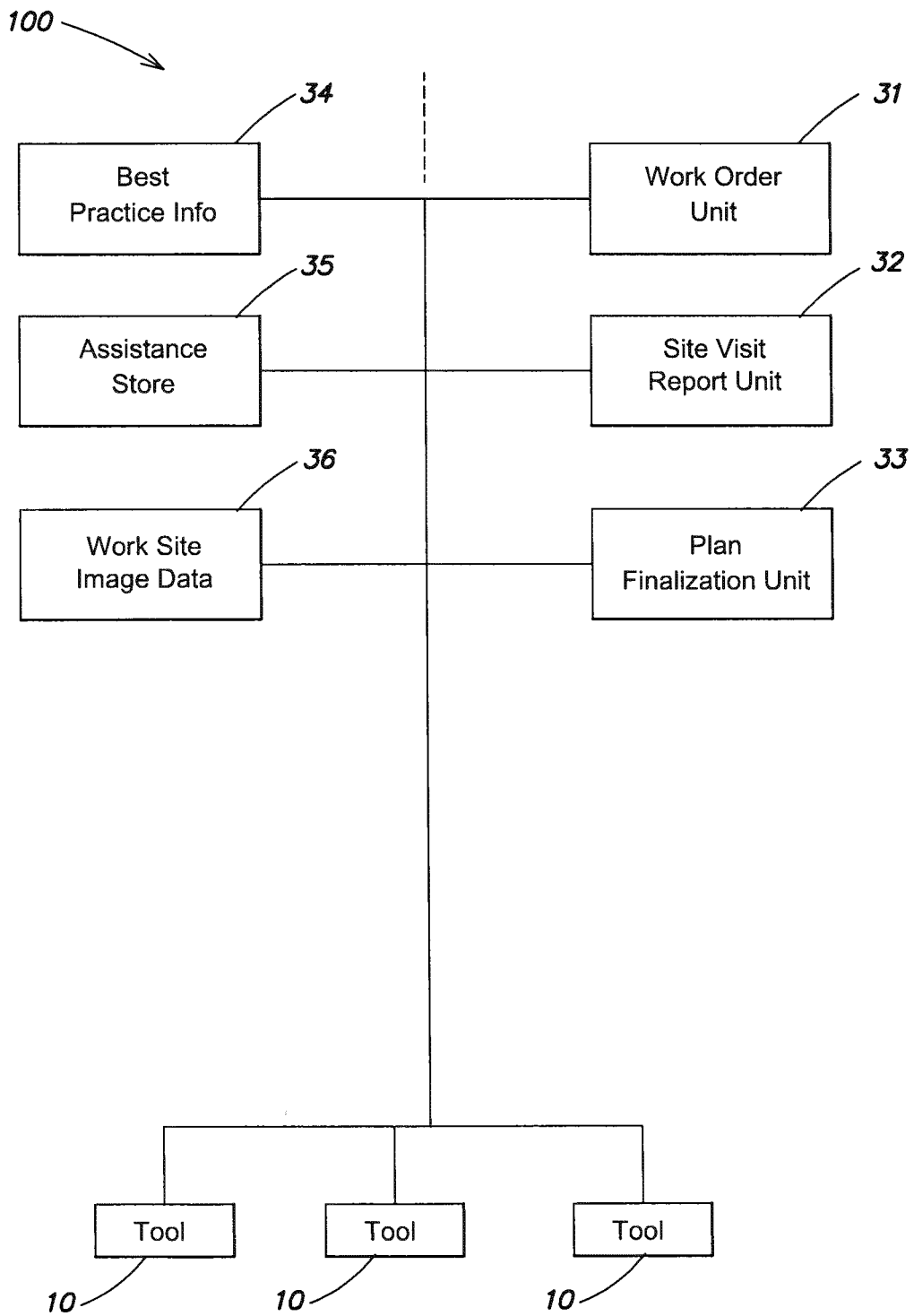
FIG. 16 is a schematic block diagram of an engineering plan generation system including multiple plan generating tools of FIG. 3A, according to one embodiment of the present invention.

FIG. 16 shows an illustrative embodiment of an engineering plan generation system 100 that includes a work order unit 31, a site visit report unit 32, plan finalization unit 33, a best practice store 34, an assistance store 35, a work site image data store 36, and a plurality of engineering plan generation tools 10. As discussed above, the plan generation tools 10 may be mobile units, e.g., taking a form similar to a tablet computer, personal digital assistant (PDA), or similar device. Other portions of the system 100 may be implemented in one or more programmed general purpose computers (such as a network server), or a network of computers (e.g., multiple servers), as dedicated hardware or firmware components and/or other components needed to perform input/output or other functions. The tools 10 may communicate with other portions of the system 100 by wired or wireless communication using any suitable communication system(s) or protocol(s), including communication systems such as wireless local area networks (WLANs), personal area networks (PANs), the Internet, Ethernet networks, cellular telephone networks, USB ports and connections, RS232 connectors, RJ45 connectors, Bluetooth® technology, Wi-Fi, Wi-Max, IEEE 802.11 technology, radio frequency (RF), shared wireless access protocol (SWAP), Infrared Data Association (IrDA), and any combinations thereof.

Requests for generation of an engineering plan may originate with the work order unit 31, which, in response, may generate a work order to be executed so as to generate an engineering plan. A plan request may be originated in any suitable way, such as by an email, facsimile, telephone call or other communication that causes the work order unit 31 to initiate a work order for the requested plan. Receipt of the request may cause the work order unit 31 to automatically generate a work order, or may cause a human operator to interact with the work order unit 31 to create the work order. The work order may take the form of a database record, list, or other file or group of files as desired. The work order may include any suitable information such as:

A location for a work site for which an engineering plan is to be generated (e.g., an address, a set of coordinates, a plat or plot number, a facility name, and so on);

Image information for the work site, such as aerial photographs, satellite images, utility plot or plats, town or municipality map images, street maps, videos or still images of the work site (e.g., taken at ground level of landmarks or other features at the site), CAD or other similar computer drawings including features of the work site, hand drawn sketches of the work site (e.g., in PDF or other format), and so on;

Information regarding work scope, such as the type of system to be installed and/or results to be achieved;

Tools or other equipment needed at the work site to generate the plan, such as surveyor's tools, marking devices, utility locate devices, ladders, vehicles, stakes, ribbons, measuring tapes, and so on;

Estimated time needed to complete the plan (which may represent an estimated time needed at the work site to prepare initial plan details, and/or other time needed to finalize the plan. It should be understood that a work order for an engineering plan may be for a complete engineering plan, or a portion of a complete plan. For example, a plan request may indicate that both fiber optic cable and sewer be installed at a work site. However, separate work orders may be generated for the request, i.e., one for the cable installation and one for the sewer installation plan. These work orders may be linked such that after site work is completed, the plan information generated by two different engineers for the cable and sewer portions of the plan may be merged into a single plan, e.g., into a single drawing set.);

Assistance information that may be used with a plan generating tool 10, including specific customer plan requirements, a work flow to be implemented by the engineer at the work site when generating the plan, and so on;

Best practices information that may be used with a plan generating tool 10, including relevant industry standards for the plan, engineering firm requirements, automated plan generation tools (such as automated equipment location suggestion features), and so on;

Risk, such as potential liability for damages if, for example, the plan is incorrectly prepared or if the installation of equipment according to the plan does not operate as desired;

Business value, such as revenue generated by the plan, profitability of the plan, estimated value to the customer, etc.;

Engineer resources, such as shift information (which may be used to identify engineers available to work on a plan), engineer skill set and history (which may identify the minimum skill set that the engineer(s) working on the plan should have and/or that engineers working on the plan should have prepared at least one or more similar plans in the past, or have prepared a plan for the client or at the same work site in the past), certification requirements or security clearance for the plan (e.g., plans to be generated at a secure government work site may need to be generated by engineers having a particular security clearance and/or certification), the identity of an engineer or set of engineers to work on the plan, and others.

A work order need not be formed by a single continuous file or set of files stored in a single location. Instead, a work order may be comprised of information stored in different locations. For example, a single set of best practices information and assistance information may be stored in all tools 10 and used for every engineering plan generated using the tools 10. Thus, if a work order is created at the tool 10 or work order unit 31, the electronic file created need not necessarily include the best practices or assistance information that is already stored in the tools 10. Instead, the work order may include a pointer or other reference to the best practices or assistance information, or may include no reference to the information at all. Instead, the user interface 12 may simply access the information as needed. Also, a work order stored at a tool 10 need not include the same information as included at the work order unit 31. For example, a work order stored at a tool 10 may include only a minimum amount of information needed by the engineer to complete work on the plan. In contrast, the work order stored by the work order unit 31 may include more detailed information, such as engineer schedules and availability, risk or business value information, time estimates for generating the plan, and so on.

A work order may be used by a manager to allocate, schedule, and appropriately dispatch one or more engineers to create the plan pursuant to the work order, as well as to create other plans. Scheduling of engineers may be done in an automated or manual way, e.g., a computerized scheduling system may match engineer availability and plan requirements (e.g., experience, engineer ID, certifications, etc.) with plan work orders, and dispatch engineers in a completely automated way. Alternately, a manager may review work order information and engineer scheduling information (e.g., plan time estimates, engineer availability, etc.), and assign work orders to engineers as appropriate. As suggested above, engineer dispatch may depend on a variety of factors, such as performance deadlines for the plan generation and relevant shift times of available engineers; various parameters relating to the operations themselves (job performance information and/or quality assessment information), engineers (e.g., historical efficiencies, particular skills/certification, security clearance), and/or relevant environmental conditions (e.g., weather, traffic); work order assessment (e.g., risk information; penalty or profitability information; complexity information; engineer skill/certification requirements); contractual obligations between the entity dispatching engineers and responsible for/overseeing the plan generation, and one or more parties for which the operation(s) is/are being performed; statutory and/or regulatory requirements, such as wage and hour compliance for resources (e.g., availability of resources for scheduling complies with applicable wage and hour statutes/regulations), and/or the time and/or manner in which a given plan needs to be generated pursuant to applicable statutes/regulations.

Dispatched engineers may be provided with the work order, or selected portions of the work order to facilitate creation of the plan. In one embodiment, an engineer is provided with an engineering plan generation tool 10 that stores at least a portion of the work order. For example, once an engineer is assigned to a work order, the work order may be sent from the work order unit 31 to a plan generation tool 10 that is associated with the engineer. Upon receipt of the work order, the tool 10 may prompt the engineer that a new work order has been received, and provide the opportunity for the engineer to review relevant details, such as work site location, estimated time for completion, etc. Alternately, a work order may be created at a tool 10 (as discussed above), and sent from the tool 10 to the work order unit 31.

Once at the work site, the engineer can verify that s/he is at the correct location, and display an image of at least a portion of the work site using image data included with the work order. As discussed above, a user of a tool 10 may use the displayed image to create engineering plan details, including providing image markup information, and so on. Generally speaking, image data may have a suitable resolution so as to be useful to the engineer in generating an engineering plan. The image data may be provided from any suitable source, such as a work site image data store 36 that is part of the system 100, a third party image provider (such as a satellite or other aerial image provider), utility owners, government entities, and so on. The work site image data store 36 may store image data in one or more storage devices at one or more locations and in any suitable format. For example, the work site image data store 36 may include one or more databases of image information that is provided by utility companies, municipalities, private contractors, and other suitable sources. Image data may include identifier information useful for associating the image data with a work site or work order. For example, image data may be stored with corresponding geographic coordinates, street addresses, a name of a geographic area, a work order identification number, or other information that may be used by the work order unit 31, a tool 10 or a human operator to retrieve desired image data from the work site image data store 36. In one illustrative embodiment, a work order unit 31 may convert an address or set of addresses corresponding to a work site to geographic coordinates, and use the geographic coordinates to search in the work site image data store 36 for suitable image data to be provided to a tool 10. In other embodiments, other search criteria may be used, such as a search for a corresponding address, site name, geographic coordinate range, a landmark present at the work site, and so on. In another embodiment, a tool 10 may send its geographic coordinates or other position information from the work site to the work site image data store 36 along with a request for corresponding image data. In this way, the tool 10 may be provided with suitable image data only once the tool 10 is located at the work site. If the work order unit 31 is unable to identify an suitable image, a notification may be provided to an operator and/or a indication may be included with a work order for the work site. In response, an operator may take steps to obtain suitable image data from sources other than the work site image data store 36. Of course, image data used by a tool 10 may include multiple images, whether those images are "tiled" or otherwise combined to provide desired coverage for a work site, and/or "layered" so as provide different types of image data on a single display.

In cases where multiple images are available for a work site, the work order unit 31, tool 10 and/or operator may employ one or more criteria to select a suitable image. For example, criteria used to determine which set of images are to be used by a tool 10 at a work site may include an image provider's geographical coverage (e.g., a third party vendor that provides image data for a particular geographic area may be identified and suitable image data obtained from that vendor), image resolution (e.g., a particular engineering plan may require a certain image resolution, and a suitable image may be determined based on the image's resolution as compared to other images), cost (e.g., a lowest cost image may be selected for use over more expensive image data), and availability (e.g., one image may be available for download or other access sooner than another image—the more readily available image may be selected for use). Of course, the criteria may be considered singly or in combination, and may be weighted in different ways for different engineering plan projects. For example, one plan may require a very high resolution image, at low cost that is available within 2 weeks. Another plan may require a low resolution image, with cost not being an important factor, but the image must be available in 1 hour. Accordingly, the different criteria may be weighted in different ways for different plan projects.

The work order unit 31, a tool 10, or operator may take steps to ensure that image data is suitably current for the engineering plan. For example, a work order unit 31 may identify an image in the work site image data store 36 that corresponds to a work site, but then check to verify that the image is suitably current. The currency verification may involve any suitable criteria, such as a comparison of the image creation date to the current date, a determination whether utility work was been done at the work site after the image creation date, whether another available image is more current than the identified image, and so on. If a determination is made that the image data is not suitably current, the work order unit 31, tool 10 or operator may take steps to identify another image in the work site image data store 36 and/or obtain image data from another source (such as a third party vendor).

For purposes of the present disclosure, image data may be representative of any image information regarding a work site that may be electronically processed (e.g., the source data is in a computer-readable format) to display an image (e.g., a work site base image) on a display device. Image data may originate in any suitable way, such as from a variety of paper/tangible image sources that are scanned (e.g., via an electronic scanner) or otherwise converted so as to create image data (e.g., in various formats such as XML, JPG, JPEG file interchange format (JPEG), tagged image file format (TIFF), portable document format (PDF), graphics interchange format (GIF), bitmap (BMP), portable network graphics (PNG), Windows® metafile (WMF), DWG, DWF, DGN, MFI, PMF, and/or the like). Image data also may originate as source data or an electronic file without necessarily having a corresponding paper/tangible copy of the image (e.g., an image of a "real-world" scene acquired by a digital still frame or video camera or other image acquisition device, in which the source data, at least in part, represents pixel information from the image acquisition device).

In some exemplary implementations, image data may be created, provided, and/or processed by a geographic information system (GIS) that captures, stores, analyzes, manages and presents data referring to (or linked to) location, such that the source data representing the input image includes pixel information from an image acquisition device (corresponding to an acquired "real world" scene or representation thereof), and/or spatial/geographic information ("geo-encoded information"). Examples of a wide variety of environmental landmarks and other features that may be represented in GIS map data include, but are not limited to: landmarks relating to facilities such as pedestal boxes, utility poles, fire hydrants, manhole covers and the like; one or more architectural elements (e.g., buildings); and/or one or more traffic infrastructure elements (e.g., streets, intersections, curbs, ramps, bridges, tunnels, etc.). GIS facilities map data may also include various shapes or symbols indicating different environmental landmarks relating to facilities, architectural elements, and/or traffic infrastructure elements. In this manner, a GIS provides a framework for data manipulation and display of images that may facilitate one or more of (a) work site location verification, (b) work site location correlation, (c) locational relationships between landmarks and other objects at the work site, (d) district coding, (e) route analysis, (f) area analysis and (g) mapping/display creation, for example. The GIS map data and metadata may be stored in any of a variety of ways. For example, in some embodiments, the GIS map data and metadata may be organized into files, where each file includes the map data and metadata for a particular geographic region. In other embodiments, the GIS map data and metadata may be stored in database and may be indexed in the database by the geographical region to which the map data and metadata corresponds.

Accordingly, image data from which a work site base image may be rendered may be provided in any of the following forms:

Manual "free-hand" paper sketches of the geographic area at or near a work site (which may include one or more buildings, natural or man-made landmarks, property boundaries, streets/intersections, public works or facilities such as street lighting, signage, fire hydrants, mail boxes, parking meters, etc.);

Various maps indicating surface features and/or extents of geographical areas, such as street/road maps, topographical maps, military maps, parcel maps, tax maps, town and county planning maps, call-center and/or facility polygon maps, virtual maps, etc. (such maps may or may not include geo-encoded information);

Facilities maps illustrating installed underground facilities, such as gas, power, telephone, cable, fiber optics, water, sewer, drainage, etc. Facilities maps may also indicate street-level features (streets, buildings, public facilities, etc.) in relation to the depicted underground facilities. Examples of facilities maps include CAD drawings that may be created and viewed with a GIS to include geo-encoded information (e.g., metadata) that provides location information (e.g., infrastructure vectors) for represented items on the facilities map;

Architectural, construction and/or engineering drawings and virtual renditions of a space/geographic area (including "as built" or post-construction drawings);

Land surveys, i.e., plots produced at ground level using references to known points such as the center line of a street to plot the metes and bounds and related location data regarding a building, parcel, utility, roadway, or other object or installation;

A grid (a pattern of horizontal and vertical lines used as a reference) to provide representational geographic information (which may be used "as is" for an input image or as an overlay for an acquired "real world" scene, drawing, map, etc.);

"Bare" data representing geo-encoded information (geographical data points) and not necessarily derived from an acquired/captured real-world scene (e.g., not pixel information from a digital camera or other digital image acquisition device). Such "bare" data may be nonetheless used to construct a displayed input image, and may be in any of a variety of computer-readable formats, including XML); and Photographic renderings/images, including street level, topographical, satellite, and aerial photographic renderings/images, any of which may be updated periodically to capture changes in a given geographic area over time (e.g., seasonal changes such as foliage density, which may variably impact the ability to see some aspects of the image).

It should also be appreciated that image data related to a work site may be compiled from multiple data/information sources; for example, any two or more of the examples provided above, or any two or more other data sources, can provide information that can be combined or integrated to form image data that is electronically processed to display a work site base image on a display device.

The work site image data store 36 may be associated with the same, or a different, party that maintains other components of the system 100. For example, the work site image data store 36 may be associated with a party that provides image data for a fee. Image data may include various information (e.g., that may be included in a legend of a map, or otherwise associated with the map), such as, a date of the map (e.g., when the map was first generated/created, and/or additional dates corresponding to updates/revisions), a number of revisions to the map (e.g., revision number, which may in some instances be associated with a date), one or more identifiers for a source, creator, owner and/or custodian of the map (e.g., the owner of the facility type represented in the map), various text information (e.g., annotations to update one or more aspects or elements of the map), and any other legend information that may be included or represented in the map. As noted above, in some instances in which facilities maps are in a vector image format, a certain line on the facilities map may be represented by a starting point geo-location, an ending point geo-location, and metadata about the line (e.g., type of line, depth of line, width of line, distance of line from a reference point (i.e., tie-down), overhead, underground, line specifications, etc.). According to one embodiment to facilitate display of a map, each vector image may be assembled in layers, in which respective layers correspond, for example, to different types of facilities (e.g., gas, water, electric, telecommunications, etc.). In one aspect of such an embodiment, each layer is, for example, a set of vector images that are grouped together in order to render the representation of the certain type of facility.

With a base image of the work site displayed on a plan generating tool 10, an engineer may interact with the image and the tool 10 to mark up the image or otherwise create details regarding the requested engineering plan. As also discussed above, the engineer and/or the tool 10 may use assistance and/or best practices information that is included with the work order information stored in the tool 10. Such information may be provided by a best practice information store 34 and an assistance information store 35, which may include any suitable arrangement of computer-readable storage that maintains the assistance and/or best practices information in any suitable way, such as in a database, text, executable code or other file format. The work order unit 31 may determine what assistance or best practices information should be included with a work order and retrieve the information for inclusion with the work order sent to the tool 10. Alternately, such information may be stored on the tool 10, and the work order may include information that references particular portions of the assistance or best practices information that the user interface 12 may use to operate desired functions for generation of the plan.

In one embodiment, a set of instructions or "workflow" may be provided by the tool 10 (e.g., using the assistance function) to guide the engineer through a sequence of steps to generate the plan. Performance via a process guide (e.g., checklist or workflow) may be interactive in that the engineer may provide input to the tool 10 so as to generate the engineering plan in a step-by-step way. Some steps in the process workflow may be performed by the tool 10 so that portions of the plan are performed in a semi-automated way with the tool 10 recommending particular actions (e.g., equipment installation at a particular location, etc.) and the engineer approving or disapproving the actions. As mentioned above, the assistance or best practices information may be obtained from industry sources, a customer or customer requirements, a contract associated with the plan, insurance companies, safety consultants, government regulations or other rules or requirements, and others. Alternately, or in addition, such information may be used to create and implement automated plan generation actions or recommendations. For example, if industry regulations require a particular piece of equipment be installed every 20 feet for a particular installation, the assistance or best practices functions of the user interface 12 could be arranged to automatically insert the equipment at the required distance intervals and/or recommend the installation of the equipment to the engineer.

In response to the engineer interacting with the tool 10 to mark up one or more images regarding a work site or otherwise generate an engineering plan, the tool 10 may store the plan information, e.g., as part of a site visit report. The site visit report may include any suitable information such as:

Location information for the plan generation tool 10 at the work site (e.g., an address, a set of coordinates, a plat or plot number, a facility name, and so on for use in verifying that the tool 10 was located at the proper location);

Image information for the work site, including images captured by the tool 10 or other image capture devices, CAD or other similar computer drawings made by the engineer at the work site, hand drawn sketches or other image mark up information made by the engineer regarding plan details, and so on;

Other plan information, such as equipment to be installed, text notes regarding the plan that are not included with the engineer mark up or other image information above, and others;

Time used to complete the plan or a portion of the plan, which may be indicated by time stamp information regarding the engineer's start and stop of work at the work site;

Engineer identification, such as an engineer name or identification number; or

Information regarding work site conditions, such as ambient temperature information, ambient humidity information, ambient light information, tool 10 motion information (e.g., indicating areas traversed by the tool 10 at the work site), digital image information, and/or audio information.

Upon completion of an engineer's work in generating the plan at the work site (or away from the work site), the tool 10 may send the site visit report to the site visit report unit 32. The site visit report may be sent after the engineer's work on the plan is complete, and/or at interim times, such as every hour, every half day, every day (for multiple day projects), and so on. Thus, a site visit report may be generated and sent to the site visit report unit 32 for complete and incomplete engineering plans. A "completed" site visit report therefore refers to an electronic communication indicating that plan generation has been attempted or performed, at least to some extent. Accordingly, it should be appreciated that a "completed" site visit report does not necessarily imply that a plan itself was successfully generated in its entirety, but that it was at least initiated and attempted in some fashion. For example, an engineer may be dispatched to a work site, may begin performing developing an engineering plan, and may encounter some unforeseen impediment to completing the operation, or some condition or circumstance that warrants special action or attention. Accordingly, the engineer may generate a "completed" site visit report that reflects the attempted operation, and in some manner reflects the situation.

The site visit report unit 32 may store a collection of completed site visit reports, for example, from one or more plan generation tools 10. As discussed above, a site visit report may include an image or set of images that includes markup information along with other information such as text comments, existing landmarks, utilities, etc. In sum, a site visit report may include one or both of image data and non-image data associated with the work site. Examples of non-image data that may be included in or otherwise associated with the site visit report may include, but is not limited to, one or more of the following: a text description of the work site; a plurality of geographic coordinates associated with one or more landmarks, equipment, etc.; an address or a lot number of at least one property within which the work site is located; a street intersection in a vicinity of the work site; a date and/or time of day that the engineer worked on the plan; a timestamp to indicate when plan generation work was performed; one or more identifiers (e.g., name, ID number, phone number, address, signature, etc.) for an engineer, an engineering company, and/or a utility associated with one or more underground or aerial facilities. The image data and the non-image data may be formatted in any of a number of ways; for example, the non-image data may be associated with the image data as a separate data set linked to the image data, as metadata to the image data, as some other type of combined file including both image and non-image data, etc., so as to create a searchable electronic record that may be consulted to verify that the plan was indeed completed, and assess the integrity (e.g., quality, timeliness, accuracy, etc.) of the operation.

The site visit report unit 32 may be configured to execute an assessment application to perform a quality assessment on completed site visit reports. In one exemplary embodiment, one or more approvers may be associated with execution and/or monitoring of the assessment application. Approvers may be, for example, any personnel associated with the engineering firm (or other entity involved in generating engineering plans), such as, but not limited to, the supervisors of engineers that are dispatched into the field, quality control supervisors, and/or any management personnel. In another example, approvers may be any personnel associated with entities requesting a plan, such as, but not limited to, the supervisors, quality control supervisors, and/or any management personnel of utility owners/operators, federal, state or local regulatory agencies or inspectors, and so on.

In some implementations, site visit report assessment may be used to rapidly assess the quality of work performed in the field. This assessment may be by visual inspection of site visit reports by one or more approvers and/or by processing the information contained in a completed site visit report to assess compliance with a predetermined quality standard for the engineering plan. For example, in one implementation, the engineering plan image mark up information for a site visit report may be analyzed by comparing the image against one or more facilities maps for the work site, e.g., to check that equipment to be installed does not conflict with existing utilities and/or falls within utility easements or other approved locations. Completed site visit reports may be reviewed, in essentially real-time during generation of an engineering plan, and/or at any time following attempt/completion of the plan, to provide a quality assessment of the operation (e.g., an assessment of the completeness, accuracy, and/or efficiency of the operation). In sum, quality assessment processes according to various embodiments, as facilitated by the assessment application, may be primarily under the discretion of a human reviewer, albeit facilitated in some respects by computer-aided display of information, and electronic record keeping and communication functions associated with the quality assessment result(s). In other embodiments, information related to generation of a plan is electronically analyzed such that a quality assessment is based at least in part on some predetermined criteria and/or metrics that facilitate an automated determination of quality assessment.

In one aspect, if the plan information represented by the completed site visit report complies with a predetermined quality standard (e.g., based on predetermined criteria and/or metrics), the plan information may be "approved" (e.g., a quality assessment process/engine may generate an "approved completed site visit report"). In another aspect, quality assessment during generation of a plan may facilitate identification of risks or problems that may be flagged for proactive corrective action (e.g., immediately, or as soon as practicable). For example, when it is determined by one or more approvers that the performance of a certain work order is satisfactory, the site visit report may be closed with respect to quality assessment and no further action is required. However, when it is determined by one or more approvers that the engineer's work on a particular work order is not satisfactory, the work order may be referred for further quality control or other action, such as returning to the work site to investigate, correct and/or verify one or more portions of the plan.

Various quality assessment functions may be implemented in a centralized or distributed fashion. For example, in one implementation, alternatively to or in addition to the site visit report unit 32 receiving and analyzing completed work orders, a plan generating tool 10 may collect relevant information from the field relating to plan generation operations and perform quality assessments of the information. For example, a tool 10 may be configured to acquire information about the plan and its environs, compare elements of acquired information to various criteria relating to functionality and/or use of the plan generating tool, and/or one or more environmental conditions proximate to the tool 10 and/or the work site in which it is being used, and provide one or more local alerts (e.g., visual, audible, and/or tactile indications) to an engineer to indicate any detected out-of-tolerance conditions. For example, the tool 10 may use a criterion that tests whether new equipment is to be installed within one foot or less of an existing utility. If new equipment is indicated on the plan to be within 1 foot of existing utilities, the tool 10 may provide an alert to the engineer, may store information regarding the non-compliant equipment placement, and/or may suggest an alternate location to the engineer. As another example, the tool 10 may verify that equipment indicated in an engineering plan is properly located within a utility easement, right of way or other appropriate location. For example, a cable system may need to be installed in some areas within a geographic boundary that the cable company has rights to use. The tool 10 may check that equipment symbols and other indications are placed on the work site image such that the equipment is located within suitable geographic areas, and take actions if placement outside of the areas is found. In some embodiments, the tool 10 may notify the engineer of the potentially inappropriate location, such as by highlighting an easement boundary that has been crossed, highlighting equipment symbols that are improperly placed, recording information regarding the improper location in a site visit reports, automatically moving equipment in plan markup information to a more appropriate location, and so on. Such locally detected conditions also may be transmitted by the tool 10 to the site visit report unit 32 for further and/or corroborative quality assessment or other analysis. In this fashion, a host of quality assessment functionality may be facilitated at various organizational levels, and/or amongst multiple distributed computing resources.

In other aspects, site visit reports, as well as quality assessment results, may be archived (e.g., in a database and/or central data store) for future reference/access by various parties that may be interested in such information (e.g., installation contractors, facility owners, municipalities, regulatory authorities, damage investigators/assessors, insurance companies, etc.). In particular, any information relating to an approved site visit report may be electronically transmitted and/or electronically stored so as to provide a searchable, secure, and unalterable electronic record of the plan generation operation (e.g., using any of a variety of conventionally available encryption algorithms, such as TripleDES/TDEA, or the Blowfish keyed symmetric block cipher). Such an electronic record provides for improved visibility, quality control and audit capability for engineering plan generation operations.

In yet other embodiments, the site visit report unit 32 may provide a notification at one or more points during the generation of an engineering plan that indicates a status of the operation and/or disposition of the engineer, and/or more detailed information about the progress of the plan operation. Such notification may be electronically transmitted and/or stored so as to inform at least one party as to the status of the operation and/or details thereof. In one aspect, a requesting party may designate a particular format, content, and/or method of receiving notifications regarding the plan generation. In another aspect, the site visit report unit 32 may provide one or more images that show at least some of the plan information (such as engineer mark up information on an image of the work site). This notification may be used by a supervisor or other manager, the entity requesting the plan, or others to assess the status of the plan, as well as its features such as equipment to be installed, and so on.

With an engineer having traveled to a work site, prepared details regarding an engineering plan (e.g., through efforts at the work site and/or away from the site using a plan generating tool 10), and sent a site visit report within the system 100, a plan finalization unit 33 may begin finalization of the engineering plan. Finalization of an engineering plan may involve any suitable activity, such as using engineer hand drawn plan information, work site image information, etc., to create a formal CAD or other computerized drawing or set of drawings for the engineering plan, compiling technical notes, requirements, comments, or other information into the plan (such as a number of specific pieces of equipment noted by an engineer for installation at a work site, cost estimate information, etc.), and so on. Plan finalization may be done in a fully manual way (such as by preparing formal technical drawings by hand), in a fully automated way (such as by a computerized system compiling information and/or formalizing drawings without human input), and/or in a semi-automated way (e.g., where one or more human operators interact with a computer system to prepare formal drawings, compile information, and so on). Depending on the mode used to finalize the plan, the plan finalization unit 33 may take various actions. For example, the plan finalization unit 33 may generate checklists of tasks to be completed to finalize the plan and keep track of each task's completion status. Based on the task checklist, the plan finalization unit 33 may generate and send reminders or task orders to persons responsible for different components of the plan finalization, such as email or calendar reminders to a draftsman to formalize drawings for one or more portions of the plan. Alternately, the plan finalization unit 33 may use the checklist to prompt automated action by the unit 33 to complete certain portions of the plan, such as automated drawing formalization, information compiling, and so on.

The plan finalization unit 33 may coordinate the actions of multiple persons involved in formalizing a plan. For example, the unit 33 may create a Gantt chart or equivalent schedule that includes tasks to be completed along with task dependencies (e.g., indications that a first task requires completion or at least partial completion of a second task before the first task can be begun, and so on). The schedule can be used to estimate completion of the plan formalization, as well as for timing when reminders or requests to begin/finish a portion of the plan finalization process.

The plan finalization unit 33 may also provide information needed to finalize a plan, such as a required formatting for formal drawings (e.g., information required to be included in drawing title blocks, maximum or minimum drawing scale, safety information to be included, and so on), forms to be used when listing required equipment or providing cost estimates, a customer job number to be included on all drawings or other portions of the plan, etc. For example, the plan finalization unit 33 may generate blank drawing templates that include needed title block and other information for use by draftsmen when preparing formal drawings for the plan. Similarly, the plan finalization unit 33 may generate form sheets that include certain necessary information (such as job number, work site identification, customer name, etc.), but require user input for completion (such as entry of equipment needed, labor and equipment cost estimates, time estimates for installation, and so on). Thus, the unit 33 may assist in finalizing the plan by providing certain necessary forms or other tools needed for the finalization process.

Once a plan is finalized, the plan finalization unit 33 may send the completed plan to a customer that requested the plan, to contractors or other entities that may use the plan for installation or job bidding purposes, to a municipality or other government entity for use in an approvals or other review process, and so on. The finalized plan may take any form, such as printed paper, electronic files, a combination of printed documents and electronic files, and so on. Electronic files may take any suitable form (such as those mentioned above regarding work site image data), may be stored and/or transmitted in any suitable way (e.g., in an encrypted form over a wired computer network), and may be used with a computer system for viewing and/or printing documents, as desired.

The system 100 may provide a convenient archive of searchable, secure and unalterable electronic records and images that are associated with engineering plan generation operations. This convenient store of work order, site visit reports, image data, and/or finalized plans may be easily accessible, such as via the Internet or other network, by entities such as excavators or infrastructure installation contractors, one-call centers, facility owners, federal, state or local regulators and others, e.g., for purposes such as to monitor and enforce quality control, audit performance of relevant customer-supplier agreements, audit compliance with applicable federal, state and local regulations, inform planning, improve operating efficiency, and so on. In one example, the electronic records and other data may be accessible for a limited period of time, such as a legal amount of time that is required after generation of a plan has begun or has been completed. Also, an application service provider (ASP) model may be used for generating, maintaining and providing access to electronic records and other data of the system 100.

Figure 17:
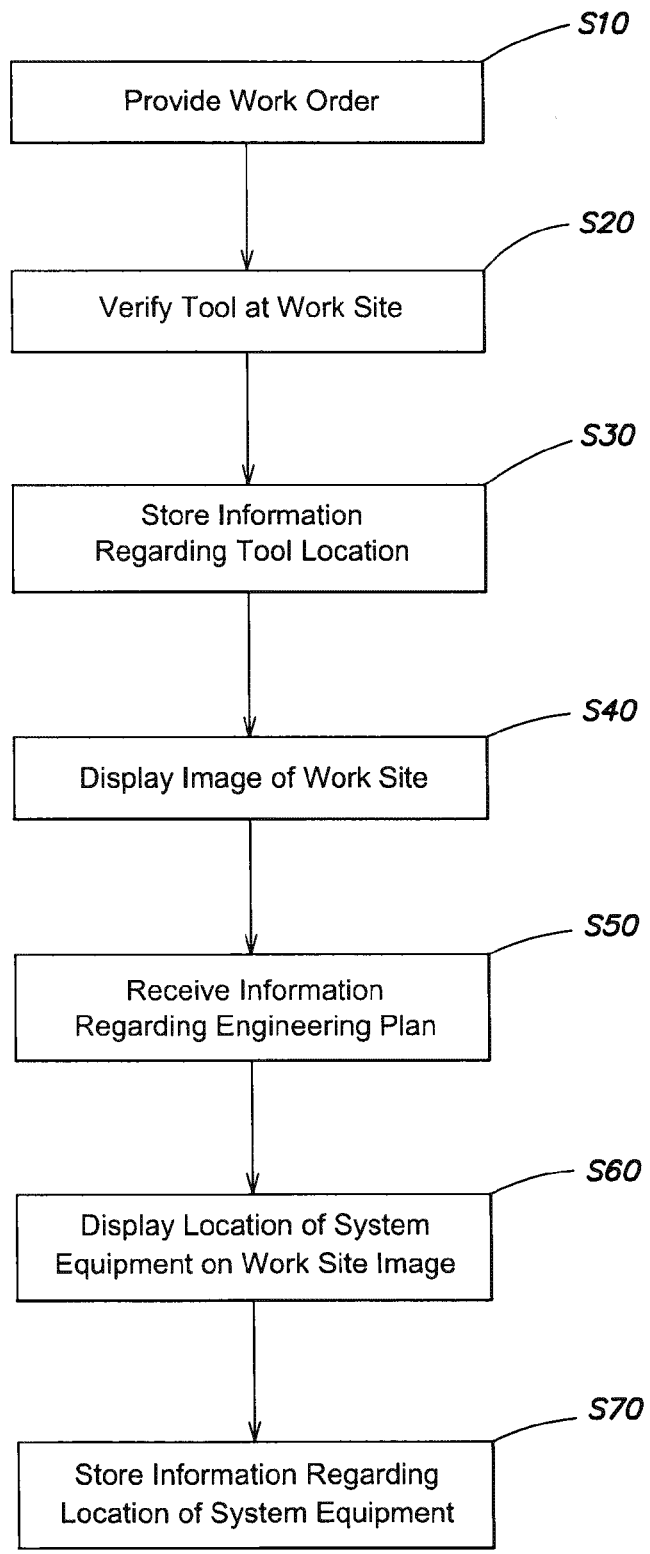
FIG. 17 is a flowchart outlining a method for generating an engineering plan according to one embodiment of the present invention.

FIG. 17 shows a flowchart of steps in an illustrative method for generating an engineering plan for the installation of equipment at a work site, according to one embodiment of the present invention. In step S10, a work order is provided that indicates at least a work site for the engineering plan. The work order may take any suitable form, such as a database record with or without associated document and/or map image data, an email file with or without attachments, or any other suitable electronic message or file. The work order may include geographic information relating to the work site, i.e., a location for the work site (such as an address or set of addresses, geographic coordinates, a municipal plot or plat number, or other suitable indication of a location for which the engineering plan is to be created), as well as other information. For example, the work order may include image information for the work site used to display the image of the work site on a plan generating tool. The image information may include computer generated and/or captured image information that may be used alone or in a composite to display an image representative of the work area and various landmarks at the site. The image information may be tailored as desired, e.g., to make creation of the engineering plan easier. For example, an aerial image of a work site may be modified to remove trees and other objects that obstruct a view of the ground at the work site. Other landmarks, such as buildings, utility poles, transformer units, etc. may be left in the modified image. Image information may be combined, such as an aerial image combined with a street map so as to allow for easier identification of streets and other places on the image. Image information may be combined in any way, such as having different image components (such as an aerial photograph and a street map) on different image layers, e.g., so that the opacity/transparency of the different layers can be adjusted. The work order may also include information regarding work scope (such as how many houses are to be serviced with a new cable installation), tools or other equipment needed at the work site to generate the plan, estimated time needed to complete the plan (whether for preparing the entire plan, estimated time to be spent at the work site, etc.), assistance information used by the plan generating tool (e.g., lists of plan generation tasks that are to be performed in generating at least portions of the plan), best practices information used by the plan generating tool (such as customer requirements, industry standards, etc.), risk associated with the plan, business value of the plan, and/or engineer resources information (such as engineer name and identification number for those who are going to work on the plan, engineer schedules, and so on). The work order may be provided to a plan generating tool 10, e.g., by electronic transmission, so that the tool 10 may use the work order information in generating the plan.

In step S20, verification may be made that the plan generating tool operated by an engineer is sufficiently near to the work site, e.g., before or during work on generating the plan. This verification may be made in an automated way, such as by the plan generating tool 10 comparing its current location to work site location information from the work order. Alternately, the tool 10 may log its current location on a periodic basis, such as every 5 minutes, and a comparison may be made later, whether automatically or by a person reviewing the logged tool location information. For example, the tool's location may be plotted on a map using the logged information and a quality control reviewer or manager could review the tool's travels to ensure that the tool was at the proper work site location(s) during work generating the plan. The tool 10 may prevent an engineer from providing plan information, such as marking up a displayed image with equipment installation locations and instructions, unless the tool 10 is sufficiently near the work site.

In step S30, information is stored regarding a location of the plan generating tool in relation to the work site. In some embodiments, step S30 may be performed before step S20, whereas in other embodiments step S30 may be performed after. For example, after verification that the tool is near a work site, information regarding the verification may be stored for later use, such as in a quality control review. In other cases, the tool 10 may log its location on a periodic basis (i.e., information regarding its location in relation to the work site is stored) which is later used to verify the tool's location in relation to the work site.

In step S40, an image is displayed on the plan generating tool representing the work site. For example, the plan generating tool may be arranged like a tablet computer with a visible display on which an image of the work site, or at least a portion of the work site, can be viewed by an engineer and interacted with. As discussed above, the image may be arranged in any suitable way, e.g., a composite of aerial and street maps, a town plat map, and so on. The tool may generate the image display based on information included in the work order, such as a stored image file. The tool may have the option to change image views, e.g., an engineer may view an aerial photograph of the work site, then switch to a town street map, then form a composite image of the two. Also, the image may provide an indication of an area for which the plan is to be generated, such as a hand drawn box or closed loop around the area, highlighting of the area, and so on.

In step S50, information is received, at the plan generating tool while at the work site, regarding equipment to be installed at the work site. That is, the engineer (or the tool itself in an automated way) may create information regarding the engineering plan including information with respect to equipment to be installed at the work site. For example, the engineer may interact with the displayed image by drawing with a stylus or other instrument on a touch sensitive overlay on the display. In response, the tool 10 may display one or more digital representations of pieces of equipment to be installed, e.g., lines, symbols and other graphic mark up information that is drawn by the engineer to indicate the placement of equipment at the work site. In addition, or alternately, the engineer may select icons or other symbols from a pick list, dialog box, tool bar or other displayed source and drop the symbols onto the image (again using a stylus, finger or other instrument) to represent the placement of equipment at the site. The engineer may also provide text information, whether by handwriting, typing, voice recognition, etc. Instructions may be provided by the tool 10 to the engineer when generating details of the plan. For example, a prompt may be displayed on the plan generating tool to install a piece of equipment at a location at the work site, and the engineer may click the prompt or otherwise agree to have the equipment indication added to the image. In another embodiment, one or more tasks to be completed when generating the engineering plan and/or best practices information may be displayed by the plan generating tool. Such an arrangement may provide useful information while allowing the engineer to control how the plan is created. In another embodiment, step-by-step instructions may be provided by the plan generating tool to be followed by the engineer in generating the engineering plan. This approach may be more useful when training an engineer and/or when the engineer needs help in generating the plan.

In step S60, a location on the displayed image that corresponds to a location at the work site where the equipment is to be installed is determined. That is, when an engineer hand draws or otherwise indicates that a piece of equipment is to be installed at the work site, the tool 10 may determine the corresponding location on the image and store relevant information regarding the placement. In some embodiments, determination of the location on the displayed image where equipment is to be indicated may require no special processing by the tool 10, e.g., where the engineer draws a symbol or other indication of the equipment over the displayed image, and the tool 10 displays the hand drawn information in response. In other embodiments, the engineer may indicate, such as by geographic coordinates, a nearby landmark, or other reference point, where equipment is to be placed, and the tool 10 identifies the corresponding location on the image. In other embodiments, the engineer may insert a symbol regarding the equipment that corresponds to the tool's current location. In response, the tool 10 may identify the corresponding location on the image of the work site, and insert the symbol or other indication of the equipment on the displayed image. Image markup information regarding the engineering plan (e.g., including equipment type and location, installation details, etc.) may be inserted into a displayed image of the work site onto one or more layers of the image, may be added to a same layer as the original image data, or in any other suitable way.

In step S70, information regarding the location on the displayed image regarding where the equipment is to be installed is stored. This information may be stored in any suitable way, such as an identifier for an icon or other symbol together with vector information that indicates the location on the image where the symbol is to be placed. In other embodiments, bitwise image data may be stored, e.g., that represents hand drawn information created by the engineer. In short, any suitable information that can be used to create an image of the work site with equipment placed appropriately or otherwise used to create an engineering plan may be stored by the plan generating tool 10.

In addition to receiving and storing information regarding the placement of equipment on a work site image, the plan generating tool 10 may be used to generate other aspects of the engineering plan. For example, the tool 10 may be used to verify the actual location of a landmark displayed on the image, e.g., the work site image may show the edges of a street under which a conduit is to be placed, and the engineer may use the tool 10 to verify that the edges of the street shown on the image are accurately indicated. In one embodiment, the engineer may verify the location such landmarks by having the tool 10 indicate its current location on the displayed image while the tool 10 is positioned at or over the street edge. The engineer may visually check whether the tool's location as shown on the image is coincident or otherwise sufficiently near the street edge, and if not, may make a correction to the image so that the street edge is shown properly on the engineering plan. As discussed above in connection with FIG. 3A, the plan generating tool may include a positioning unit, e.g., at least one of GPS, inertial navigation, rangefinding, or other location-determining capability suitable to determine a current location of the plan generating tool at the work site.

The tool may also be used to indicate the location of utilities or other objects that are located at a work site, such as underground utilities that are identified by one or more locate units, as known in the relevant arts. Similarly, the tool may display an indication where marking material is dispensed at a work site, e.g., to indicate where equipment is to be installed, the location of underground utilities, and so on.

Figure 18:
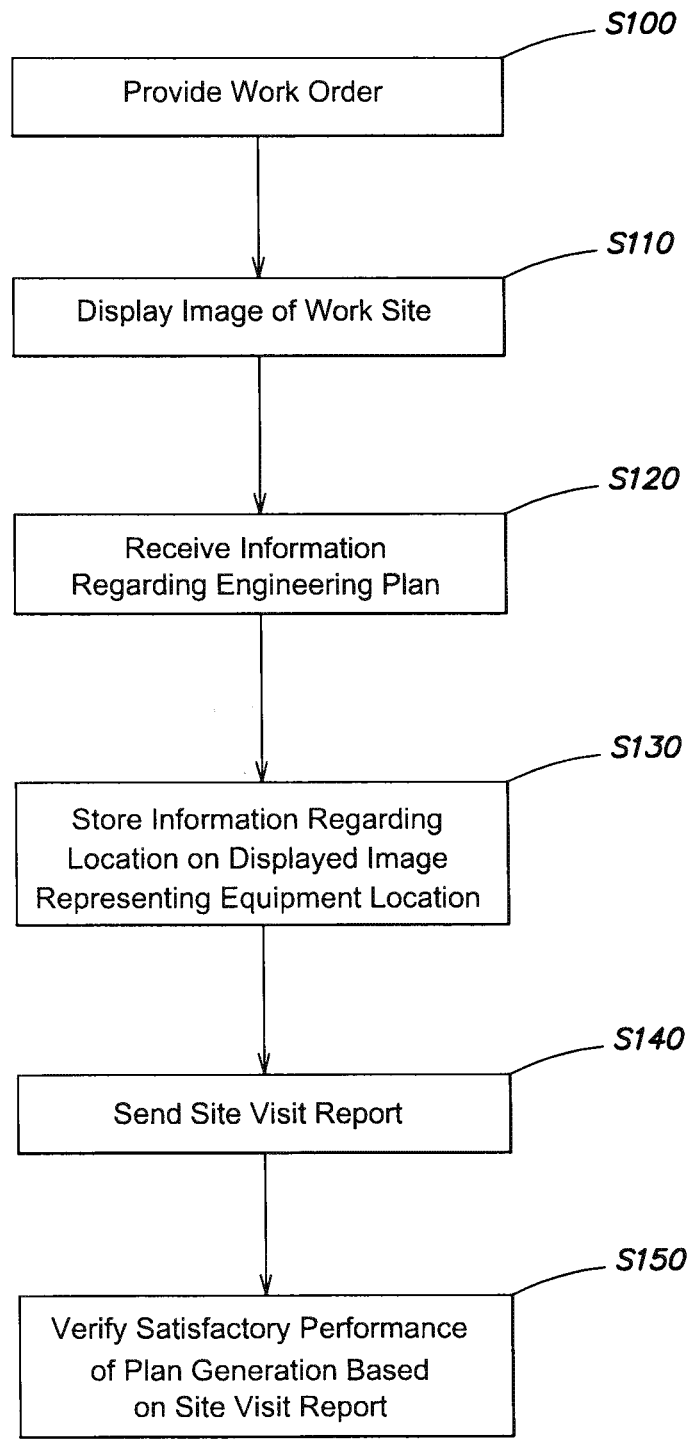
FIG. 18 is a flowchart outlining a method for performing a quality control or other auditing review of an engineering plan that is generated at least in part by an engineer at a work site, according to one embodiment of the present invention.

FIG. 18 shows a flowchart of steps in an illustrative method for performing a quality control or other auditing review of an engineering plan that is generated at least in part by an engineer in the field. In step S100, a work order is provided that indicates at least a work site for the engineering plan, a list of engineering plan generation tasks to be completed at the work site, and instructions for performance of at least one of the tasks. The indication for the work site may include an address or set of addresses, geographic coordinates, a municipal plot or plat number, or other suitable indication of a location for which the engineering plan is to be created. Information regarding plan generation tasks and/or instructions may include information regarding work scope (such as how many houses are to be serviced with a new cable installation), tools or other equipment needed at the work site to generate the plan, estimated time needed to complete the plan (whether for preparing the entire plan, estimated time to be spent at the work site, etc.), assistance information used by the plan generating tool (e.g., lists of plan generation tasks that are to be performed in generating at least portions of the plan), best practices information used by the plan generating tool (such as customer requirements, industry standards, etc.), risk associated with the plan, business value of the plan, and/or engineer resources information (such as engineer name and identification number for those who are going to work on the plan, engineer schedules, and so on). The work order may be provided to a plan generating tool 10, e.g., by electronic transmission, so that the tool 10 may use the work order information in generating the plan. Alternately, the work order may be generated by the tool 10.

In step S110, an image may be displayed on the plan generating tool representing the work site. As discussed above, the image may include computer generated and/or captured image information that may be used alone or in a composite to display an image representative of the work area and various landmarks at the site. The image information may be tailored as desired, e.g., to make creation of the engineering plan easier. For example, an aerial image of a work site may be modified to remove trees and other objects that obstruct a view of the ground at the work site. Other landmarks, such as buildings, utility poles, transformer units, etc. may be left in the modified image. Image information may be combined, such as an aerial image combined with a street map so as to allow for easier identification of streets and other places on the image. Image information may be combined in any way, such as having different image components (e.g., an aerial photograph and a street map) on different image layers, e.g., so that the opacity/transparency of the different layers can be adjusted.

In step S120, information is received, at a plan generating tool located at the work site, regarding equipment to be installed at the work site. As discussed above, such information may be received in any suitable way, such as by an engineer hand drawing symbols, text or other graphical information regarding equipment and its location on a displayed image of the work site, by the tool 10 automatically generating equipment installation information, and so on.

In step, S130, information is stored regarding a location on the displayed image indicating where the equipment is to be installed. As discussed above, the stored information may include image information regarding pieces of equipment and their display position on an image, text information or any other suitable information.

In step S140, a site visit report is sent from the plan generating tool that includes at least information regarding performance of plan generation tasks at the work site. Thus, the site visit report may include location information for the plan generation tool at the work site, image information for the work site including image markup information regarding equipment to be installed, text information for the work site regarding equipment to be installed, time information regarding work at the work site using the plan generating tool, engineer identification, locate information regarding utilities or other objects identified at a work site, marking material information, and/or information regarding work site conditions. The site visit report may be arranged in any suitable way, e.g., may include one or more computer files, such as a database record, image information (whether computer generated, captured image data, hand drawn graphical or text data, and so on), text notes, audio files, and so on.

In step S150, satisfactory performance of the plan generation tasks is verified based on information in the site visit report. In some embodiments, the performance may be verified in an automated way, e.g., by a computer implemented program that checks information in the site visit report against other information in the work order or elsewhere. For example, it may be verified that the engineering plan generation tool was sufficiently near the work site when receiving and storing information regarding equipment to be installed at the work site. This may help ensure that the engineer was actually at the work site and observed local conditions there when generating the plan. As another option, it may be verified that equipment to be installed is located sufficiently far from existing facilities at the work site. For example, there may be industry standards or customer requirements that equipment is not to be installed closer than a minimum distance from existing facilities, e.g., to help avoid disruption of the existing facilities. Thus, a check may be made (e.g., by a site visit report unit 32 of a plan generation system 100) that equipment shown in a plan is not closer than the minimum distance from existing facilities, whether those facilities were located by the tool 10 while at the work site or based on existing facilities maps or other information. In another embodiment, a check may be made that the tasks on the list of plan generating tasks were actually completed. This may be done, for example, by verifying that the engineer acknowledged completion of the tasks during the plan generation process and/or by reviewing the draft plan (e.g., by a seasoned engineer or quality control personnel) to check that the plan work was completed properly. Other aspects of work done by an engineer at a work site that may be verified include verifying that an engineer identification in the site visit report is consistent with engineer information in the work order, verifying that an amount of time spent by the engineer with the plan generation tool at the work site is consistent with the work order estimated time, verifying that the tasks on the list of plan generating tasks were completed in a proper order, verifying that the information regarding equipment to be installed and the location for equipment at the work site is consistent with customer requirements, best practices standards or government regulations, and others.

Figure 19:
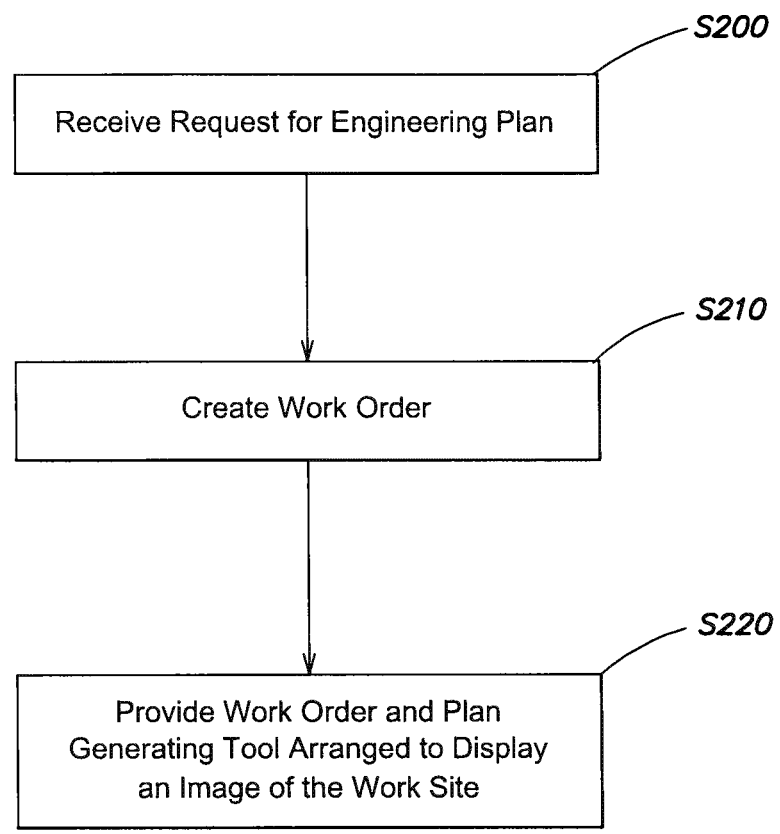
FIG. 19 is a flowchart outlining a method for generating a work order from a customer request for an engineering plan, according to one embodiment of the present invention.

FIG. 19 shows a flowchart of steps in a method for generating a work order from a customer request for an engineering plan. In step S200, a request to generate an engineering plan for the installation of equipment at a work site is received. The request may be received from a customer (such as a facility owner), a government entity, or any other entity. The request may be received in any way, such as by electronic mail, by telephone, by regular mail, and so on, and may include any suitable information, such as a work site location, the type of equipment or other work to be done at the site, specific requirements, etc.

In step S210, a work order is created that indicates at least a work site for the engineering plan, a list of engineering plan generation tasks to be completed at the work site, and image information for the work site suitable to enable a display of an image representative of the work site. Details regarding the information that may be included in a work order are discussed in above, and thus not repeated here.

In step S220, at least part of the work order is provided to an engineer with a plan generating tool arranged to display an image of the work site. As also discussed above, the engineer and the plan generating tool may use the work order for various functions, such as displaying an image of the work site, indicating on the image where equipment is to be located, providing details regarding the type or equipment to be installed or other work to be performed at the site, providing step-by-step instructions at the plan generating tool to be followed by the engineer in generating the engineering plan, verifying the actual location of a landmark displayed on the image, receiving hand drawn information from the engineer indicating the equipment and its installation location on the image, displaying a one or more symbols via a user interface where the symbols are indicative of a type of equipment, and so on.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Further, it should be appreciated that various components of an engineering plan generation system may include, or be implemented by, one or more computers, which may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device. A computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Any of the computing devices discussed herein (e.g., servers, computers, plan generating tools, etc.) may include memory, one or more processing units (also referred to herein simply as "processors"), one or more communication interfaces, one or more display units, and one or more user input devices. The memory may comprise any non-transitory computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computing device to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a non-transitory computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention. Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof The term "user" refers to an individual utilizing a plan generating tool or device and may include, but is not limited to, engineers, technicians, draftsmen, managers, and/or other personnel.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. As used herein in the specification and in the claims, "or" should be understood to have the same meaning as "and/or" as defined above.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for facilitating generation of an engineering plan for installation of equipment at a work site, the apparatus comprising:
   a communication interface;
   a display device;
   a user input device;
   a memory to store controller-executable instructions; and
   a controller coupled to the communication interface, the display device, the user input device, and the memory, wherein upon execution of the controller-executable instructions by the controller, the controller:
   A) controls the user input device and/or the communication interface to receive first geographic information relating to a first location of the work site;
   B) compares the first geographic information relating to the work site to second geographic information representing a second location of the user input device to verify that the user input device is sufficiently near to the work site, by:
      B1) determining a distance between the first location and the second location;
      B2) comparing the distance to a predefined range;
      B3) if it is determined that the distance is within or equal to the predefined range, the controller generates at least one first indication so as to indicate that the user input device is sufficiently near to the work site; and
      B4) if it is determined that the distance is not within the predefined range, the controller generates at least one second indication so as to indicate that the user input device is not sufficiently near to the work site;
   C) controls the display device to display a digital image of a geographic area including the work site;
   D) acquires user input from the user input device, the user input relating to at least one first position, relative to the displayed digital image, representing a first equipment location of at least a first piece of the equipment to be installed at the work site;
   E) controls the display device so as to generate a marked-up digital image including at least one first digital representation of the first piece of the equipment placed on the displayed digital image, based at least in part on the user input; and
   F) controls the communication interface and/or the memory to electronically transmit and/or electronically store information relating to the marked-up digital image so as to generate the engineering plan;
   wherein in B):
      the first geographic information relating to the work site includes first geographic coordinates representing the first location of the work site;
      the second geographic information includes second geographic coordinates representing the second location of the user input device; and
      the controller compares the first geographic coordinates and the second geographic coordinates to verify that the user input device is sufficiently near to the work site.

2. The apparatus of claim 1, wherein in A), the controller:
   A1) controls the user input device and/or the communication interface to receive the first geographic information relating to the work site as an address; and
   A2) geo-codes the address to provide the first geographic coordinates as the first geographic information relating to the work site.

3. The apparatus of claim 1, wherein in A), the controller:
   A1) controls the communications interface to receive a work order requesting generation of the engineering plan at the work site; and
   A2) processes the work order to extract from the work order the first geographic information relating to the work site.

4. The apparatus of claim 1, wherein in B), the controller:
   B1) controls the communication interface to receive the second geographic information from at least one external device.

5. The apparatus of claim 1, further comprising a positioning unit to determine the second geographic information.

6. The apparatus of claim 1, wherein in C), the controller:
   automatically selects the digital image for display based at least in part on at least one of the first geographic information and the second geographic information.

7. The apparatus of claim 1, wherein the first geographic information includes first latitude and longitude coordinates for the first location, wherein the second geographic information includes second latitude and longitude coordinates for the second location, and wherein in B1), the controller:
   compares the first latitude and longitude coordinates to the second latitude and longitude coordinates to determine the distance between the first location and the second location.

8. The apparatus of claim 1, wherein the controller further:
   G) displays, via the display device, the at least one first indication or the at least one second indication together with the marked-up digital image.

9. An apparatus for facilitating generation of an engineering plan for installation of equipment at a work site, the apparatus comprising:
   a communication interface;
   a display device;
   a user input device;
   a memory to store controller-executable instructions; and
   a controller coupled to the communication interface, the display device, the user input device, and the memory, wherein upon execution of the controller-executable instructions by the controller, the controller:
   A) controls the user input device and/or the communication interface to receive first geographic information relating to a first location of the work site;
   B) compares the first geographic information relating to the work site to second geographic information representing a second location of the user input device to verify that the user input device is sufficiently near to the work site, by:

B1) determining a distance between the first location and the second location;
B2) comparing the distance to a predefined range; and
B3) if it is determined that the distance is within or equal to the predefined range, the controller further:
C) controls the display device to display a digital image of a geographic area including the work site;
D) acquires user input from the user input device, the user input relating to at least one first position, relative to the displayed digital image, representing a first equipment location of at least a first piece of the equipment to be installed at the work site;
E) controls the display device so as to generate a marked-up digital image including at least one first digital representation of the first piece of the equipment placed on the displayed digital image, based at least in part on the user input;
F) controls the communication interface and/or the memory to electronically transmit and/or electronically store information relating to the marked-up digital image so as to generate the engineering plan; and
G) displays, via the display device, at least one first indication together with the marked-up digital image to indicate that the user input device is sufficiently near to the work site.

10. The apparatus of claim 1, wherein in B2), the controller:
determines a second distance between the first location and a third location corresponding to a centroid of the digital image of the geographic area including the work site;
determines a third distance between the second location and the third location; and
compares each of the first distance, the second distance, and the third distance to the predefined range;
in B3), if it is determined that at least two of the first distance, the second distance and the third distance are within or equal to the predefined range, generates at least one first indication so as to indicate that the user input device is sufficiently near to the work site; and
in B4, if it is determined that less than two of the first distance, the second distance and the third distance are not within the predefined range, generates at least one second indication so as to indicate that the user input device is not sufficiently near to the work site.

11. The apparatus of claim 1, wherein in C), the digital image includes at least one aerial image of the geographic area including the work site.

12. The apparatus of claim 1, wherein in D), the controller:
D1) displays on the display device a plurality of drawing resources relating to the at least one first digital representation of the first piece of the equipment, and wherein:
the user input includes a selection of at least one drawing resource of the plurality of drawing resources; and
the marked-up digital image includes:
the at least one first digital representation of the first piece of equipment; and
at least one text annotation relating to the first piece of equipment.

13. The apparatus of claim 12, wherein the plurality of drawing resources include a plurality of cable system drawing resources representing cable system equipment.

14. The apparatus of claim 13, wherein the plurality of cable system drawing resources includes at least one of:
icons representing different junction boxes;
an icon representing standard conduit;
an icon representing conduit for placement under a roadway; and
an icon representing a utility pole.

15. The apparatus of claim 1, wherein in F), the controller controls the communication interface to electronically transmit the information relating to the marked-up digital image in a suitable format to at least one computing device executing a CAD program, such that the CAD program processes the information transmitted in F) so as to generate at least one formal CAD design drawing.

16. The apparatus of claim 1, wherein the controller further:
processes the information relating to the marked-up digital image so as to generate at least one of an equipment list, a bill of materials, a cost estimate, and a time estimate for the installation of the equipment at the work site.

17. The apparatus of claim 1, wherein the controller further generates a site visit report based at least in part on the information relating to the marked-up digital image, the site visit report comprising at least one of:
at least a portion of the marked-up digital image;
an engineer certification;
a first identifier for a work order requesting generation of the engineering plan;
a second identifier for an engineer using the apparatus;
a date and time stamp;
a location stamp; and
at least one indication representing a comparison of the first geographic information relating to the work site and the second geographic information representing a second location of the user input device.

18. In a system comprising a communication interface, a display device, a user input device, a memory to store controller-executable instructions, and a controller coupled to the communication interface, the display device, the user input device, and the memory, a method for generating an engineering plan for installation of equipment at a work site, the method comprising:
A) receiving via the user input device and/or the communication interface first geographic information relating to a first location of the work site;
B) comparing the first geographic information relating to the work site to second geographic information representing a second location of an engineer generating the engineering plan by:
B1) determining a distance between the first location and the second location;
B2) comparing the distance to a predefined range;
B3) if it is determined that the distance is within or equal to the predefined range, generating at least one first indication so as to indicate that the user input device is sufficiently near to the work site; and
B4) if it is determined that the distance is not within the predefined range, generating at least one second indication so as to indicate that the user input device is not sufficiently near to the work site;
C) displaying on the display device a digital image of a geographic area including the work site;
D) acquiring user input from the user input device, the user input relating to at least one first position, relative to the displayed digital image, representing a first equipment location of at least a first piece of the equipment to be installed at the work site;
E) generating on the display device a marked-up digital image including at least one first digital representation of the first piece of the equipment placed on the displayed digital image, based at least in part on the user input; and
F) electronically transmitting and/or electronically storing information relating to the marked-up digital image so as to generate the engineering plan;
wherein in B):
  the first geographic information relating to the work site includes first geographic coordinates representing the first location of the work site;
  the second geographic information includes second geographic coordinates representing the second location of the user input device; and
  the controller compares the first geographic coordinates and the second geographic coordinates to verify that the user input device is sufficiently near to the work site.

19. A non-transitory computer readable storage medium storing processor-executable instructions that, when executed by at least one processor, perform a method for generating an engineering plan for installation of equipment at a work site, the method comprising:
  A) receiving first geographic information relating to a first location of the work site;
  B) comparing the first geographic information relating to the work site to second geographic information representing a second location of an engineer generating the engineering plan by:
    B1) determining a distance between the first location and the second location;
    B2) comparing the distance to a predefined range;
    B3) if it is determined that the distance is within or equal to the predefined range, generating at least one first indication so as to indicate that the user input device is sufficiently near to the work site; and
    B4) if it is determined that the distance is not within the predefined range, generating at least one second indication so as to indicate that the user input device is not sufficiently near to the work site;
  C) displaying a digital image of a geographic area including the work site;
  D) acquiring user input from a user input device, the user input relating to at least one first position, relative to the displayed digital image, representing a first equipment location of at least a first piece of the equipment to be installed at the work site;
  E) generating a marked-up digital image including at least one first digital representation of the first piece of the equipment placed on the displayed digital image, based at least in part on the user input; and
  F) electronically transmitting and/or electronically storing information relating to the marked-up digital image so as to generate the engineering plan;
wherein in B):
  the first geographic information relating to the work site includes first geographic coordinates representing the first location of the work site;
  the second geographic information includes second geographic coordinates representing the second location of the user input device; and
  the controller compares the first geographic coordinates and the second geographic coordinates to verify that the user input device is sufficiently near to the work site.

\* \* \* \* \*